(12) United States Patent
Lin et al.

(10) Patent No.: US 12,253,654 B2
(45) Date of Patent: Mar. 18, 2025

(54) OPTICAL IMAGING LENS ASSEMBLY, IMAGE CAPTURING DEVICE AND ELECTRONIC DEVICE

(71) Applicant: LARGAN PRECISION CO., LTD., Taichung (TW)

(72) Inventors: Cheng-Chen Lin, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 895 days.

(21) Appl. No.: 17/367,489

(22) Filed: Jul. 5, 2021

(65) Prior Publication Data

US 2021/0333519 A1   Oct. 28, 2021

Related U.S. Application Data

(63) Continuation of application No. 16/380,096, filed on Apr. 10, 2019, now Pat. No. 11,092,784, which is a
(Continued)

(30) Foreign Application Priority Data

Apr. 15, 2016  (TW) ................... 105111883

(51) Int. Cl.
*G02B 9/62* (2006.01)
*G02B 13/00* (2006.01)
*G02B 27/00* (2006.01)

(52) U.S. Cl.
CPC .......... *G02B 13/0045* (2013.01); *G02B 9/62* (2013.01); *G02B 27/0025* (2013.01)

(58) Field of Classification Search
CPC ... G02B 13/0045; G02B 9/62; G02B 27/0025
See application file for complete search history.

(56) References Cited

U.S. PATENT DOCUMENTS

| 2,596,799 A | 5/1952 | Tillyer et al. |
| 3,800,085 A | 3/1974 | Ambats et al. |

(Continued)

FOREIGN PATENT DOCUMENTS

| CN | 201383031 Y | 1/2010 |
| CN | 105044880 A | 11/2015 |

(Continued)

OTHER PUBLICATIONS

Herbert Gross (Ed.), Handbook of Optical Systems, vol. 3, 377-379 (2007). (Year: 2007).*

(Continued)

*Primary Examiner* — Cara E Rakowski
*Assistant Examiner* — Wesley Scott Ashton
(74) *Attorney, Agent, or Firm* — McClure, Qualey & Rodack, LLP

(57) ABSTRACT

An optical imaging lens assembly includes, in order from an object side to an image side, a first lens element, a second lens element, a third lens element, a fourth lens element, a fifth lens element and a sixth lens element. The first lens element has positive refractive power. The second lens element has positive refractive power. The third lens element has negative refractive power. The fourth lens element has an object-side surface and an image-side surface being aspheric. The fifth lens element has an object-side surface and an image-side surface being aspheric. The sixth lens element has an object-side surface and an image-side surface being aspheric, wherein at least one of the object-side surface and the image-side surface of the sixth lens element includes at least one inflection point.

22 Claims, 29 Drawing Sheets

Related U.S. Application Data continuation of application No. 15/211,078, filed on Jul. 15, 2016, now Pat. No. 10,310,223.

(56) References Cited

U.S. PATENT DOCUMENTS

| | | | |
|---|---|---|---|
| 3,868,173 A | 2/1975 | Miles et al. | |
| 3,972,592 A | 8/1976 | Ruben | |
| 4,086,000 A | 4/1978 | Cox et al. | |
| 4,778,264 A | 10/1988 | Matsumura et al. | |
| 4,838,665 A | 6/1989 | Hasegawa et al. | |
| 4,934,771 A | 6/1990 | Rogers | |
| 5,636,067 A | 6/1997 | Shimizu | |
| 8,854,744 B2* | 10/2014 | Liao | G02B 9/62 359/713 |
| 9,239,447 B1* | 1/2016 | Chen | G02B 13/0045 |
| 9,335,522 B2* | 5/2016 | Lin | G02B 13/0045 |
| 9,366,845 B2* | 6/2016 | Huang | G02B 27/0025 |
| 9,417,434 B1* | 8/2016 | Huang | G02B 13/0045 |
| 9,482,847 B1 | 11/2016 | Liu et al. | |
| 9,535,236 B2 | 1/2017 | Chen et al. | |
| 10,073,249 B2* | 9/2018 | Huang | G02B 13/0045 |
| 10,073,251 B2* | 9/2018 | Lin | G02B 13/0045 |
| 10,247,924 B2* | 4/2019 | Lin | G02B 13/0045 |
| 10,310,223 B2* | 6/2019 | Lin | G02B 27/0025 |
| 10,353,176 B2* | 7/2019 | Hsu | G02B 27/0025 |
| 10,606,040 B2* | 3/2020 | Hsu | G02B 27/0025 |
| 10,613,297 B2* | 4/2020 | Hsieh | G02B 9/62 |
| 10,627,603 B2* | 4/2020 | Huang | G02B 13/0045 |
| 10,656,383 B2* | 5/2020 | Hsueh | G02B 13/04 |
| 11,092,784 B2* | 8/2021 | Lin | G02B 27/0025 |
| 2012/0229917 A1 | 9/2012 | Huang | |
| 2012/0243108 A1 | 9/2012 | Tsai et al. | |
| 2012/0314301 A1 | 12/2012 | Huang | |
| 2013/0050846 A1 | 2/2013 | Huang | |
| 2014/0078603 A1 | 3/2014 | You | |
| 2015/0049393 A1 | 2/2015 | Park | |
| 2015/0062407 A1 | 3/2015 | Chen et al. | |
| 2015/0062721 A1 | 3/2015 | Kim et al. | |
| 2015/0085183 A1* | 3/2015 | Chen | G02B 13/0045 359/713 |
| 2015/0168692 A1 | 6/2015 | Kitahara | |
| 2015/0177483 A1 | 6/2015 | You | |
| 2015/0301311 A1 | 10/2015 | Chen et al. | |
| 2015/0301312 A1 | 10/2015 | Chen et al. | |
| 2015/0301315 A1 | 10/2015 | Chen et al. | |
| 2015/0316749 A1 | 11/2015 | Chen | |
| 2015/0319389 A1 | 11/2015 | Huang | |
| 2016/0004044 A1 | 1/2016 | Kubota | |
| 2016/0018629 A1 | 1/2016 | Tang et al. | |
| 2016/0033747 A1 | 2/2016 | Tang et al. | |
| 2016/0041369 A1 | 2/2016 | Tang et al. | |
| 2016/0054543 A1 | 2/2016 | Nabeta | |
| 2016/0062081 A1 | 3/2016 | Kubota et al. | |
| 2016/0062105 A1 | 3/2016 | Kawamura et al. | |
| 2016/0077311 A1 | 3/2016 | Tang et al. | |
| 2016/0091694 A1 | 3/2016 | Tang et al. | |
| 2016/0097916 A1 | 4/2016 | Tang et al. | |
| 2016/0103299 A1* | 4/2016 | Lin | G02B 13/0045 359/713 |
| 2016/0103300 A1 | 4/2016 | Tang et al. | |
| 2016/0124185 A1 | 5/2016 | Tang et al. | |
| 2016/0124193 A1 | 5/2016 | Kim et al. | |
| 2016/0131871 A1 | 5/2016 | Tang et al. | |
| 2016/0341928 A1 | 11/2016 | Liu et al. | |
| 2016/0341929 A1 | 11/2016 | Liu et al. | |
| 2016/0341930 A1 | 11/2016 | Liu et al. | |
| 2016/0341931 A1 | 11/2016 | Liu et al. | |
| 2016/0341932 A1 | 11/2016 | Liu et al. | |
| 2016/0341933 A1 | 11/2016 | Liu et al. | |
| 2016/0341934 A1 | 11/2016 | Mercado | |
| 2017/0023769 A1 | 1/2017 | Jo | |
| 2017/0052346 A1 | 2/2017 | Tang et al. | |
| 2017/0052347 A1 | 2/2017 | Tang et al. | |
| 2017/0123187 A1 | 5/2017 | Heu et al. | |
| 2017/0336604 A1* | 11/2017 | Hsu | G02B 13/0045 |
| 2018/0074295 A1* | 3/2018 | Lin | G02B 13/0045 |
| 2018/0095249 A1* | 4/2018 | Hsueh | G02B 27/0025 |
| 2018/0188496 A1* | 7/2018 | Hsieh | G02B 9/62 |
| 2018/0335549 A1* | 11/2018 | Dai | G02B 9/62 |
| 2019/0033560 A1 | 1/2019 | Kubota et al. | |
| 2019/0094497 A1* | 3/2019 | Huang | G02B 13/0045 |
| 2021/0199927 A1* | 7/2021 | Baik | G02B 5/005 |

FOREIGN PATENT DOCUMENTS

| | | | |
|---|---|---|---|
| CN | 105467562 A | 4/2016 | |
| CN | 105572848 A | 5/2016 | |
| JP | S4995533 A | 9/1974 | |
| JP | 57093310 A | 6/1982 | |
| JP | 61-067814 A | 4/1986 | |
| JP | 63052113 A | 3/1988 | |
| JP | H01-266504 A | 10/1989 | |
| JP | 03118509 A | 5/1991 | |
| JP | H06235858 A | 8/1994 | |
| JP | 10282407 A | 10/1998 | |
| JP | 2000330014 A | 11/2000 | |
| JP | 2001194583 A | 7/2001 | |
| JP | 2001194584 A | 7/2001 | |
| JP | 2007052237 A | 3/2007 | |
| JP | 2010145648 A | 7/2010 | |
| JP | 2013238740 A | 11/2013 | |
| JP | 2014-010399 A | 1/2014 | |
| JP | 2014-010400 A | 1/2014 | |
| JP | 2014-010401 A | 1/2014 | |
| JP | 2016136240 A | 7/2016 | |
| TW | 201439584 A * | 10/2014 | G02B 13/0045 |
| WO | 2014-162779 A1 | 10/2014 | |

OTHER PUBLICATIONS

Focal Lengths, Apertures and F/Numbers, 2016, pp. 1-2 [online], [retrieved May 3, 2023], retrieved from the Internet <URL: https://spacemath.gsfc.nasa.gov/weekly/10Page30.pdf>. (Year: 2016).*

5 Considerations for the Mechanical Design, Assembly and Alignment of Optical Systems, 2016, pp. 1-7 [online], [retrieved Oct. 30, 2023], retrieved from the Internet <URL: https://www.laserfocusworld.com/sponsored/.../5-considerations-for-the-mechanical-design-assembly-and-alignment-of-optical-systems>. (Year: 2016).*

Dan Carr, How to Calculate Field of View In Photography, 2016, pp. 1-41 [online], [retrieved May 31, 2024], retrieved from the Internet <URL: https://shuttermuse.com/calculate-field-of-view-camera-lens/>. (Year: 2016).*

\* cited by examiner

OPTICAL IMAGING LENS ASSEMBLY, IMAGE CAPTURING DEVICE AND ELECTRONIC DEVICE

RELATED APPLICATIONS

This application is a continuation of U.S. application Ser. No. 16/380,096, filed on Apr. 10, 2019, now U.S. Pat. No. 11,092,784 issued on Aug. 17, 2021, which is a continuation of U.S. application Ser. No. 15/211,078, filed on Jul. 15, 2016, now U.S. Pat. No. 10,310,223 issued on Jun. 4, 2019, which claims priority to Taiwan Application Serial Number 105111883, filed Apr. 15, 2016, which is herein incorporated by reference.

BACKGROUND

Technical Field

The present disclosure relates to an optical imaging lens assembly and an image capturing device. More particularly, the present disclosure relates to an optical imaging lens assembly and an image capturing device with a compact size applicable to electronic devices.

Description of Related Art

With the popularity of optical lens assembly applications, utilizing optical lens assemblies in various intelligent electronic devices, automobile devices, recognition devices, entertainment devices, sport devices and household intelligent assistance systems is becoming a major trend in developments of future technologies. For obtaining extensive experiences in utilizations of the optical lens assemblies, intelligent devices with one or more optical lens assemblies are the market mainstream, and various lens systems with different features are developed in response to different demands.

In the conventional compact lens assemblies, the imaging effect and the image quality has been relatively limited, and the various image applications are hard to achieve. While conventional imaging systems with high imaging quality usually adopt multi-element lens configuration of spherical glass lens elements, the size of the imaging systems would be too large and cumbersome. Also, the costs of the imaging systems would be too expensive for applications in various devices and products. Hence, optical lens assemblies cannot satisfy the current trend of the technological developments.

SUMMARY

According to one aspect of the present disclosure, an optical imaging lens assembly includes, in order from an object side to an image side, a first lens element, a second lens element, a third lens element, a fourth lens element, a fifth lens element and a sixth lens element. The first lens element has positive refractive power. The second lens element has positive refractive power. The third lens element has negative refractive power. The fourth lens element has an object-side surface and an image-side surface being aspheric. The fifth lens element has an object-side surface and an image-side surface being aspheric. The sixth lens element has an object-side surface and an image-side surface being aspheric, wherein at least one of the object-side surface and the image-side surface of the sixth lens element includes at least one inflection point. The optical imaging lens assembly has a total of six lens elements. When a focal length of the first lens element is f1, a focal length of the second lens element is f2, a focal length of the optical imaging lens assembly is f, a curvature radius of an object-side surface of the third lens element is R5, a curvature radius of an image-side surface of the third lens element is R6, a central thickness of the third lens element is CT3, an axial distance between the image-side surface of the sixth lens element and an image surface is BL, an axial distance between an object-side surface of the first lens element and the image-side surface of the sixth lens element is TD, and a maximum image height of the optical imaging lens assembly is ImgH, the following conditions are satisfied:

$$|f1|<|f2|;$$

$$-10.0<(f/R5)-(f/R6)+(f \times CT3/(R5 \times R6))<-1.7;$$

$$0<BL/TD<0.45; \text{ and}$$

$$0.10<ImgH/f<0.50.$$

According to another aspect of the present disclosure, an image capturing device includes the optical imaging lens assembly of the aforementioned aspect and an image sensor, wherein the image sensor is disposed on the image surface of the optical imaging lens assembly.

According to yet another aspect of the present disclosure, an electronic device includes the image capturing device of the aforementioned aspect.

According to further another aspect of the present disclosure, an optical imaging lens assembly includes, in order from an object side to an image side, a first lens element, a second lens element, a third lens element, a fourth lens element, a fifth lens element and a sixth lens element. The first lens element has positive refractive power. The third lens element has an object-side surface and an image-side surface being aspheric. The fourth lens element has an object-side surface and an image-side surface being aspheric. The fifth lens element has an object-side surface and an image-side surface being aspheric. The sixth lens element has an object-side surface and an image-side surface being aspheric, wherein at least one of the object-side surface and the image-side surface of the sixth lens element includes at least one inflection point. The optical imaging lens assembly has a total of six lens elements, and there is an air space between every two lens elements of the first lens element, the second lens element, the third lens element, the fourth lens element, the fifth lens element and the sixth lens element that are adjacent to each other. At least three lens elements of the first lens element, the second lens element, the third lens element, the fourth lens element, the fifth lens element and the sixth lens element are made of plastic materials. When an entrance pupil diameter of the optical imaging lens assembly is EPD, a maximum image height of the optical imaging lens assembly is ImgH, an axial distance between the image-side surface of the sixth lens element and an image surface is BL, an axial distance between an object-side surface of the first lens element and the image-side surface of the sixth lens element is TD, a refractive index of the first lens element is N1, a refractive index of the second lens element is N2, a refractive index of the third lens element is N3, a refractive index of the fourth lens element is N4, a refractive index of the fifth lens element is N5, and a refractive index of the sixth lens element is N6, a maximum of N1, N2, N3, N4, N5 and N6 is Nmax, the following conditions are satisfied:

$1.25 < EPD/ImgH < 2.0;$ $0 < BL/TD < 0.45;$ and $1.60 < Nmax < 1.72.$

According to still another aspect of the present disclosure, an image capturing device includes the optical imaging lens assembly of the aforementioned aspect and an image sensor, wherein the image sensor is disposed on the image surface of the optical imaging lens assembly.

According to yet another aspect of the present disclosure, an electronic device includes the image capturing device of the aforementioned aspect.

DETAILED DESCRIPTION

Figure 1:
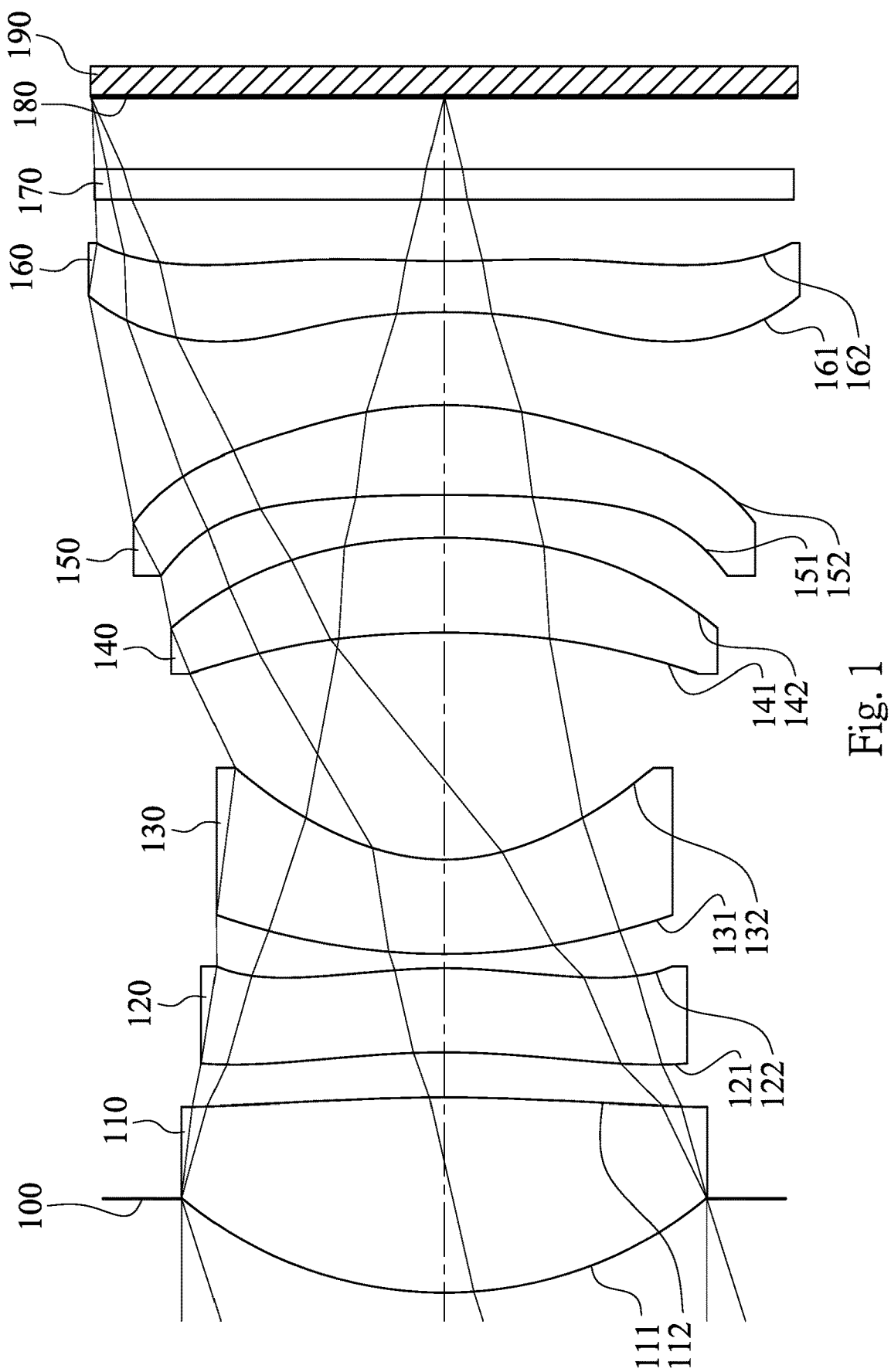
FIG. 1 is a schematic view of an image capturing device according to the 1st embodiment of the present disclosure.

An optical imaging lens assembly includes, in order from an object side to an image side, a first lens element, a second lens element, a third lens element, a fourth lens element, a fifth lens element and a sixth lens element, wherein the optical imaging lens assembly has a total of six lens elements.

According to the optical imaging lens assembly of the present disclosure, there is an air space between every two lens elements of the first lens element, the second lens element, the third lens element, the fourth lens element, the fifth lens element and the sixth lens element that are adjacent to each other. That is, each of the first through sixth lens elements is a single and non-cemented lens element, and every two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element, the fifth lens element and the sixth lens element of the optical imaging lens assembly, there is a space in a paraxial region between every pair of lens elements that are adjacent to each other. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the optical imaging lens assembly. Therefore, according to the optical imaging lens assembly of the present disclosure, having an air space in a paraxial region between every two of the first lens element, the second lens element, the third lens element, the fourth lens element, the fifth lens element and the sixth lens element that are adjacent to each other of the present disclosure avoids the problem generated by the cemented lens elements.

The first lens element with positive refractive power has an object-side surface being convex. Therefore, it is favorable for providing the main converging ability of the incident light in the optical imaging lens assembly, so that the photographing range can be controlled effectively so as to avoid the excessive total track length of the optical imaging lens assembly.

The second lens element can have positive refractive power so as to distribute the converging ability of the incident light of the first lens element. Therefore, excessive aberrations can be avoided with a proper curvature of the lens element, and the sensitivity to the object distance of the optical imaging lens assembly can be reduced.

The third lens element can have negative refractive power, so that the size of image points converged from incident light with different wavelengths can be reduced, and aberrations of the object side and the image side of the optical imaging lens assembly can be balanced.

The fourth lens element can have an object-side surface being concave and an image-side surface being convex. Therefore, it is favorable for enhancing the ability for correcting the coma aberration.

The sixth lens element can have negative refractive power, and at least one of the object-side surface and the image-side surface of the sixth lens element can be concave in a paraxial region thereof and include at least one convex shape in an off-axial region thereof. Therefore, it is favorable for positioning the principal point closer to the object side so as to reduce the back focal length and avoid the excessive total track length, and it is also favorable for correcting the off-axial aberration so as to enhancing the image quality. Furthermore, at least one of the object-side surface and the image-side surface of the sixth lens element includes at least one inflection point, so that it is favorable for correcting off-axial aberrations so as to obtain high image quality with a large aperture.

When an axial distance between the image-side surface of the sixth lens element and an image surface is BL, and an axial distance between an object-side surface of the first lens element and the image-side surface of the sixth lens element is TD, the following condition is satisfied: 0<BL/TD<0.45. Therefore, it is favorable for obtaining the compact size of the optical imaging lens assembly by effectively controlling the back focal length thereof. Preferably, the following condition can be satisfied: 0<BL/TD<0.25.

When a focal length of the first lens element is f1, and a focal length of the second lens element is f2, the following condition is satisfied: |f1|<|f2|. Therefore, it is favorable for utilizing the telephoto characteristic by enhancing the light converging ability on the object side.

When a focal length of the optical imaging lens assembly is f, a curvature radius of an object-side surface of the third lens element is R5, a curvature radius of an image-side surface of the third lens element is R6, and a central thickness of the third lens element is CT3, the following condition is satisfied: −10.0<(f/R5)−(f/R6)+(f×CT3/(R5×R6))<−1.7. Therefore, it is favorable for balancing aberrations of the object side and the image side of the optical imaging lens assembly so as to enhance the sharpness and clarity of the image. Preferably, the following condition can be satisfied: −6.0<(f/R5)−(f/R6)+(f×CT3/(R5×R6))<−2.3.

When the focal length of the optical imaging lens assembly is f, and a maximum image height of the optical imaging lens assembly is ImgH, the following condition is satisfied: 0.10<ImgH/f<0.50. Therefore, it is favorable for obtaining the telephoto structure and suppressing the formation of distortion effectively, so that the optical imaging lens assembly can be utilized widely. Preferably, the following condition can be satisfied: 0.10<ImgH/f<0.40.

When an entrance pupil diameter of the optical imaging lens assembly is EPD, and the maximum image height of the optical imaging lens assembly is ImgH, the following condition is satisfied: 1.25<EPD/ImgH<2.0. Therefore, it is favorable for obtaining the sufficient image illumination by effectively controlling the light into the optical imaging lens assembly. Preferably, the following condition can be satisfied: 1.35<EPD/ImgH<2.0.

When a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, and a maximum of N1, N2, N3, N4, N5 and N6 is Nmax, the following condition is satisfied: 1.60<Nmax<1.72. Therefore, it is favorable for configuring the lens elements of the entire optical imaging lens assembly so as to provide the balancing ability of aberrations.

When a central thickness of the first lens element is CT1, and a central thickness of the second lens element is CT2, the following condition is satisfied: 1.0<CT1/CT2<7.0. Therefore, it is favorable for strengthening the optical imaging lens assembly against possible hazards of the external environment along with an easier maintenance so as to increase the durability thereof.

The optical imaging lens assembly can further include an aperture stop disposed between an imaged object and the second lens element. When an axial distance between the aperture stop and the image surface is SL, and an axial distance between the object-side surface of the first lens element and the image surface is TL, the following condition is satisfied: 0.78<SL/TL<1.10. Therefore, it is favorable for balancing the position of the aperture stop and configuring the compact size of the optical imaging lens assembly and the image illumination.

The aperture stop can be located along an optical axis between a center of the object-side surface of the first lens element on the optical axis and a location of a maximum effective radius of the object-side surface of the first lens element projected on the optical axis. Therefore, both of the compact size and high illumination of the optical imaging lens assembly can be obtained within limited space.

When an Abbe number of the third lens element is V3, the following condition is satisfied: V3<25.0. Therefore, the chromatic aberration of the optical imaging lens assembly can be corrected for condensed image points converged from incident light with different wavelengths.

When half of a maximum field of view of the optical imaging lens assembly is HFOV, the following condition is satisfied: 0.20<tan(2×HFOV)<1.0. Therefore, it is favorable for controlling the photographing range effectively so as to enhance the identification ability and broaden the field of application thereof. Preferably, the following condition can be satisfied: 0.20<tan(2×HFOV)<0.85.

When the curvature radius of the image-side surface of the third lens element is R6, and the focal length of the optical imaging lens assembly is f, the following condition is satisfied: 0<R6/f<0.45. Therefore, it is favorable for controlling the angle of the exiting light from the third lens element and providing the sufficient divergent ability to the third lens element so as to balance the light convergence on the object side of the optical imaging lens assembly.

When a curvature radius of the object-side surface of the sixth lens element is R11, and a curvature radius of the image-side surface of the sixth lens element is R12, the following condition is satisfied: |R11/R12|<1.30. Therefore, it is favorable for adjusting curved images and correcting the Petzval surface so as to increase the clarity in the off-axial region of image.

When the curvature radius of the object-side surface of the third lens element is R5, and the curvature radius of the image-side surface of the third lens element is R6, the following condition is satisfied: 0.50<(R5+R6)/(R5−R6)<2.50. Therefore, the shape of the third lens element can be controlled so as to improve the light divergent ability on the image side; by such arrangement, the optical imaging lens assembly can be formed into a symmetrical structure for enhancing the image quality.

When the focal length of the optical imaging lens assembly is f, and a focal length of the third lens element is f3, the following condition is satisfied: −4.0<f/f3<−1.5. Therefore, it is favorable for balancing the light divergent ability of the optical imaging lens assembly and providing the telephoto characteristic with the configuration of the first lens element and the second lens element.

When the focal length of the optical imaging lens assembly is f, and the focal length of the first lens element is f1, the following condition is satisfied: 1.0<f/f1<3.0. Therefore, it is favorable for controlling the refractive power of the first lens element so as to avoid insufficient convergence of light by weaker refractive power, or excessive spherical aberration by stronger refractive power.

At least three surfaces of object-side surfaces and image-side surfaces of the first lens element, the second lens element, the third lens element, the fourth lens element, the fifth lens element and the sixth lens element include at least one inflection point thereon. Therefore, aberrations in the off-axial region can be corrected effectively.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following condition is satisfied: 2.0<(T34+T56)/(T12+T23+T45)<10.0. Therefore, it is favorable for assembling the optical imaging lens assembly by controlling the space between any two lens elements adjacent to each other so as to balance the space arrangement of the optical imaging lens assembly.

When a maximum effective radius of the object-side surface of the first lens element is Y11, and a maximum effective radius of the image-side surface of the sixth lens element is Y62, the following condition is satisfied: 0.70<Y11/Y62<1.10. Therefore, it is favorable for increasing the symmetry of two ends of the optical imaging lens assembly, and ensuring the optical imaging lens assembly with sufficient image illumination.

When an axial distance between the object-side surface of the first lens element and the image surface is TL, and the focal length of the optical imaging lens assembly is f, the following condition is satisfied: TL/f≤1.20. Therefore, it is favorable for forming the compact size optical imaging lens assembly with a telephoto structure.

When the focal length of the second lens element is f2, a focal length of the third lens element is f3, a focal length of the fourth lens element is f4, a focal length of the fifth lens element is f5, and a focal length of the sixth lens element is f6, the following conditions are satisfied: |f3|<|f2|; |f3|<|f4|; |f3|<|f5|; and |f3|<|f6|. Therefore, it is favorable for strengthening the light controlling ability of the middle part of the optical imaging lens assembly, so that the refractive power of the object side and the image side thereof can be balanced for applying to different demands.

When a central thickness of the first lens element is CT1, a central thickness of the second lens element is CT2, the central thickness of the third lens element is CT3, a central thickness of the fourth lens element is CT4, a central thickness of the fifth lens element is CT5, and a central thickness of the sixth lens element is CT6, CT1 is a maximum among CT1, CT2, CT3, CT4, CT5 and CT6. Therefore, it is favorable for increasing the resistance against the environment hazards of the optical imaging lens assembly so as to increase the adaptability against the collision impact and temperature variation for different applications.

When an axial distance between the object-side surface of the first lens element and the image surface is TL, and the maximum image height of the optical imaging lens assembly is ImgH, the following condition is satisfied: 2.2<TL/ImgH<4.0. Therefore, it is favorable for adjusting the ratio of the total track length and the image height of the optical imaging lens assembly for various applications.

When the focal length of the optical imaging lens assembly is f, and the entrance pupil diameter of the optical imaging lens assembly is EPD, the following condition is satisfied: 1.25<f/EPD<2.30. Therefore, it is favorable for increasing the image illumination by increasing the coverage of imaging fields of the optical imaging lens assembly.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, T34 is a maximum among T12, T23, T34, T45 and T56. Therefore, it is favorable for enhancing the symmetry of the optical imaging lens assembly by balancing the space arrangement thereof.

According to the optical imaging lens assembly of the present disclosure, the lens elements thereof can be made of glass or plastic materials. When the lens elements are made of glass materials, the distribution of the refractive power of the optical imaging lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical imaging lens assembly. Therefore, the total track length of the optical imaging lens assembly can also be reduced.

According to the optical imaging lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the optical imaging lens assembly of the present disclosure, the refractive power or the focal length of a lens element being positive or negative may refer to the refractive power or the focal length in a paraxial region of the lens element.

According to the optical imaging lens assembly of the present disclosure, the optical imaging lens assembly can include at least one stop, such as an aperture stop, a glare stop or a field stop. Said glare stop or said field stop is for eliminating the stray light and thereby improving the image resolution thereof.

According to the optical imaging lens assembly of the present disclosure, the image surface of the optical imaging lens assembly, based on the corresponding image sensor, can be flat or curved. In particular, the image surface can be a curved surface being concave facing towards the object side.

According to the optical imaging lens assembly of the present disclosure, an aperture stop can be configured as a middle stop. A middle stop disposed between the first lens element and the image surface is favorable for enlarging the field of view of the optical imaging lens assembly and thereby provides a wider field of view for the same.

According to the optical imaging lens assembly of the present disclosure, the optical imaging lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned optical imaging lens assembly and an image sensor, wherein the image sensor is disposed on the image side of the aforementioned optical imaging lens assembly, that is, the image sensor can be disposed on or near the image surface of the aforementioned optical imaging lens assembly. By the arrangement of the aforementioned optical imaging lens assembly including the first lens element with positive refractive power, it is favorable providing the main converging ability of the incident light in the optical imaging lens assembly, so that the photographing range can be controlled effectively so as to avoid the excessive total track length of the optical imaging lens assembly. With the sixth lens element including the inflection point on the surface, it is favorable for correcting off-axial aberrations so as to obtain high quality under the large aperture characteristic. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-16th specific embodiments are provided for further explanation.

1st Embodiment

Figure 2:
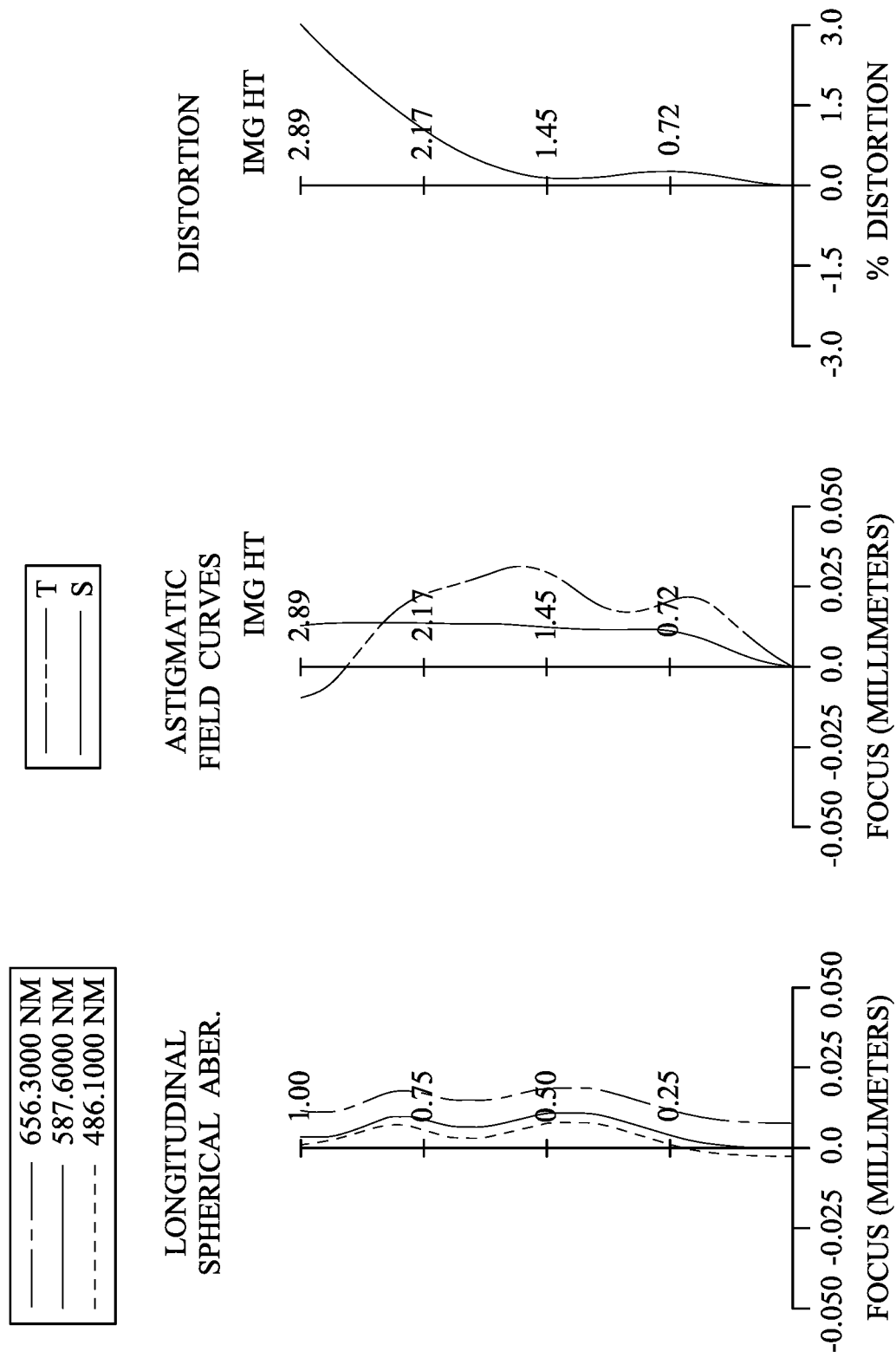
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an optical imaging lens assembly (its reference numeral is omitted) and an image sensor 190. The optical imaging lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the image sensor 190 is disposed on the image surface 180 of the optical imaging lens assembly. The optical imaging lens assembly has a total of six lens elements (110-160), and there is an air space between every two lens elements of the first lens element 110, the second lens element 120, the third lens element 130, the fourth lens element 140, the fifth lens element 150 and the sixth lens element 160 that are adjacent to each other.

The first lens element 110 with positive refractive power has an object-side surface 111 being convex and an image-side surface 112 being convex. The first lens element 110 is made of a plastic material, and has the object-side surface 111 and the image-side surface 112 being both aspheric. Furthermore, the image-side surface 112 of the first lens element 110 includes at least one inflection point.

The second lens element 120 with positive refractive power has an object-side surface 121 being concave and an image-side surface 122 being convex. The second lens element 120 is made of a plastic material, and has the object-side surface 121 and the image-side surface 122 being both aspheric. Furthermore, both of the object-side surface 121 and the image-side surface 122 of the second lens element 120 include at least one inflection point.

The third lens element 130 with negative refractive power has an object-side surface 131 being convex and an image-side surface 132 being concave. The third lens element 130 is made of a plastic material, and has the object-side surface 131 and the image-side surface 132 being both aspheric. Furthermore, the object-side surface 131 of the third lens element 130 includes at least one inflection point.

The fourth lens element 140 with positive refractive power has an object-side surface 141 being concave and an image-side surface 142 being convex. The fourth lens element 140 is made of a plastic material, and has the object-side surface 141 and the image-side surface 142 being both aspheric.

The fifth lens element 150 with positive refractive power has an object-side surface 151 being concave and an image-side surface 152 being convex. The fifth lens element 150 is made of a plastic material, and has the object-side surface 151 and the image-side surface 152 being both aspheric.

The sixth lens element 160 with negative refractive power has an object-side surface 161 being concave in a paraxial region thereof and an image-side surface 162 being concave in a paraxial region thereof. The sixth lens element 160 is made of a plastic material, and has the object-side surface 161 and the image-side surface 162 being both aspheric. Furthermore, the object-side surface 161 of the sixth lens element 160 includes at least one convex shape in an off-axial region thereof, the image-side surface 162 of the sixth lens element 160 includes at least one convex shape in an off-axial region thereof, and both of the object-side surface 161 and the image-side surface 162 of the sixth lens element 160 include at least one inflection point.

The aperture stop 100 is located along an optical axis between a center of the object-side surface 111 of the first lens element 110 on the optical axis and a location of a maximum effective radius of the object-side surface 111 of the first lens element 110 projected on the optical axis.

The IR-cut filter 170 is made of a glass material and located between the sixth lens element 160 and the image surface 180, and will not affect the focal length of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical imaging lens assembly according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=8.84 mm; Fno=2.06; and HFOV=17.6 degrees.

In the optical imaging lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, and a maximum of N1, N2, N3, N4, N5 and N6 is Nmax (according to the 1st embodiment, the maximum is N3), the following condition is satisfied: Nmax=1.660.

In the optical imaging lens assembly according to the 1st embodiment, when an Abbe number of the third lens element 130 is V3, the following condition is satisfied: V3=20.4.

In the optical imaging lens assembly according to the 1st embodiment, when a central thickness of the first lens element 110 is CT1, and a central thickness of the second lens element 120 is CT2, the following condition is satisfied: CT1/CT2=2.32.

In the optical imaging lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following condition is satisfied: (T34+T56)/(T12+T23+T45)=3.14.

In the optical imaging lens assembly according to the 1st embodiment, when a curvature radius of the image-side surface 132 of the third lens element 130 is R6, and the focal length of the optical imaging lens assembly is f, the following condition is satisfied: R6/f=0.19.

In the optical imaging lens assembly according to the 1st embodiment, when the curvature radius of the object-side surface 131 of the third lens element 130 is R5, a curvature radius of the image-side surface 132 of the third lens element 130 is R6, the following condition is satisfied: (R5+R6)/(R5−R6)=1.75.

In the optical imaging lens assembly according to the 1st embodiment, when a curvature radius of the object-side surface 161 of the sixth lens element 160 is R11, and a curvature radius of the image-side surface 162 of the sixth lens element 160 is R12, the following condition is satisfied: |R11/R12|=0.63.

In the optical imaging lens assembly according to the 1st embodiment, when the focal length of the optical imaging lens assembly is f, and a focal length of the first lens element 110 is f1, the following condition is satisfied: f/f1=1.68.

In the optical imaging lens assembly according to the 1st embodiment, when the focal length of the optical imaging lens assembly is f, and a focal length of the third lens element 130 is f3, the following condition is satisfied: f/f3=−2.30.

In the optical imaging lens assembly according to the 1st embodiment, when the focal length of the optical imaging lens assembly is f, the curvature radius of the object-side surface 131 of the third lens element 130 is R5, the curvature radius of the image-side surface 132 of the third lens element 130 is R6, and a central thickness of the third lens element 130 is CT3, the following condition is satisfied: (f/R5)−(f/R6)+(f×CT3/(R5×R6))=−3.12.

In the optical imaging lens assembly according to the 1st embodiment, when a maximum effective radius of the object-side surface 111 of the first lens element 110 is Y11, and a maximum effective radius of the image-side surface 162 of the sixth lens element 160 is Y62, the following condition is satisfied: Y11/Y62=0.76.

In the optical imaging lens assembly according to the 1st embodiment, when half of a maximum field of view of the optical imaging lens assembly is HFOV, the following condition is satisfied: tan(2×HFOV)=0.71.

In the optical imaging lens assembly according to the 1st embodiment, when an axial distance between the aperture stop 100 and the image surface 180 is SL, and an axial distance between the object-side surface 111 of the first lens element 110 and the image surface 180 is TL, the following condition is satisfied: SL/TL=0.92.

In the optical imaging lens assembly according to the 1st embodiment, when an axial distance between the image-side surface 162 of the sixth lens element 160 and an image surface 180 is BL, and an axial distance between an object-side surface 111 of the first lens element 110 and the image-side surface 162 of the sixth lens element 160 is TD, the following condition is satisfied: BL/TD=0.16.

In the optical imaging lens assembly according to the 1st embodiment, when the focal length of the optical imaging lens assembly is f, and an entrance pupil diameter of the optical imaging lens assembly is EPD, the following condition is satisfied: f/EPD=2.06.

In the optical imaging lens assembly according to the 1st embodiment, when the entrance pupil diameter of the optical imaging lens assembly is EPD, and a maximum image height of the optical imaging lens assembly is ImgH (half of a diagonal length of an effective photosensitive area of the image sensor 190), the following condition is satisfied: EPD/ImgH=1.48.

In the optical imaging lens assembly according to the 1st embodiment, when an axial distance between the object-side surface 111 of the first lens element 110 and the image surface 180 is TL, and the maximum image height of the optical imaging lens assembly is ImgH, the following condition is satisfied: TL/ImgH=3.39.

In the optical imaging lens assembly according to the 1st embodiment, when the maximum image height of the optical imaging lens assembly is ImgH, and the focal length of the optical imaging lens assembly is f, the following condition is satisfied: ImgH/f=0.33.

In the optical imaging lens assembly according to the 1st embodiment, when the axial distance between the object-side surface 111 of the first lens element 110 and the image surface 180 is TL, and the focal length of the optical imaging lens assembly is f, the following condition is satisfied: TL/f=1.11.

In the optical imaging lens assembly according to the 1st embodiment, when the focal length of the first lens element 110 is f1, a focal length of the second lens element 120 is f2, the focal length of the third lens element 130 is f3, a focal length of the fourth lens element 140 is f4, a focal length of the fifth lens element 150 is f5, and a focal length of the sixth lens element 160 is f6, the following conditions are satisfied: |f1|<|f2|; |f3|<|f2|; |f3|<|f4|; |f3|<|f5|; and |f3|<|f6|.

In the optical imaging lens assembly according to the 1st embodiment, when the central thickness of the first lens element 110 is CT1, the central thickness of the second lens element 120 is CT2, the central thickness of the third lens element 130 is CT3, a central thickness of the fourth lens element 140 is CT4, a central thickness of the fifth lens element 150 is CT5, and a central thickness of the sixth lens element 160 is CT6, CT1 is a maximum among CT1, CT2, CT3, CT4, CT5 and CT6.

In the optical imaging lens assembly according to the 1st embodiment, when the axial distance between the first lens element 110 and the second lens element 120 is T12, the axial distance between the second lens element 120 and the third lens element 130 is T23, the axial distance between the third lens element 130 and the fourth lens element 140 is T34, the axial distance between the fourth lens element 140 and the fifth lens element 150 is T45, the axial distance between the fifth lens element 150 and the sixth lens element 160 is T56, and T34 is a maximum among T12, T23, T34, T45 and T56.

The detailed optical data of the 1st embodiment are shown in Table 1 and the aspheric surface data are shown in Table 2 below.

TABLE 1

1st Embodiment
f = 8.84 mm, Fno = 2.06, HFOV = 17.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.770 | | | | |
| 2 | Lens 1 | 3.386 | ASP | 1.600 | Plastic | 1.544 | 55.9 | 5.25 |
| 3 | | −15.206 | ASP | 0.369 | | | | |
| 4 | Lens 2 | −7.436 | ASP | 0.691 | Plastic | 1.639 | 23.3 | 16.62 |
| 5 | | −4.532 | ASP | 0.116 | | | | |
| 6 | Lens 3 | 6.319 | ASP | 0.770 | Plastic | 1.660 | 20.4 | −3.84 |
| 7 | | 1.720 | ASP | 1.860 | | | | |
| 8 | Lens 4 | −8.426 | ASP | 0.778 | Plastic | 1.639 | 23.3 | 19.89 |
| 9 | | −5.248 | ASP | 0.351 | | | | |
| 10 | Lens 5 | −28.389 | ASP | 0.733 | Plastic | 1.544 | 55.9 | 7.84 |
| 11 | | −3.739 | ASP | 0.764 | | | | |
| 12 | Lens 6 | −6.139 | ASP | 0.420 | Plastic | 1.515 | 56.5 | −7.24 |
| 13 | | 9.687 | ASP | 0.500 | | | | |
| 14 | IR-cut filter | Plano | | 0.250 | Glass | 1.517 | 64.2 | — |
| 15 | | Plano | | 0.597 | | | | |
| 16 | Image | Plano | | — | | | | |

Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | 8.6138E−03 | 4.1097E+01 | −5.9947E+01 | −2.7957E+01 | −2.0074E+00 | −1.1345E+00 |
| A4 = | 2.3021E−04 | 2.8945E−03 | −1.4134E−02 | 2.4031E−02 | 2.6499E−02 | −2.6953E−02 |
| A6 = | −5.2824E−05 | 3.2183E−03 | 1.8565E−02 | −5.5954E−03 | −2.2342E−02 | 1.2891E−02 |
| A8 = | 7.7831E−05 | −1.3479E−03 | −9.1350E−03 | 2.6970E−03 | 1.0755E−02 | −4.1413E−03 |
| A10 = | −1.9980E−05 | 2.4749E−04 | 2.4680E−03 | −1.2090E−03 | −3.2868E−03 | 9.5536E−04 |
| A12 = | 1.6017E−06 | −1.5101E−05 | −3.2979E−04 | 3.8569E−04 | 6.1492E−04 | −9.9580E−05 |
| A14 = | | | 1.6722E−05 | −4.4520E−05 | −5.1833E−05 | |

| Surface # | 8 | 9 | 10 | 11 | 12 | 13 |
|---|---|---|---|---|---|---|
| k = | −7.6213E+00 | −4.3868E+01 | −8.6898E+01 | 7.8643E−01 | 1.9169E+00 | 8.7890E+00 |
| A4 = | −1.1887E−02 | −5.9339E−02 | −3.9410E−02 | −1.1801E−02 | −4.5210E−02 | −5.6202E−02 |
| A6 = | 2.0663E−03 | 3.3881E−02 | 2.7684E−02 | 1.4268E−02 | 3.0565E−02 | 1.8784E−02 |
| A8 = | −1.9106E−04 | −1.6041E−02 | −1.1345E−02 | −2.5604E−03 | −7.1295E−03 | −3.4194E−03 |
| A10 = | 2.5400E−05 | 4.6560E−03 | 2.2039E−03 | −2.8577E−04 | 9.3689E−04 | 4.0686E−04 |
| A12 = | −2.4212E−06 | −7.9052E−04 | −2.3623E−04 | 1.4197E−04 | −7.1385E−05 | −3.4449E−05 |
| A14 = | | 7.1981E−05 | 1.3807E−05 | −1.6492E−05 | 2.9405E−06 | 2.0294E−06 |
| A16 = | | −2.6867E−06 | −3.6334E−07 | 6.5982E−07 | −4.9555E−08 | −6.0823E−08 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, according to the 1st embodiment, a number of inflection points of each of the object-side surfaces (111, 121, 131, 141, 151, 161) and the image-side surfaces (112, 122, 132, 142, 152, 162) of the first lens element 110, the second lens element 120, the third lens element 130, the fourth lens element 140, the fifth lens element 150 and the sixth lens element 160 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 111 | 112 | 121 | 122 | 131 | 132 |
| Number of reflection point(s) | 0 | 2 | 1 | 1 | 1 | 0 |

| Lens element | Fourth | | Fifth | | Sixth | |
|---|---|---|---|---|---|---|
| Surface | 141 | 142 | 151 | 152 | 161 | 162 |
| Number of reflection point(s) | 0 | 0 | 0 | 0 | 1 | 2 |

2nd Embodiment

Figure 3:
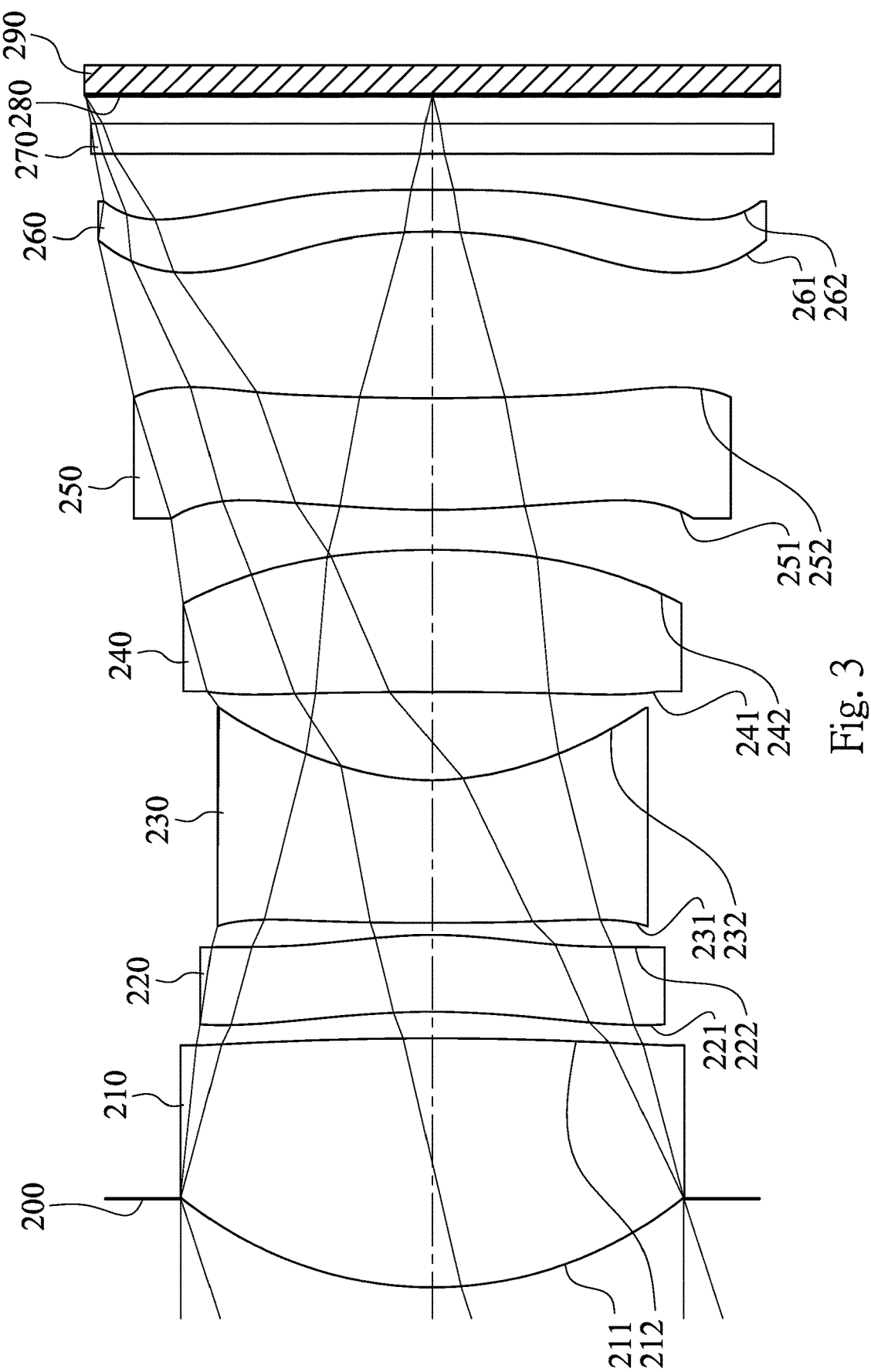
FIG. 3 is a schematic view of an image capturing device according to the 2nd embodiment of the present disclosure.
Figure 4:
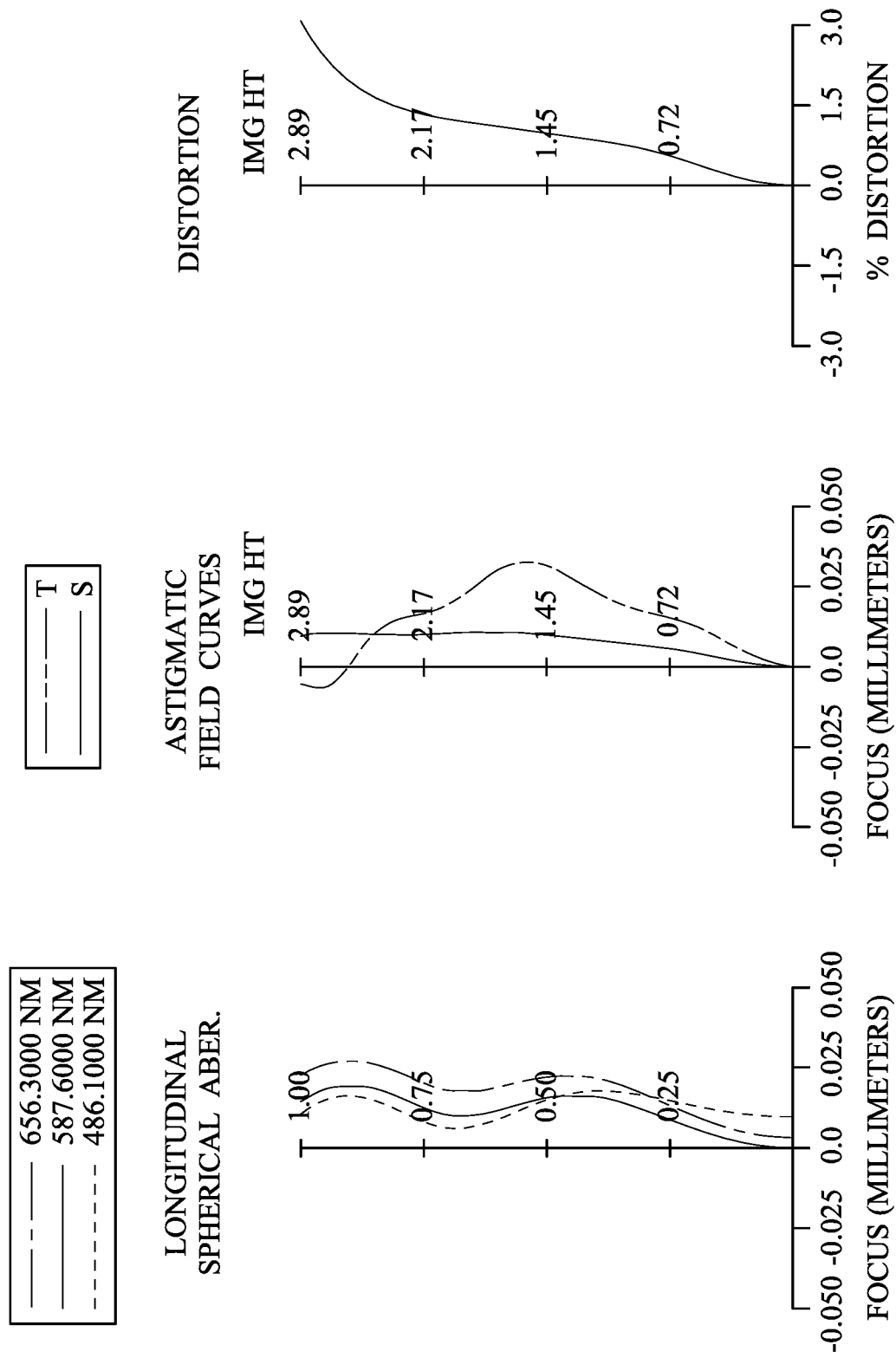
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an optical imaging lens assembly (its reference numeral is omitted) and an image sensor 290. The optical imaging lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280, wherein the image sensor 290 is disposed on the image surface 280 of the optical imaging lens assembly. The optical imaging lens assembly has a total of six lens elements (210-260), and there is an air space between every two lens elements of the first lens element 210, the second lens element 220, the third lens element 230, the fourth lens element 240, the fifth lens element 250 and the sixth lens element 260 that are adjacent to each other.

The first lens element 210 with positive refractive power has an object-side surface 211 being convex and an image-side surface 212 being convex. The first lens element 210 is made of a plastic material, and has the object-side surface 211 and the image-side surface 212 being both aspheric. Furthermore, the image-side surface 212 of the first lens element 210 includes at least one inflection point.

The second lens element 220 with positive refractive power has an object-side surface 221 being concave and an image-side surface 222 being convex. The second lens element 220 is made of a plastic material, and has the object-side surface 221 and the image-side surface 222 being both aspheric. Furthermore, both of the object-side surface 221 and the image-side surface 222 of the second lens element 220 include at least one inflection point.

The third lens element 230 with negative refractive power has an object-side surface 231 being convex and an image-side surface 232 being concave. The third lens element 230 is made of a plastic material, and has the object-side surface 231 and the image-side surface 232 being both aspheric. Furthermore, the object-side surface 231 of the third lens element 230 includes at least one inflection point.

The fourth lens element 240 with positive refractive power has an object-side surface 241 being concave and an image-side surface 242 being convex. The fourth lens element 240 is made of a plastic material, and has the object-side surface 241 and the image-side surface 242 being both aspheric. Furthermore, both of the object-side surface 241 and the image-side surface 242 of the fourth lens element 240 include at least one inflection point.

The fifth lens element 250 with positive refractive power has an object-side surface 251 being convex and an image-side surface 252 being concave. The fifth lens element 250 is made of a plastic material, and has the object-side surface 251 and the image-side surface 252 being both aspheric. Furthermore, both of the object-side surface 251 and the image-side surface 252 of the fifth lens element 250 include at least one inflection point.

The sixth lens element 260 with negative refractive power has an object-side surface 261 being concave in a paraxial region thereof and an image-side surface 262 being convex in a paraxial region thereof. The sixth lens element 260 is made of a plastic material, and has the object-side surface 261 and the image-side surface 262 being both aspheric. Furthermore, the object-side surface 261 of the sixth lens element 260 includes at least one convex shape in an off-axial region thereof, and both of the object-side surface 261 and the image-side surface 262 of the sixth lens element 260 include at least one inflection point.

The aperture stop 200 is located along an optical axis between a center of the object-side surface 211 of the first lens element 210 on the optical axis and a location of a maximum effective radius of the object-side surface 211 of the first lens element 210 projected on the optical axis.

The IR-cut filter 270 is made of a glass material and located between the sixth lens element 260 and the image surface 280, and will not affect the focal length of the optical imaging lens assembly.

The detailed optical data of the 2nd embodiment are shown in Table 3 and the aspheric surface data are shown in Table 4 below.

TABLE 3

2nd Embodiment
f = 8.61 mm, Fno = 2.06, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.740 | | | | |
| 2 | Lens 1 | 3.262 | ASP | 2.072 | Plastic | 1.544 | 55.9 | 5.62 |
| 3 | | −37.805 | ASP | 0.221 | | | | |
| 4 | Lens 2 | −7.027 | ASP | 0.643 | Plastic | 1.583 | 30.2 | 13.41 |
| 5 | | −3.826 | ASP | 0.100 | | | | |
| 6 | Lens 3 | 122.570 | ASP | 1.184 | Plastic | 1.660 | 20.4 | −3.52 |
| 7 | | 2.273 | ASP | 0.736 | | | | |
| 8 | Lens 4 | −71.824 | ASP | 1.181 | Plastic | 1.639 | 23.3 | 14.34 |
| 9 | | −8.178 | ASP | 0.334 | | | | |
| 10 | Lens 5 | 6.632 | ASP | 0.927 | Plastic | 1.544 | 55.9 | 20.95 |
| 11 | | 15.095 | ASP | 1.384 | | | | |
| 12 | Lens 6 | −5.816 | ASP | 0.350 | Plastic | 1.515 | 56.5 | −12.95 |
| 13 | | −46.555 | ASP | 0.300 | | | | |
| 14 | IR-cut filter | Plano | | 0.250 | Glass | 1.517 | 64.2 | — |
| 15 | | Plano | | 0.240 | | | | |
| 16 | Image | Plano | | — | | | | |

Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | −3.1257E−02 | 9.0000E+01 | −6.0070E+01 | −2.0175E+01 | −9.0000E+01 | −1.1379E+00 |
| A4 = | −2.8001E−05 | −3.5479E−03 | −1.4440E−02 | 2.7965E−02 | 2.8689E−02 | −2.6713E−02 |
| A6 = | −6.5218E−05 | 2.9064E−03 | 1.8370E−02 | −5.5236E−03 | −2.2599E−02 | 1.2987E−02 |
| A8 = | 2.2454E−05 | −1.3773E−03 | −9.0414E−03 | 2.1520E−03 | 1.0025E−02 | −4.0285E−03 |
| A10 = | −6.8038E−06 | 3.1348E−04 | 2.4589E−03 | −1.2847E−03 | −3.4614E−03 | 7.4954E−04 |
| A12 = | 3.8956E−07 | −2.4286E−05 | −3.3823E−04 | 3.5839E−04 | 6.5223E−04 | −5.1977E−05 |
| A14 = | | | 1.8876E−05 | −3.8723E−05 | −5.4078E−05 | |

| Surface # | 8 | 9 | 10 | 11 | 12 | 13 |
|---|---|---|---|---|---|---|
| k = | −9.0000E+01 | −9.0000E+01 | −2.7743E+01 | −9.0000E+01 | 2.7534E+00 | −9.0000E+01 |
| A4 = | −7.5320E−03 | −5.2412E−02 | −3.7551E−02 | −2.0008E−02 | −5.3672E−02 | −4.7078E−02 |
| A6 = | 3.5141E−03 | 3.3245E−02 | 2.8680E−02 | 1.3945E−02 | 3.1409E−02 | 1.7479E−02 |
| A8 = | −4.2878E−04 | −1.5927E−02 | −1.1324E−02 | −2.5014E−03 | −7.0359E−03 | −3.3427E−03 |
| A10 = | 1.8116E−05 | 4.6479E−03 | 2.1909E−03 | −2.8245E−04 | 9.3463E−04 | 3.9573E−04 |
| A12 = | 1.3500E−05 | −7.9699E−04 | −2.3979E−04 | 1.4128E−04 | −7.2032E−05 | −3.0902E−05 |
| A14 = | | 7.1594E−05 | 13569E−05 | −1.6771E−05 | 2.9306E−06 | 2.1490E−06 |
| A16 = | | −2.3265E−06 | −2.4975E−07 | 6.7391E−07 | −4.2257E−08 | −9.2542E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 8.61 | f/f3 | −2.45 |
| Fno | 2.06 | (f/R5) − (f/R6) + (f × CT3/(R5 × R6)) | −3.68 |
| HFOV [deg.] | 18.0 | Y11/Y62 | 0.77 |
| Nmax | 1.660 | tan (2 × HFOV) | 0.73 |
| V3 | 20.4 | SL/TL | 0.93 |
| CT1/CT2 | 3.22 | BL/TD | 0.09 |
| (T34 + T56)/(T12 + T23 + T45) | 3.24 | f/EPD | 2.06 |
| R6/f | 0.26 | EPD/ImgH | 1.45 |
| (R5 + R6)/(R5 − R6) | 1.04 | TL/ImgH | 3.43 |
| |R11/R12| | 0.12 | ImgH/f | 0.34 |
| f/f1 | 1.53 | TL/f | 1.15 |

Furthermore, in the optical imaging lens assembly according to the 2nd embodiment, when a focal length of the first lens element 210 is f1, a focal length of the second lens element 220 is f2, a focal length of the third lens element 230 is f3, a focal length of the fourth lens element 240 is f4, a focal length of the fifth lens element 250 is f5, and a focal length of the sixth lens element 260 is f6, the following conditions are satisfied: |f1|<|f2|; |f3|<|f2|; |f3|<|f4|; |f3|<|f5|; and |f3|<|f6|.

In the optical imaging lens assembly according to the 2nd embodiment, when a central thickness of the first lens element 210 is CT1, a central thickness of the second lens element 220 is CT2, a central thickness of the third lens element 230 is CT3, a central thickness of the fourth lens element 240 is CT4, a central thickness of the fifth lens element 250 is CT5, and a central thickness of the sixth lens element 260 is CT6, CT1 is a maximum among CT1, CT2, CT3, CT4, CT5 and CT6.

According to the 2nd embodiment, a number of inflection points of each of the object-side surfaces (211, 221, 231, 241, 251, 261) and the image-side surfaces (212, 222, 232, 242, 252, 262) of the first lens element 210, the second lens element 220, the third lens element 230, the fourth lens element 240, the fifth lens element 250 and the sixth lens element 260 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 211 | 212 | 221 | 222 | 231 | 232 |
| Number of reflection point(s) | 0 | 1 | 1 | 2 | 1 | 0 |
| Lens element | Fourth | | Fifth | | Sixth | |
| Surface | 241 | 242 | 251 | 252 | 261 | 262 |
| Number of reflection point(s) | 1 | 1 | 1 | 1 | 1 | 1 |

3rd Embodiment

Figure 5:
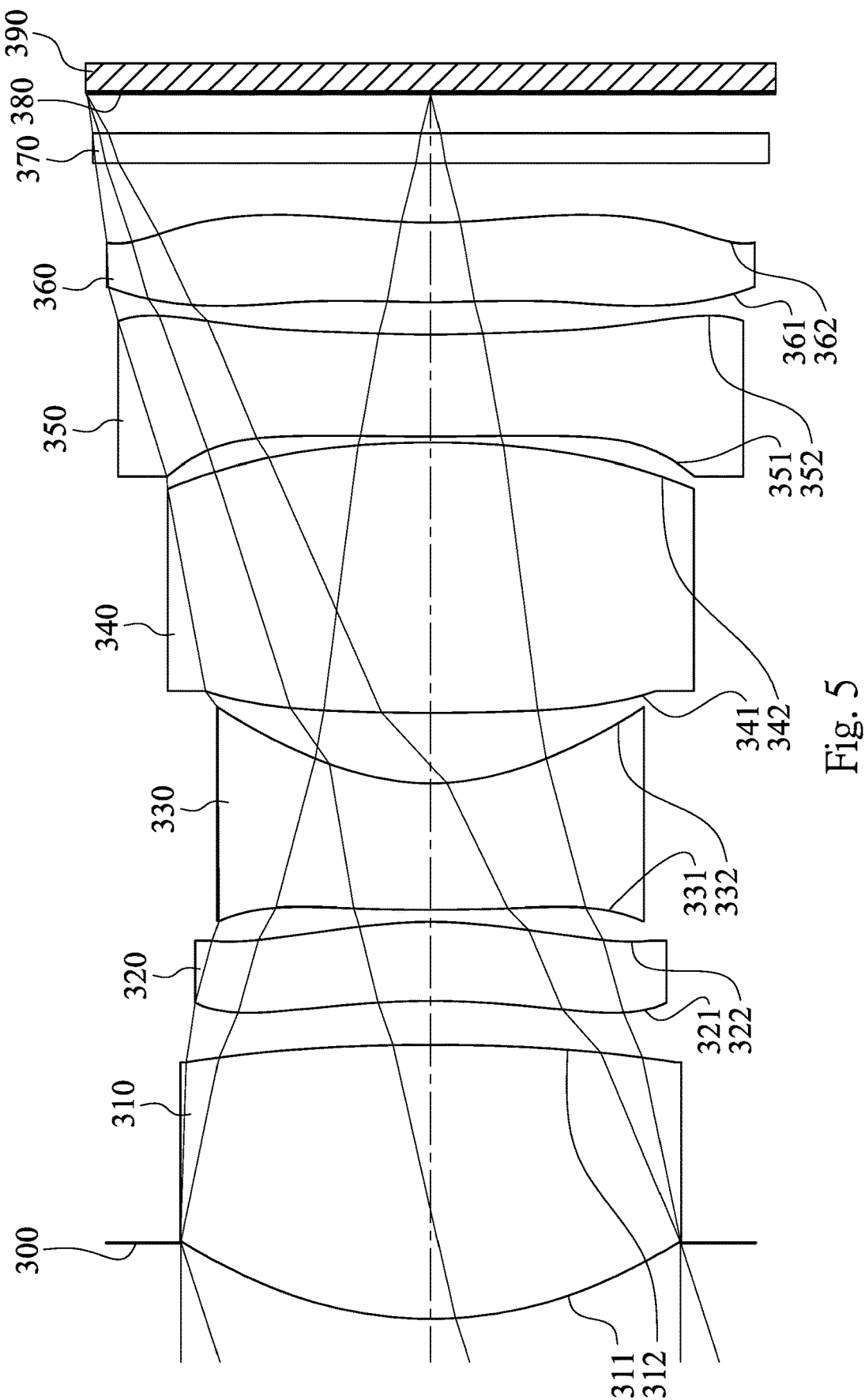
FIG. 5 is a schematic view of an image capturing device according to the 3rd embodiment of the present disclosure.
Figure 6:
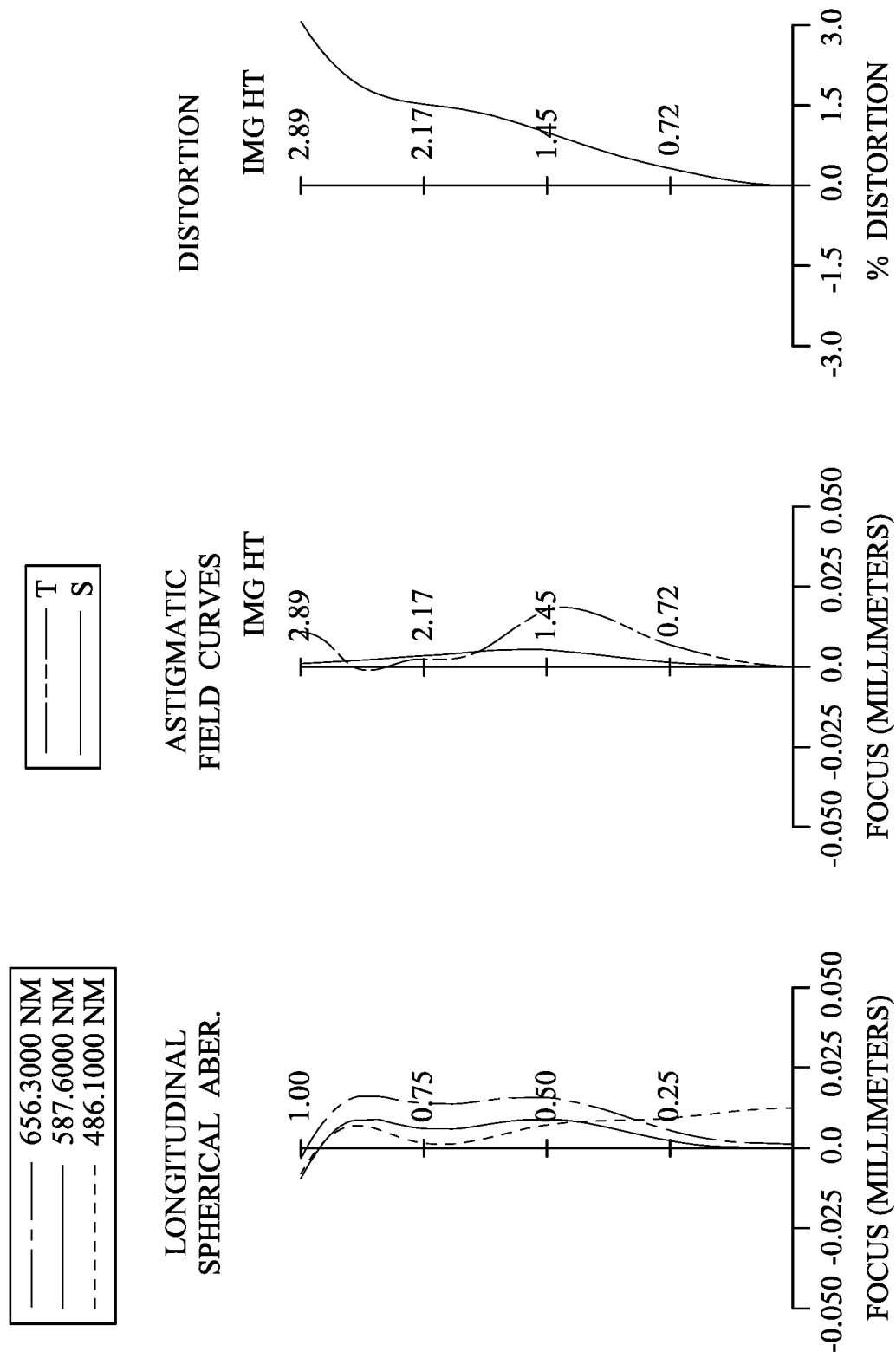
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an optical imaging lens assembly (its reference numeral is omitted) and an image sensor 390. The optical imaging lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the image sensor 390 is disposed on the image surface 380 of the optical imaging lens assembly. The optical imaging lens assembly has a total of six lens elements (310-360), and there is an air space between every two lens elements of the first lens element 310, the second lens element 320, the third lens element 330, the fourth lens element 340, the fifth lens element 350 and the sixth lens element 360 that are adjacent to each other.

The first lens element 310 with positive refractive power has an object-side surface 311 being convex and an image-side surface 312 being convex. The first lens element 310 is made of a plastic material, and has the object-side surface 311 and the image-side surface 312 being both aspheric.

The second lens element 320 with positive refractive power has an object-side surface 321 being concave and an image-side surface 322 being convex. The second lens element 320 is made of a plastic material, and has the object-side surface 321 and the image-side surface 322 being both aspheric. Furthermore, both of the object-side surface 321 and the image-side surface 322 of the second lens element 320 include at least one inflection point.

The third lens element 330 with negative refractive power has an object-side surface 331 being convex and an image-side surface 332 being concave. The third lens element 330 is made of a plastic material, and has the object-side surface 331 and the image-side surface 332 being both aspheric. Furthermore, the object-side surface 331 of the third lens element 330 includes at least one inflection point.

The fourth lens element 340 with positive refractive power has an object-side surface 341 being convex and an image-side surface 342 being convex. The fourth lens element 340 is made of a plastic material, and has the object-side surface 341 and the image-side surface 342 being both aspheric. Furthermore, the image-side surface 342 of the fourth lens element 340 includes at least one inflection point.

The fifth lens element 350 with negative refractive power has an object-side surface 351 being convex and an image-side surface 352 being concave. The fifth lens element 350 is made of a plastic material, and has the object-side surface 351 and the image-side surface 352 being both aspheric. Furthermore, both of the object-side surface 351 and the image-side surface 352 of the fifth lens element 350 include at least one inflection point.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axial region thereof, and both of the object-side surface 361 and the image-side surface 362 of the sixth lens element 360 include at least one inflection point.

The aperture stop 300 is located along an optical axis between a center of the object-side surface 311 of the first lens element 310 on the optical axis and a location of a maximum effective radius of the object-side surface 311 of the first lens element 310 projected on the optical axis.

The IR-cut filter 370 is made of a glass material and located between the sixth lens element 360 and the image surface 380, and will not affect the focal length of the optical imaging lens assembly.

The detailed optical data of the 3rd embodiment are shown in Table 5 and the aspheric surface data are shown in Table 6 below.

TABLE 5

3rd Embodiment  
f = 8.63 mm, Fno = 2.06, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.640 | | | | |
| 2 | Lens 1 | 3.473 | ASP | 2.300 | Plastic | 1.544 | 55.9 | 5.63 |
| 3 | | −19.872 | ASP | 0.370 | | | | |
| 4 | Lens 2 | −6.910 | ASP | 0.666 | Plastic | 1.544 | 55.9 | 14.25 |
| 5 | | −3.777 | ASP | 0.100 | | | | |
| 6 | Lens 3 | 17.185 | ASP | 1.061 | Plastic | 1.660 | 20.4 | −3.70 |
| 7 | | 2.085 | ASP | 0.593 | | | | |
| 8 | Lens 4 | 24.930 | ASP | 2.267 | Plastic | 1.639 | 23.3 | 11.05 |
| 9 | | −9.492 | ASP | 0.049 | | | | |
| 10 | Lens 5 | 17.721 | ASP | 0.859 | Plastic | 1.544 | 55.9 | −52.27 |
| 11 | | 10.729 | ASP | 0.271 | | | | |
| 12 | Lens 6 | 8.938 | ASP | 0.667 | Plastic | 1.515 | 56.5 | −24.64 |
| 13 | | 5.110 | ASP | 0.500 | | | | |
| 14 | IR-cut filter | Plano | | 0.250 | Glass | 1.517 | 64.2 | — |
| 15 | | Plano | | 0.342 | | | | |
| 16 | Image | Plano | | — | | | | |

Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | −1.5589E−01 | 7.6817E+01 | −5.1277E+01 | −1.8012E+01 | −9.0000E+01 | −1.0105E+00 |
| A4 = | −6.5866E−04 | −4.3804E−03 | −1.3921E−02 | 1.8068E−02 | 1.3584E−02 | −2.5471E−02 |
| A6 = | −1.1264E−04 | 3.0152E−03 | 1.7833E−02 | −7.4542E−03 | −2.3595E−02 | 9.2955E−03 |
| A8 = | −1.8601E−05 | −1.3542E−03 | −8.8032E−03 | 2.6306E−03 | 9.8476E−03 | −3.6478E−03 |
| A10 = | −4.0845E−06 | 3.2575E−04 | 2.5532E−03 | −1.0731E−03 | −3.3212E−03 | 9.1094E−04 |
| A12 = | −2.1278E−07 | −2.6868E−05 | −3.3934E−04 | 3.5687E−04 | 7.3769E−04 | −8.5147E−05 |
| A14 = | | | 1.7425E−05 | −4.0065E−05 | −7.4035E−05 | |

| Surface # | 8 | 9 | 10 | 11 | 12 | 13 |
|---|---|---|---|---|---|---|
| k = | 8.3530E+01 | −9.0000E+01 | −7.7236E+00 | −5.7951E+01 | −4.6351E+01 | −5.8199E+00 |
| A4 = | 3.5914E−03 | −4.3782E−02 | −3.9535E−02 | −2.5758E−02 | −6.7973E−02 | −4.9176E−02 |
| A6 = | 2.4154E−03 | 3.3141E−02 | 2.6957E−02 | 1.5356E−02 | 3.1310E−02 | 1.5070E−02 |
| A8 = | −4.2762E−04 | −1.6125E−02 | −1.1274E−02 | −2.4330E−03 | −7.0514E−03 | −3.3436E−03 |
| A10 = | −2.3328E−05 | 4.6329E−03 | 2.2209E−03 | −2.8785E−04 | 9.3470E−04 | 4.1065E−04 |
| A12 = | 1.3365E−05 | −7.8948E−04 | −2.3898E−04 | 1.3967E−04 | −7.1881E−05 | −3.0047E−05 |
| A14 = | | 7.3402E−05 | 1.3363E−05 | −1.6873E−05 | 2.9242E−06 | 2.1401E−06 |
| A16 = | | −2.7923E−06 | −1.9029E−07 | 6.9976E−07 | −4.7716E−08 | −1.0067E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 8.63 | f/f3 | −2.33 |
| Fno | 2.06 | (f/R5) − (f/R6) + (f × CT3/(R5 × R6)) | −3.38 |
| HFOV [deg.] | 18.0 | Y11/Y62 | 0.77 |
| Nmax | 1.660 | tan (2 × HFOV) | 0.73 |
| V3 | 20.4 | SL/TL | 0.94 |
| CT1/CT2 | 3.45 | BL/TD | 0.12 |
| (T34 + T56)/(T12 + T23 + T45) | 1.66 | f/EPD | 2.06 |
| R6/f | 0.24 | EPD/ImgH | 1.45 |
| (R5 + R6)/(R5 − R6) | 1.28 | TL/ImgH | 3.56 |
| |R11/R12| | 1.75 | ImgH/f | 0.34 |
| f/f1 | 1.53 | TL/f | 1.19 |

Furthermore, in the optical imaging lens assembly according to the 3rd embodiment, when a focal length of the first lens element 310 is f1, a focal length of the second lens element 320 is f2, a focal length of the third lens element 330 is f3, a focal length of the fourth lens element 340 is f4, a focal length of the fifth lens element 350 is f5, and a focal length of the sixth lens element 360 is f6, the following conditions are satisfied: |f1|<|f2|; |f3|<|f2|; |f3|<|f4|; |f3|<|f5|; and |f3|<|f6|.

In the optical imaging lens assembly according to the 3rd embodiment, when a central thickness of the first lens element 310 is CT1, a central thickness of the second lens element 320 is CT2, a central thickness of the third lens element 330 is CT3, a central thickness of the fourth lens element 340 is CT4, a central thickness of the fifth lens element 350 is CT5, and a central thickness of the sixth lens element 360 is CT6, CT1 is a maximum among CT1, CT2, CT3, CT4, CT5 and CT6.

In the optical imaging lens assembly according to the 3rd embodiment, when the axial distance between the first lens element 310 and the second lens element 320 is T12, the axial distance between the second lens element 320 and the third lens element 330 is T23, the axial distance between the third lens element 330 and the fourth lens element 340 is T34, the axial distance between the fourth lens element 340 and the fifth lens element 350 is T45, the axial distance between the fifth lens element 350 and the sixth lens element 360 is T56, and T34 is a maximum among T12, T23, T34, T45 and T56.

According to the 3rd embodiment, a number of inflection points of each of the object-side surfaces (311, 321, 331, 341, 351, 361) and the image-side surfaces (312, 322, 332, 342, 352, 362) of the first lens element 310, the second lens element 320, the third lens element 330, the fourth lens element 340, the fifth lens element 350 and the sixth lens element 360 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 311 | 312 | 321 | 322 | 331 | 332 |
| Number of reflection point(s) | 0 | 0 | 1 | 1 | 1 | 0 |

| Lens element | Fourth | | Fifth | | Sixth | |
|---|---|---|---|---|---|---|
| Surface | 341 | 342 | 351 | 352 | 361 | 362 |
| Number of reflection point(s) | 0 | 1 | 1 | 1 | 2 | 2 |

4th Embodiment

Figure 7:
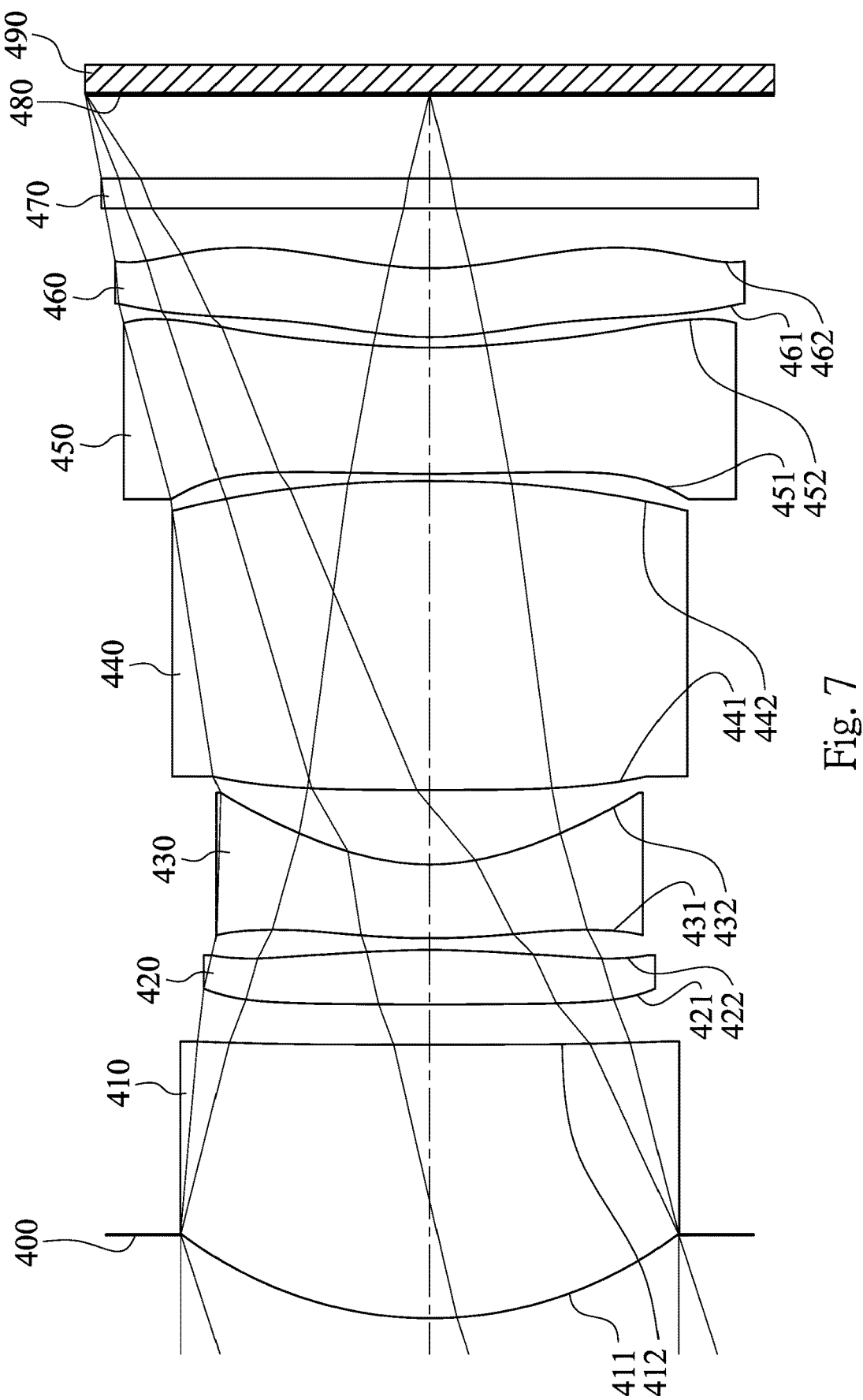
FIG. 7 is a schematic view of an image capturing device according to the 4th embodiment of the present disclosure.
Figure 8:
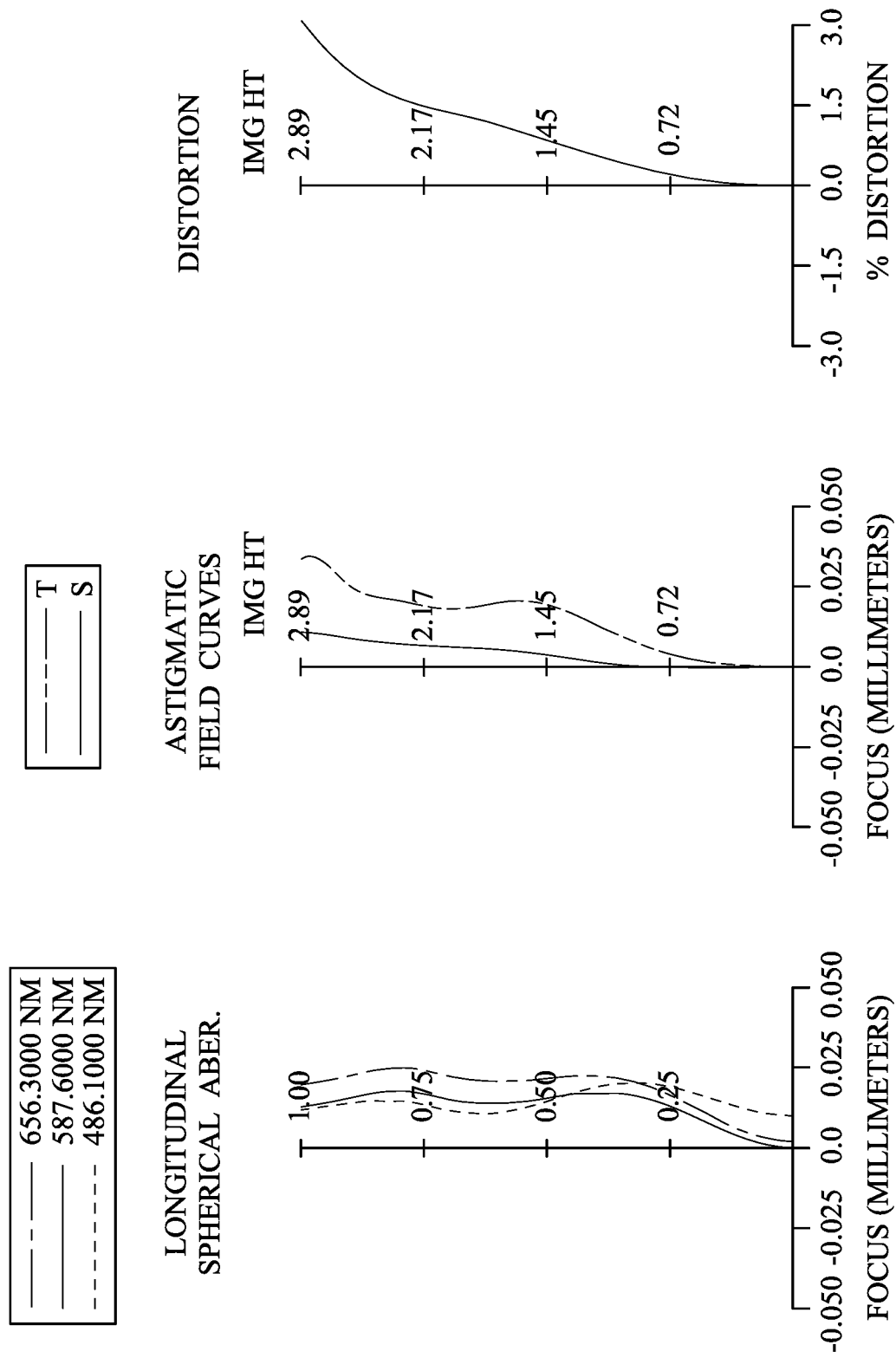
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an optical imaging lens assembly (its reference numeral is omitted) and an image sensor 490. The optical imaging lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480, wherein the image sensor 490 is disposed on the image surface 480 of the optical imaging lens assembly. The optical imaging lens assembly has a total of six lens elements (410-460), and there is an air space between every two lens elements of the first lens element 410, the second lens element 420, the third lens element 430, the fourth lens element 440, the fifth lens element 450 and the sixth lens element 460 that are adjacent to each other.

The first lens element 410 with positive refractive power has an object-side surface 411 being convex and an image-side surface 412 being concave. The first lens element 410 is made of a plastic material, and has the object-side surface 411 and the image-side surface 412 being both aspheric. Furthermore, the image-side surface 412 of the first lens element 410 includes at least one inflection point.

The second lens element 420 with positive refractive power has an object-side surface 421 being convex and an image-side surface 422 being convex. The second lens element 420 is made of a plastic material, and has the object-side surface 421 and the image-side surface 422 being both aspheric. Furthermore, the image-side surface 422 of the second lens element 420 includes at least one inflection point.

The third lens element 430 with negative refractive power has an object-side surface 431 being convex and an image-side surface 432 being concave. The third lens element 430 is made of a plastic material, and has the object-side surface 431 and the image-side surface 432 being both aspheric. Furthermore, the object-side surface 431 of the third lens element 430 includes at least one inflection point.

The fourth lens element 440 with positive refractive power has an object-side surface 441 being convex and an image-side surface 442 being convex. The fourth lens element 440 is made of a plastic material, and has the object-side surface 441 and the image-side surface 442 being both aspheric. Furthermore, the image-side surface 442 of the fourth lens element 440 includes at least one inflection point.

The fifth lens element 450 with negative refractive power has an object-side surface 451 being convex and an image-side surface 452 being concave. The fifth lens element 450 is made of a plastic material, and has the object-side surface 451 and the image-side surface 452 being both aspheric. Furthermore, both of the object-side surface 451 and the image-side surface 452 of the fifth lens element 450 include at least one inflection point.

The sixth lens element 460 with positive refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axial region thereof, and both of the object-side surface 461 and the image-side surface 462 of the sixth lens element 460 include at least one inflection point.

The aperture stop 400 is located along an optical axis between a center of the object-side surface 411 of the first lens element 410 on the optical axis and a location of a maximum effective radius of the object-side surface 411 of the first lens element 410 projected on the optical axis.

The IR-cut filter 470 is made of a glass material and located between the sixth lens element 460 and the image surface 480, and will not affect the focal length of the optical imaging lens assembly.

The detailed optical data of the 4th embodiment are shown in Table 7 and the aspheric surface data are shown in Table 8 below.

TABLE 7

4th Embodiment
f = 8.61 mm, Fno = 2.06, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.703 | | | | |
| 2 | Lens 1 | 3.395 | ASP | 2.300 | Plastic | 1.544 | 55.9 | 6.45 |
| 3 | | 80.347 | ASP | 0.340 | | | | |
| 4 | Lens 2 | 46.512 | ASP | 0.459 | Plastic | 1.544 | 55.9 | 12.44 |
| 5 | | −7.885 | ASP | 0.100 | | | | |
| 6 | Lens 3 | 6.770 | ASP | 0.616 | Plastic | 1.660 | 20.4 | −4.68 |
| 7 | | 2.045 | ASP | 0.627 | | | | |
| 8 | Lens 4 | 69.706 | ASP | 2.600 | Plastic | 1.639 | 23.3 | 21.26 |
| 9 | | −16.624 | ASP | 0.060 | | | | |
| 10 | Lens 5 | 13.914 | ASP | 1.060 | Plastic | 1.544 | 55.9 | −18.24 |
| 11 | | 5.635 | ASP | 0.088 | | | | |
| 12 | Lens 6 | 2.676 | ASP | 0.581 | Plastic | 1.515 | 56.5 | 50.35 |
| 13 | | 2.765 | ASP | 0.500 | | | | |
| 14 | IR-cut filter | Plano | | 0.250 | Glass | 1.517 | 64.2 | — |
| 15 | | Plano | | 0.712 | | | | |
| 16 | Image | Plano | | — | | | | |

Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −4.6989E−02 | −9.0000E+01 | 9.0000E+01 | −2.3427E+01 | −5.5637E+01 | −1.1073E+00 |
| A4 = | −1.9272E−04 | −5.1585E−03 | −1.3431E−02 | 1.9000E−02 | 1.4854E−02 | −2.6999E−02 |
| A6 = | 5.0780E−05 | 4.1040E−03 | 1.6429E−02 | −7.8883E−03 | −2.3171E−02 | 7.7340E−03 |
| A8 = | −1.7062E−05 | −1.4531E−03 | −8.3945E−03 | 2.4296E−03 | 9.8004E−03 | −2.9567E−03 |
| A10 = | 3.0222E−06 | 3.1167E−04 | 2.5639E−03 | −9.6718E−04 | −3.2311E−03 | 8.8252E−04 |
| A12 = | −3.7389E−07 | −2.9850E−05 | −3.6479E−04 | 3.9084E−04 | 7.7916E−04 | −9.8879E−05 |
| A14 = | | 1.9873E−05 | −5.0488E−05 | −8.6036E−05 | | |

| Surface # | 8 | 9 | 10 | 11 | 12 | 13 |
|---|---|---|---|---|---|---|
| k = | 6.5344E+01 | −1.7240E+01 | 2.2123E+01 | −1.1969E+01 | −3.8857E+00 | −4.3803E+00 |
| A4 = | 5.6613E−03 | −3.8398E−02 | −4.0049E−02 | −2.9595E−02 | −8.4729E−02 | −5.3584E−02 |
| A6 = | 2.1365E−03 | 3.3502E−02 | 2.6663E−02 | 1.5153E−02 | 3.2236E−02 | 1.4781E−02 |
| A8 = | −4.9661E−04 | −1.6261E−02 | −1.1134E−02 | −2.3590E−03 | −7.0223E−03 | −3.2426E−03 |
| A10 = | −3.7982E−05 | 4.6229E−03 | 2.2282E−03 | −2.8799E−04 | 9.3553E−04 | 4.2088E−04 |
| A12 = | 1.8855E−05 | −7.8719E−04 | −2.4267E−04 | 1.3880E−04 | −7.1733E−05 | −3.0191E−05 |
| A14 = | | 7.3904E−05 | 1.3002E−05 | −1.6931E−05 | 2.9228E−06 | 2.0335E−06 |
| A16 = | | −2.8373E−06 | −7.3115E−08 | 7.1414E−07 | −5.7730E−08 | −1.1026E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 8.61 | f/f3 | −1.84 |
| Fno | 2.06 | (f/R5) − (f/R6) + (f × CT3/(R5 × R6)) | −2.56 |
| HFOV [deg.] | 18.0 | Y11/Y62 | 0.79 |
| Nmax | 1.660 | tan (2 × HFOV) | 0.73 |
| V3 | 20.4 | SL/TL | 0.93 |
| CT1/CT2 | 5.01 | BL/TD | 0.17 |
| (T34 + T56)/(T12 + T23 + T45) | 1.43 | f/EPD | 2.06 |
| R6/f | 0.24 | EPD/ImgH | 1.45 |
| (R5 + R6)/(R5 − R6) | 1.87 | TL/ImgH | 3.56 |
| |R11/R12| | 0.97 | ImgH/f | 0.34 |
| f/f1 | 1.33 | TL/f | 1.20 |

Furthermore, in the optical imaging lens assembly according to the 4th embodiment, when a focal length of the first lens element 410 is f1, a focal length of the second lens element 420 is f2, a focal length of the third lens element 430 is f3, a focal length of the fourth lens element 440 is f4, a focal length of the fifth lens element 450 is f5, and a focal length of the sixth lens element 460 is f6, the following conditions are satisfied: |f1|<|f2|; |f3|<|f2|; |f3|<|f4|; |f3|<|f5|; and |f3|<|f6|.

In the optical imaging lens assembly according to the 4th embodiment, when the axial distance between the first lens element 410 and the second lens element 420 is T12, the axial distance between the second lens element 420 and the third lens element 430 is T23, the axial distance between the third lens element 430 and the fourth lens element 440 is T34, the axial distance between the fourth lens element 440 and the fifth lens element 450 is T45, the axial distance between the fifth lens element 450 and the sixth lens element 460 is T56, and T34 is a maximum among T12, T23, T34, T45 and T56.

According to the 4th embodiment, a number of inflection points of each of the object-side surfaces (411, 421, 431, 441, 451, 461) and the image-side surfaces (412, 422, 432, 442, 452, 462) of the first lens element 410, the second lens element 420, the third lens element 430, the fourth lens element 440, the fifth lens element 450 and the sixth lens element 460 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 411 | 412 | 421 | 422 | 431 | 432 |
| Number of reflection point(s) | 0 | 1 | 0 | 1 | 1 | 0 |

| Lens element | Fourth | | Fifth | | Sixth | |
|---|---|---|---|---|---|---|
| Surface | 441 | 442 | 451 | 452 | 461 | 462 |
| Number of reflection point(s) | 0 | 1 | 1 | 1 | 3 | 2 |

5th Embodiment

Figure 9:
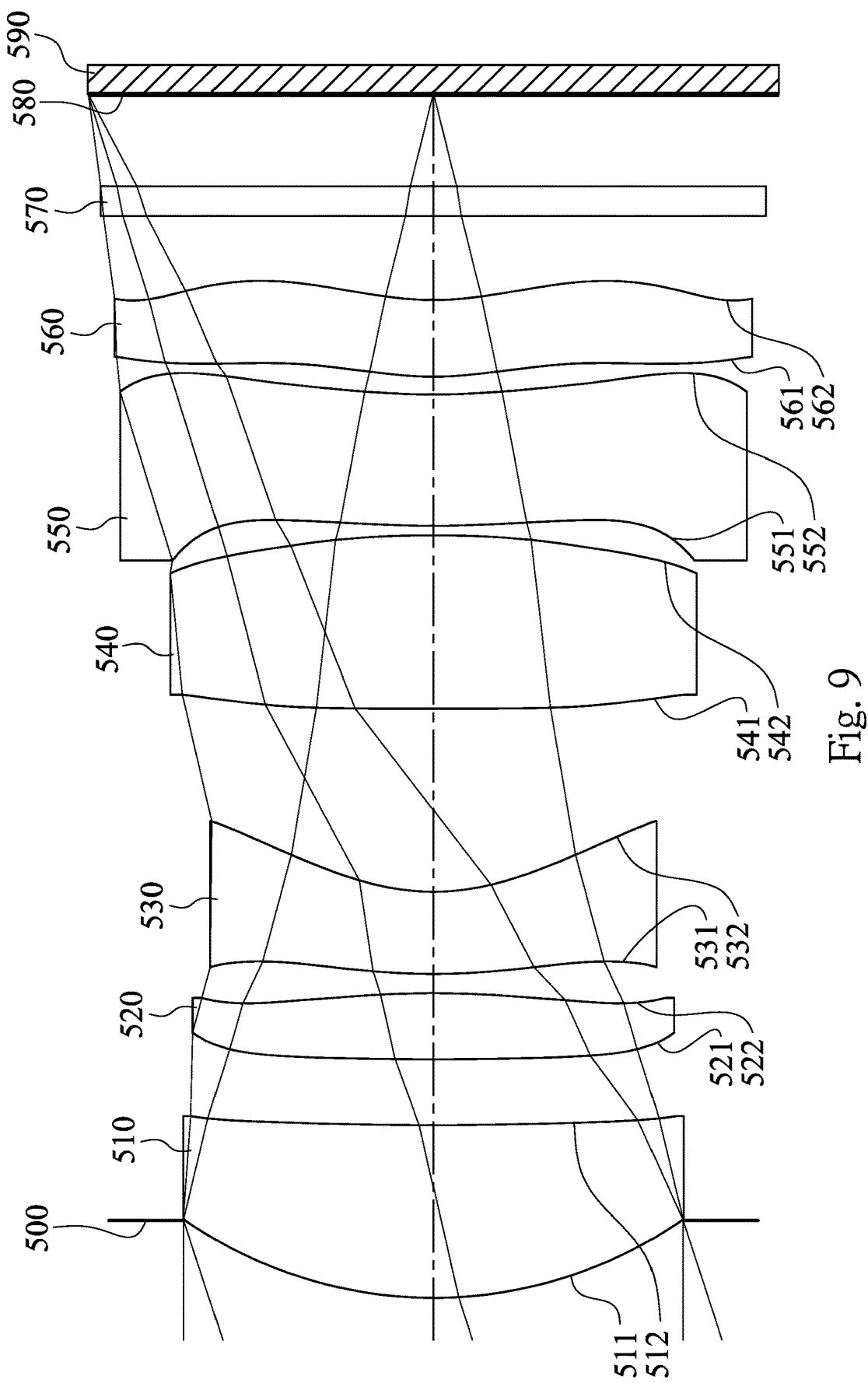
FIG. 9 is a schematic view of an image capturing device according to the 5th embodiment of the present disclosure.
Figure 10:
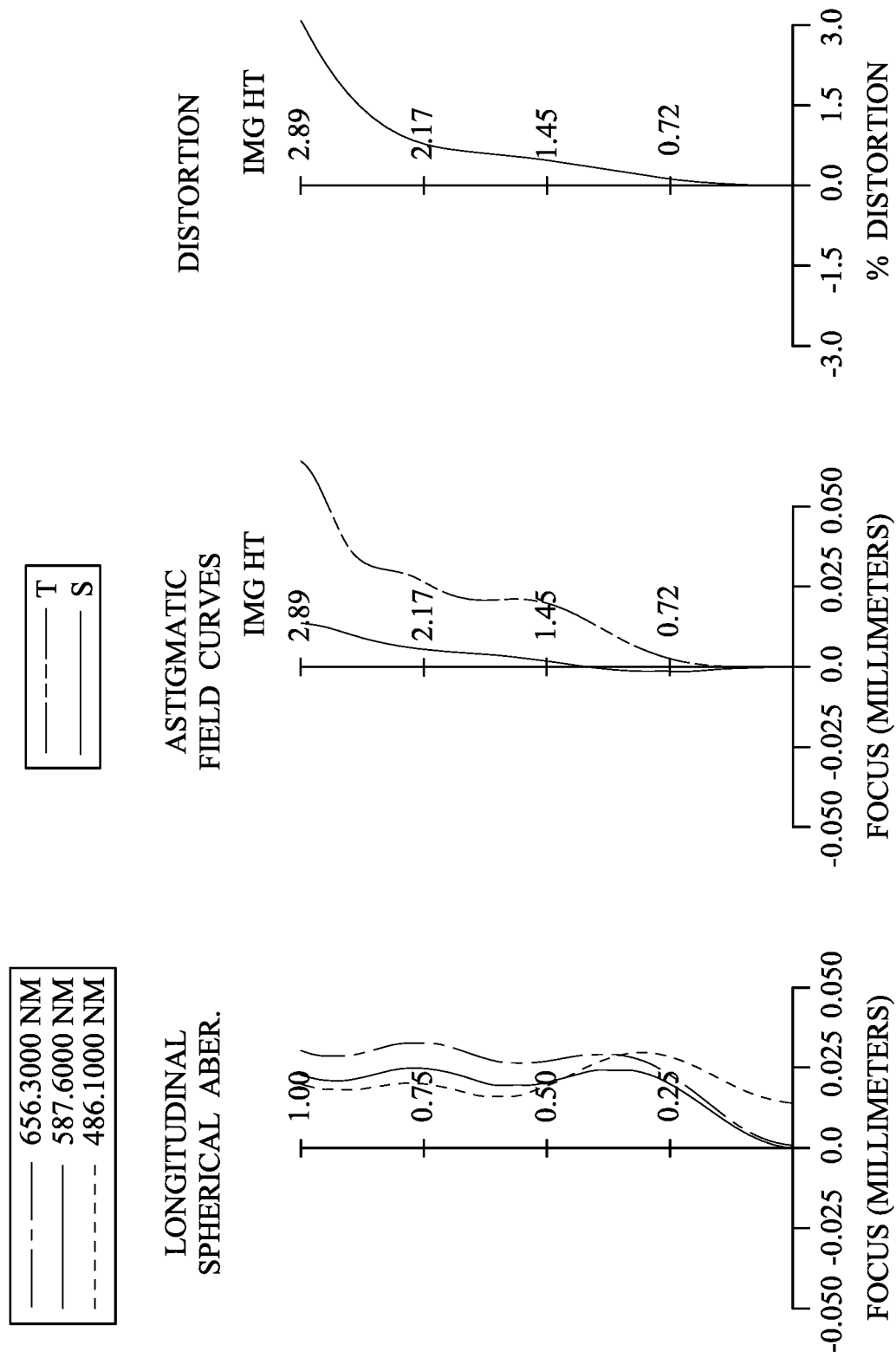
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an optical imaging lens assembly (its reference numeral is omitted) and an image sensor 590. The optical imaging lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580, wherein the image sensor 590 is disposed on the image surface 580 of the optical imaging lens assembly. The optical imaging lens assembly has a total of six lens elements (510-560), and there is an air space between every two lens elements of the first lens element 510, the second lens element 520, the third lens element 530, the fourth lens element 540, the fifth lens element 550 and the sixth lens element 560 that are adjacent to each other.

The first lens element 510 with positive refractive power has an object-side surface 511 being convex and an image-side surface 512 being concave. The first lens element 510 is made of a plastic material, and has the object-side surface 511 and the image-side surface 512 being both aspheric.

The second lens element 520 with positive refractive power has an object-side surface 521 being convex and an image-side surface 522 being convex. The second lens element 520 is made of a plastic material, and has the object-side surface 521 and the image-side surface 522 being both aspheric. Furthermore, the image-side surface 522 of the second lens element 520 includes at least one inflection point.

The third lens element 530 with negative refractive power has an object-side surface 531 being convex and an image-side surface 532 being concave. The third lens element 530 is made of a plastic material, and has the object-side surface 531 and the image-side surface 532 being both aspheric. Furthermore, both of the object-side surface 531 and the image-side surface 532 of the third lens element 530 include at least one inflection point.

The fourth lens element 540 with positive refractive power has an object-side surface 541 being convex and an image-side surface 542 being convex. The fourth lens element 540 is made of a plastic material, and has the object-side surface 541 and the image-side surface 542 being both aspheric. Furthermore, the object-side surface 541 of the fourth lens element 540 includes at least one inflection point.

The fifth lens element 550 with negative refractive power has an object-side surface 551 being convex and an image-side surface 552 being concave. The fifth lens element 550 is made of a plastic material, and has the object-side surface 551 and the image-side surface 552 being both aspheric. Furthermore, both of the object-side surface 551 and the image-side surface 552 of the fifth lens element 550 include at least one inflection point.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof, and both of the object-side surface 561 and the image-side surface 562 of the sixth lens element 560 include at least one inflection point.

The aperture stop 500 is located along an optical axis between a center of the object-side surface 511 of the first lens element 510 on the optical axis and a location of a maximum effective radius of the object-side surface 511 of the first lens element 510 projected on the optical axis.

The IR-cut filter 570 is made of a glass material and located between the sixth lens element 560 and the image surface 580, and will not affect the focal length of the optical imaging lens assembly.

The detailed optical data of the 5th embodiment are shown in Table 9 and the aspheric surface data are shown in Table 10 below.

TABLE 9

5th Embodiment
f = 8.61 mm, Fno = 2.06, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.650 | | | | |
| 2 | Lens 1 | 3.614 | ASP | 1.450 | Plastic | 1.544 | 55.9 | 7.60 |
| 3 | | 24.670 | ASP | 0.550 | | | | |
| 4 | Lens 2 | 28.397 | ASP | 0.556 | Plastic | 1.544 | 55.9 | 10.10 |
| 5 | | −6.761 | ASP | 0.160 | | | | |
| 6 | Lens 3 | 5.469 | ASP | 0.686 | Plastic | 1.660 | 20.4 | −4.69 |
| 7 | | 1.878 | ASP | 1.540 | | | | |
| 8 | Lens 4 | 2934.681 | ASP | 1.450 | Plastic | 1.639 | 23.3 | 18.58 |
| 9 | | −11.913 | ASP | 0.080 | | | | |
| 10 | Lens 5 | 7.566 | ASP | 1.100 | Plastic | 1.544 | 55.9 | −70.11 |
| 11 | | 5.990 | ASP | 0.149 | | | | |
| 12 | Lens 6 | 2.819 | ASP | 0.645 | Plastic | 1.515 | 56.5 | −259.23 |
| 13 | | 2.546 | ASP | 0.700 | | | | |
| 14 | IR-cut filter | Plano | | 0.250 | Glass | 1.517 | 64.2 | — |
| 15 | | Plano | | 0.773 | | | | |
| 16 | Image | Plano | | — | | | | |

Reference wavelength is 587.6 nm (d-line).

TABLE 10

Aspheric Coefficients

| Surface # | 2 | 3 | 4 | 5 | 6 | 7 |
|---|---|---|---|---|---|---|
| k = | −8.9909E−02 | −9.0000E+01 | 8.3345E+01 | −2.1332E+01 | −3.2835E+01 | −1.4393E+00 |
| A4 = | −6.6574E−04 | −6.6146E−03 | −1.2073E−02 | 2.0724E−02 | 1.6149E−02 | −3.1652E−02 |
| A6 = | 2.7861E−04 | 4.0674E−03 | 1.5078E−02 | −7.7281E−03 | −2.2924E−02 | 6.6435E−03 |
| A8 = | −5.2968E−05 | −1.5168E−03 | −8.3139E−03 | 2.2333E−03 | 9.8462E−03 | −2.3191E−03 |
| A10 = | −1.0459E−06 | 3.2874E−04 | 2.5784E−03 | −9.8359E−04 | −3.2476E−03 | 6.7438E−04 |
| A12 = | 1.4349E−06 | −2.5130E−05 | −3.5902E−04 | 3.9053E−04 | 7.5414E−04 | −8.2834E−05 |
| A14 = | | | 1.9496E−05 | −4.9258E−05 | −8.0613E−05 | |

| Surface # | 8 | 9 | 10 | 11 | 12 | 13 |
|---|---|---|---|---|---|---|
| k = | −9.0000E+01 | 6.2064E+00 | 8.3938E+00 | −2.5313E+00 | −5.0185E+00 | −6.3038E+00 |
| A4 = | 6.4163E−03 | −3.9081E−02 | −4.6801E−02 | −3.2352E−02 | −8.9009E−02 | −5.3854E−02 |
| A6 = | 1.6797E−03 | 3.4729E−02 | 2.6586E−02 | 1.4353E−02 | 3.2895E−02 | 1.4282E−02 |
| A8 = | −5.2033E−04 | −1.6216E−02 | −1.1113E−02 | −2.2973E−03 | −7.0218E−03 | −3.1678E−03 |
| A10 = | 3.2549E−05 | 4.6003E−03 | 2.2242E−03 | −2.8342E−04 | 9.3381E−04 | 4.2863E−04 |
| A12 = | −1.5183E−06 | −7.9100E−04 | −2.4974E−04 | 1.3817E−04 | −7.1750E−05 | −3.0498E−05 |
| A14 = | | 7.3489E−05 | 1.1779E−05 | −1.7029E−05 | 2.9357E−06 | 1.9385E−06 |
| A16 = | | −2.8128E−06 | 3.0136E−09 | 7.2337E−07 | −6.2611E−08 | −1.0842E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 8.61 | f/f3 | −1.84 |
| Fno | 2.06 | (f/R5) − (f/R6) + (f × CT3/(R5 × R6)) | −2.43 |
| HFOV [deg.] | 18.0 | Y11/Y62 | 0.78 |
| Nmax | 1.660 | tan (2 × HFOV) | 0.73 |
| V3 | 20.4 | SL/TL | 0.94 |
| CT1/CT2 | 2.61 | BL/TD | 0.21 |
| (T34 + T56)/(T12 + T23 + T45) | 2.14 | f/EPD | 2.06 |
| R6/f | 0.22 | EPD/ImgH | 1.44 |
| (R5 + R6)/(R5 − R6) | 2.05 | TL/ImgH | 3.49 |
| |R11/R12| | 1.11 | ImgH/f | 0.34 |
| f/f1 | 1.13 | TL/f | 1.17 |

Furthermore, in the optical imaging lens assembly according to the 5th embodiment, when a focal length of the first lens element 510 is f1, a focal length of the second lens element 520 is f2, a focal length of the third lens element 530 is f3, a focal length of the fourth lens element 540 is f4, a focal length of the fifth lens element 550 is f5, and a focal length of the sixth lens element 560 is f6, the following conditions are satisfied: |f1|<|f2|; |f3|<|f2|; |f3|<|f4|; |f3|<|f5|; and |f3|<|f6|.

In the optical imaging lens assembly according to the 5th embodiment, when a central thickness of the first lens element 510 is CT1, a central thickness of the second lens element 520 is CT2, a central thickness of the third lens element 530 is CT3, a central thickness of the fourth lens element 540 is CT4, a central thickness of the fifth lens element 550 is CT5, and a central thickness of the sixth lens element 560 is CT6, CT1 is a maximum among CT1, CT2, CT3, CT4, CT5 and CT6.

In the optical imaging lens assembly according to the 5th embodiment, when the axial distance between the first lens element 510 and the second lens element 520 is T12, the axial distance between the second lens element 520 and the third lens element 530 is T23, the axial distance between the third lens element 530 and the fourth lens element 540 is T34, the axial distance between the fourth lens element 540 and the fifth lens element 550 is T45, the axial distance between the fifth lens element 550 and the sixth lens element 560 is T56, and T34 is a maximum among T12, T23, T34, T45 and T56.

According to the 5th embodiment, a number of inflection points of each of the object-side surfaces (511, 521, 531, 541, 551, 561) and the image-side surfaces (512, 522, 532, 542, 552, 562) of the first lens element 510, the second lens element 520, the third lens element 530, the fourth lens element 540, the fifth lens element 550 and the sixth lens element 560 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 511 | 512 | 521 | 522 | 531 | 532 |
| Number of reflection point(s) | 0 | 0 | 0 | 1 | 1 | 1 |

| Lens element | Fourth | | Fifth | | Sixth | |
|---|---|---|---|---|---|---|
| Surface | 541 | 542 | 551 | 552 | 561 | 562 |
| Number of reflection point(s) | 1 | 0 | 1 | 1 | 3 | 2 |

6th Embodiment

Figure 11:
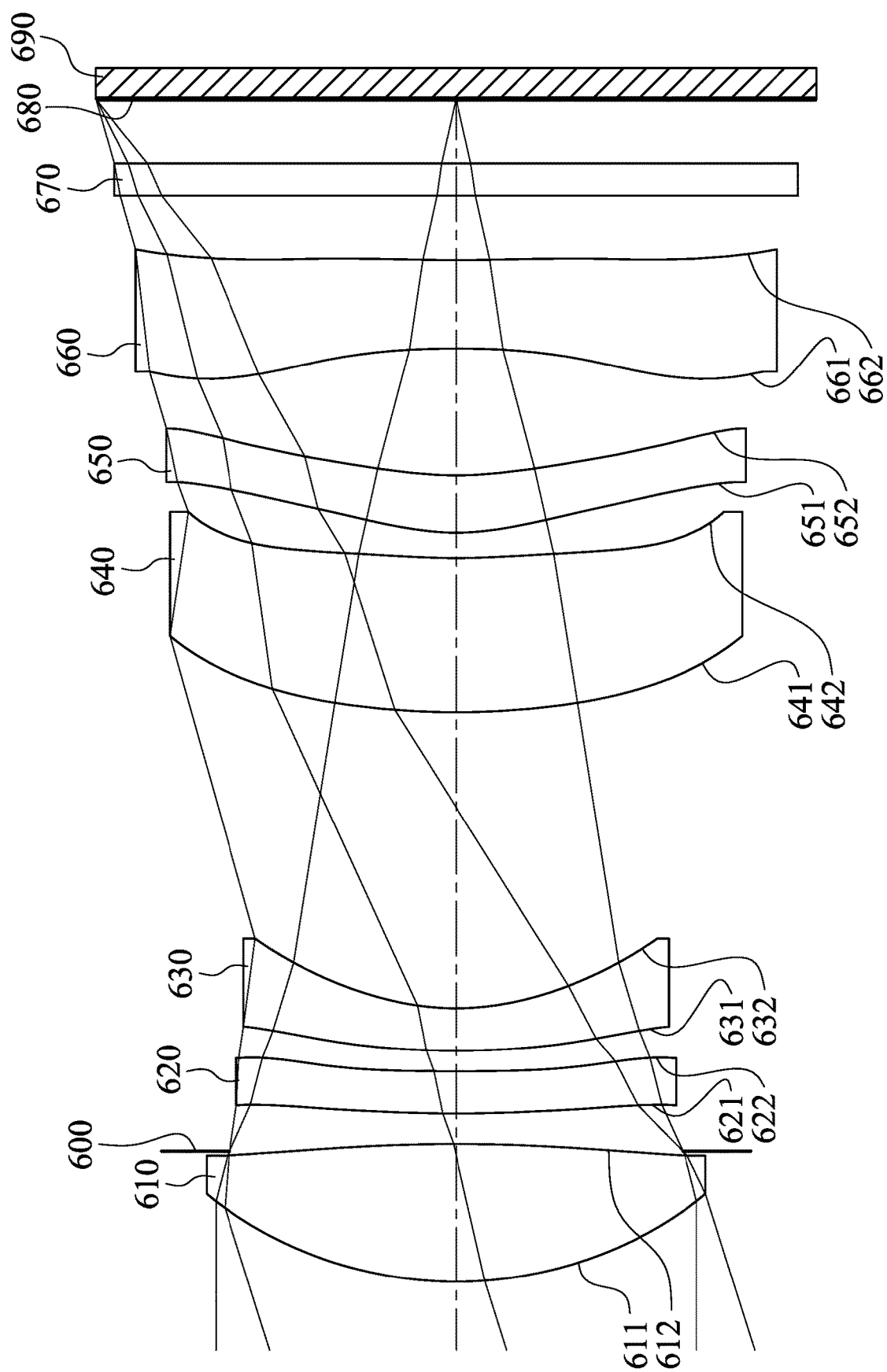
FIG. 11 is a schematic view of an image capturing device according to the 6th embodiment of the present disclosure.
Figure 12:
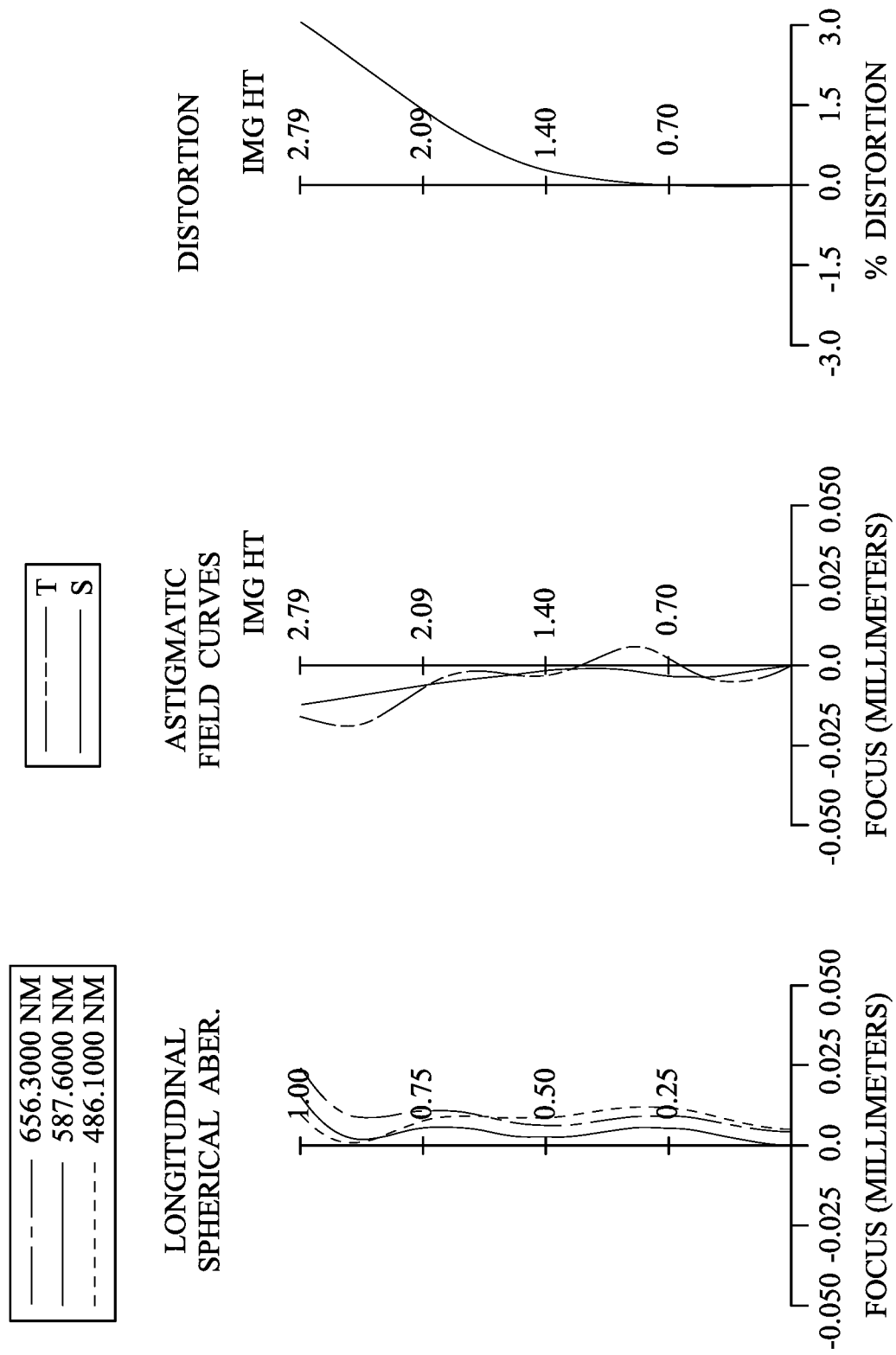
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes an optical imaging lens assembly (its reference numeral is omitted) and an image sensor 690. The optical imaging lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680, wherein the image sensor 690 is disposed on the image surface 680 of the optical imaging lens assembly. The optical imaging lens assembly has a total of six lens elements (610-660), and there is an air space between every two lens elements of the first lens element 610, the second lens element 620, the third lens element 630, the fourth lens element 640, the fifth lens element 650 and the sixth lens element 660 that are adjacent to each other.

The first lens element 610 with positive refractive power has an object-side surface 611 being convex and an image-side surface 612 being convex. The first lens element 610 is made of a plastic material, and has the object-side surface 611 and the image-side surface 612 being both aspheric. Furthermore, the image-side surface 612 of the first lens element 610 includes at least one inflection point.

The second lens element 620 with positive refractive power has an object-side surface 621 being convex and an image-side surface 622 being concave. The second lens element 620 is made of a plastic material, and has the object-side surface 621 and the image-side surface 622 being both aspheric. Furthermore, both of the object-side surface 621 and the image-side surface 622 of the second lens element 620 include at least one inflection point.

The third lens element 630 with negative refractive power has an object-side surface 631 being convex and an image-side surface 632 being concave. The third lens element 630 is made of a plastic material, and has the object-side surface 631 and the image-side surface 632 being both aspheric. Furthermore, the object-side surface 631 of the third lens element 630 includes at least one inflection point.

The fourth lens element 640 with negative refractive power has an object-side surface 641 being convex and an image-side surface 642 being concave. The fourth lens element 640 is made of a plastic material, and has the object-side surface 641 and the image-side surface 642 being both aspheric. Furthermore, the image-side surface 642 of the fourth lens element 640 includes at least one inflection point.

The fifth lens element 650 with positive refractive power has an object-side surface 651 being convex and an image-side surface 652 being concave. The fifth lens element 650 is made of a plastic material, and has the object-side surface 651 and the image-side surface 652 being both aspheric. Furthermore, both of the object-side surface 651 and the image-side surface 652 of the fifth lens element 650 include at least one inflection point.

The sixth lens element 660 with negative refractive power has an object-side surface 661 being concave in a paraxial region thereof and an image-side surface 662 being concave in a paraxial region thereof. The sixth lens element 660 is made of a plastic material, and has the object-side surface 661 and the image-side surface 662 being both aspheric. Furthermore, the object-side surface 661 of the sixth lens element 660 includes at least one convex shape in an off-axial region thereof, the image-side surface 662 of the sixth lens element 660 includes at least one convex shape in an off-axial region thereof, and both of the object-side surface 661 and the image-side surface 662 of the sixth lens element 660 include at least one inflection point.

The IR-cut filter 670 is made of a glass material and located between the sixth lens element 660 and the image surface 680, and will not affect the focal length of the optical imaging lens assembly.

The detailed optical data of the 6th embodiment are shown in Table 11 and the aspheric surface data are shown in Table 12 below.

TABLE 11

6th Embodiment
f = 8.58 mm, Fno = 2.30, HFOV = 17.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.099 | ASP | 1.069 | Plastic | 1.530 | 55.8 | 4.97 |
| 2 | | −15.536 | ASP | −0.055 | | | | |
| 3 | Ape. Stop | Plano | | 0.292 | | | | |
| 4 | Lens 2 | 10.406 | ASP | 0.330 | Plastic | 1.614 | 25.6 | 26.81 |
| 5 | | 27.933 | ASP | 0.160 | | | | |
| 6 | Lens 3 | 7.764 | ASP | 0.330 | Plastic | 1.639 | 23.3 | −4.55 |
| 7 | | 2.079 | ASP | 2.300 | | | | |
| 8 | Lens 4 | 6.387 | ASP | 1.200 | Plastic | 1.584 | 28.2 | −68.93 |
| 9 | | 5.131 | ASP | 0.197 | | | | |
| 10 | Lens 5 | 1.874 | ASP | 0.446 | Plastic | 1.530 | 55.8 | 8.17 |
| 11 | | 3.034 | ASP | 0.986 | | | | |
| 12 | Lens 6 | −8.322 | ASP | 0.686 | Plastic | 1.535 | 56.3 | −9.29 |
| 13 | | 12.687 | ASP | 0.500 | | | | |
| 14 | IR-cut filter | Plano | | 0.250 | Glass | 1.517 | 64.2 | — |
| 15 | | Plano | | 0.504 | | | | |
| 16 | Image | Plano | | — | | | | |

Reference wavelength is 587.6 nm (d-line).

TABLE 12

Aspheric Coefficients

| Surface # | 1 | 2 | 4 | 5 | 6 | 7 |
|---|---|---|---|---|---|---|
| k = | −4.5413E−02 | 2.5284E+01 | −2.8352E+01 | −1.8991E+01 | 1.4151E+01 | −7.7307E−01 |
| A4 = | 2.4096E−05 | −6.0473E−03 | −1.7493E−02 | 3.4978E−02 | 2.3174E−02 | −2.1146E−02 |
| A6 = | −3.0386E−04 | 5.7351E−03 | 1.6078E−02 | −8.7681E−03 | −1.9431E−02 | 3.5710E−03 |
| A8 = | 1.2119E−04 | −1.7062E−03 | −8.2424E−03 | 7.8642E−04 | 8.6129E−03 | 3.9030E−04 |
| A10 = | −2.0872E−05 | 3.0941E−04 | 2.3593E−03 | −1.2627E−03 | −3.7045E−03 | −4.5292E−05 |
| A12 = | 6.0428E−06 | −2.4950E−05 | −4.5040E−04 | 3.8988E−04 | 8.8565E−04 | 6.0360E−06 |
| A14 = | | | 3.7254E−05 | −3.4714E−05 | −8.7489E−05 | |

| Surface # | 8 | 9 | 10 | 11 | 12 | 13 |
|---|---|---|---|---|---|---|
| k = | 5.1123E+00 | −9.0000E+01 | −7.6307E+00 | −1.2795E+01 | 7.3461E+00 | −9.0000E+01 |
| A4 = | −8.6759E−04 | −4.1392E−02 | −5.4481E−02 | −2.9021E−02 | −5.1365E−02 | −3.7644E−02 |
| A6 = | 2.0772E−03 | 3.7114E−02 | 3.4126E−02 | 1.4990E−02 | 3.0128E−02 | 1.6897E−02 |
| A8 = | −4.9263E−04 | −1.5954E−02 | −1.1605E−02 | −2.2885E−03 | −6.9258E−03 | −3.4739E−03 |
| A10 = | 8.1290E−05 | 4.5916E−03 | 2.2238E−03 | −2.8294E−04 | 9.4152E−04 | 4.0721E−04 |
| A12 = | −6.4926E−06 | −7.8931E−04 | −2.3688E−04 | 1.4003E−04 | −7.2246E−05 | −3.1173E−05 |
| A14 = | | 7.4246E−05 | 1.2029E−05 | −1.7144E−05 | 2.7857E−06 | 2.0688E−06 |
| A16 = | | −2.8043E−06 | −1.8699E−07 | 6.0698E−07 | −6.5799E−08 | −9.6355E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 8.58 | f/f3 | −1.89 |
| Fno | 2.30 | (f/R5) − (f/R6) + (f × CT3/(R5 × R6)) | −2.85 |
| HFOV [deg.] | 17.5 | Y11/Y62 | 0.78 |
| Nmax | 1.639 | tan (2 × HFOV) | 0.70 |
| V3 | 23.3 | SL/TL | 0.89 |
| CT1/CT2 | 3.24 | BL/TD | 0.16 |
| (T34 + T56)/(T12 + T23 + T45) | 5.53 | f/EPD | 2.30 |
| R6/f | 0.24 | EPD/ImgH | 1.34 |
| (R5 + R6)/(R5 − R6) | 1.73 | TL/ImgH | 3.29 |
| |R11/R12| | 0.66 | ImgH/f | 0.33 |
| f/f1 | 1.72 | TL/f | 1.07 |

Furthermore, in the optical imaging lens assembly according to the 6th embodiment, when a focal length of the first lens element 610 is f1, a focal length of the second lens element 620 is f2, a focal length of the third lens element 630 is f3, a focal length of the fourth lens element 640 is f4, a focal length of the fifth lens element 650 is f5, and a focal length of the sixth lens element 660 is f6, the following conditions are satisfied: |f1|<|f2|; |f3|<|f2|; |f3|<|f4|; |f3|<|f5|; and |f3|<|f6|.

In the optical imaging lens assembly according to the 6th embodiment, when the axial distance between the first lens element 610 and the second lens element 620 is T12, the axial distance between the second lens element 620 and the third lens element 630 is T23, the axial distance between the third lens element 630 and the fourth lens element 640 is T34, the axial distance between the fourth lens element 640 and the fifth lens element 650 is T45, the axial distance between the fifth lens element 650 and the sixth lens element 660 is T56, and T34 is a maximum among T12, T23, T34, T45 and T56.

According to the 6th embodiment, a number of inflection points of each of the object-side surfaces (611, 621, 631, 641, 651, 661) and the image-side surfaces (612, 622, 632, 642, 652, 662) of the first lens element 610, the second lens element 620, the third lens element 630, the fourth lens element 640, the fifth lens element 650 and the sixth lens element 660 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 611 | 612 | 621 | 622 | 631 | 632 |
| Number of reflection point(s) | 0 | 1 | 1 | 1 | 1 | 0 |

| Lens element | Fourth | | Fifth | | Sixth | |
|---|---|---|---|---|---|---|
| Surface | 641 | 642 | 651 | 652 | 661 | 662 |
| Number of reflection point(s) | 0 | 2 | 3 | 1 | 2 | 2 |

7th Embodiment

Figure 13:
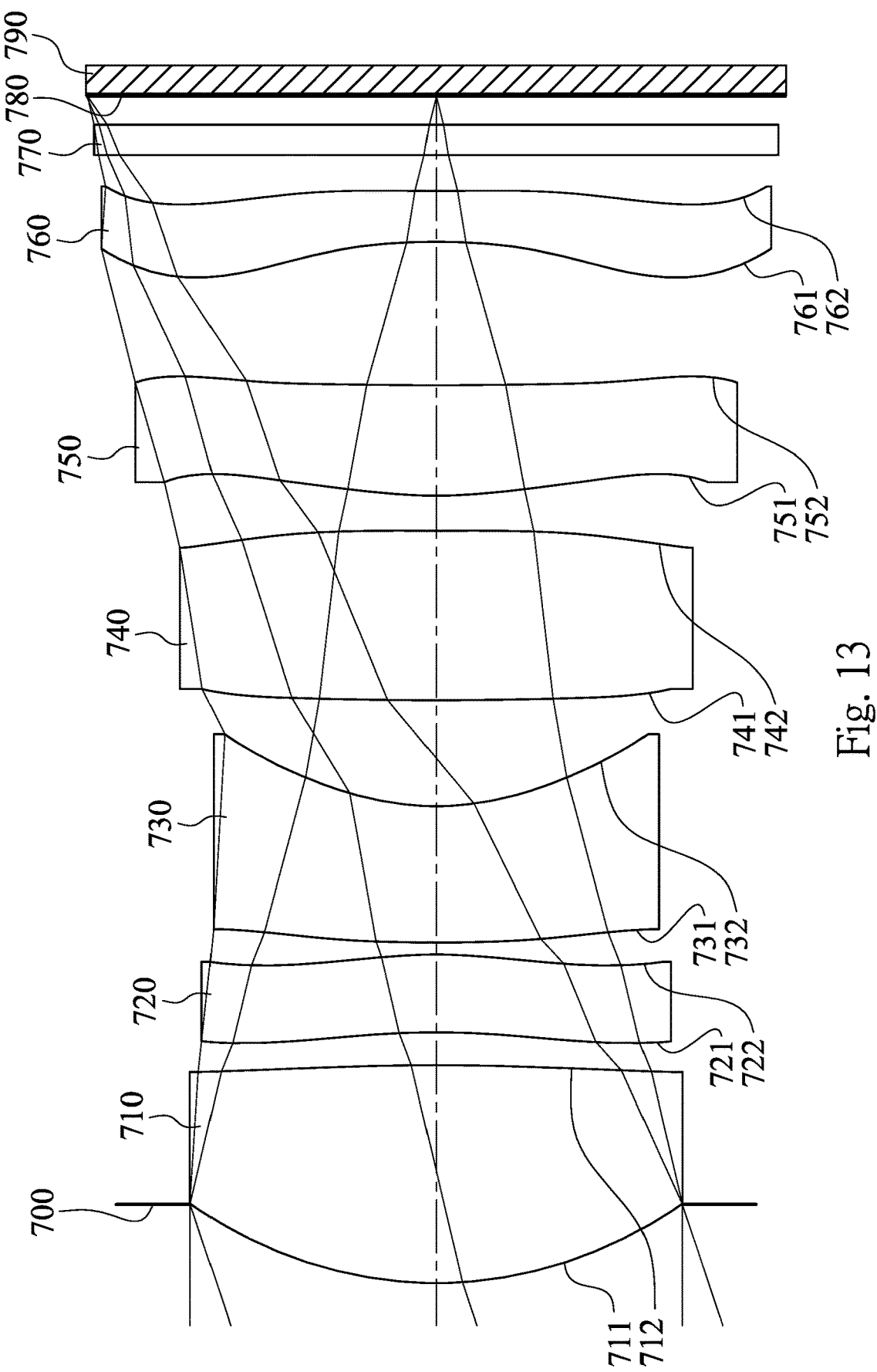
FIG. 13 is a schematic view of an image capturing device according to the 7th embodiment of the present disclosure.
Figure 14:
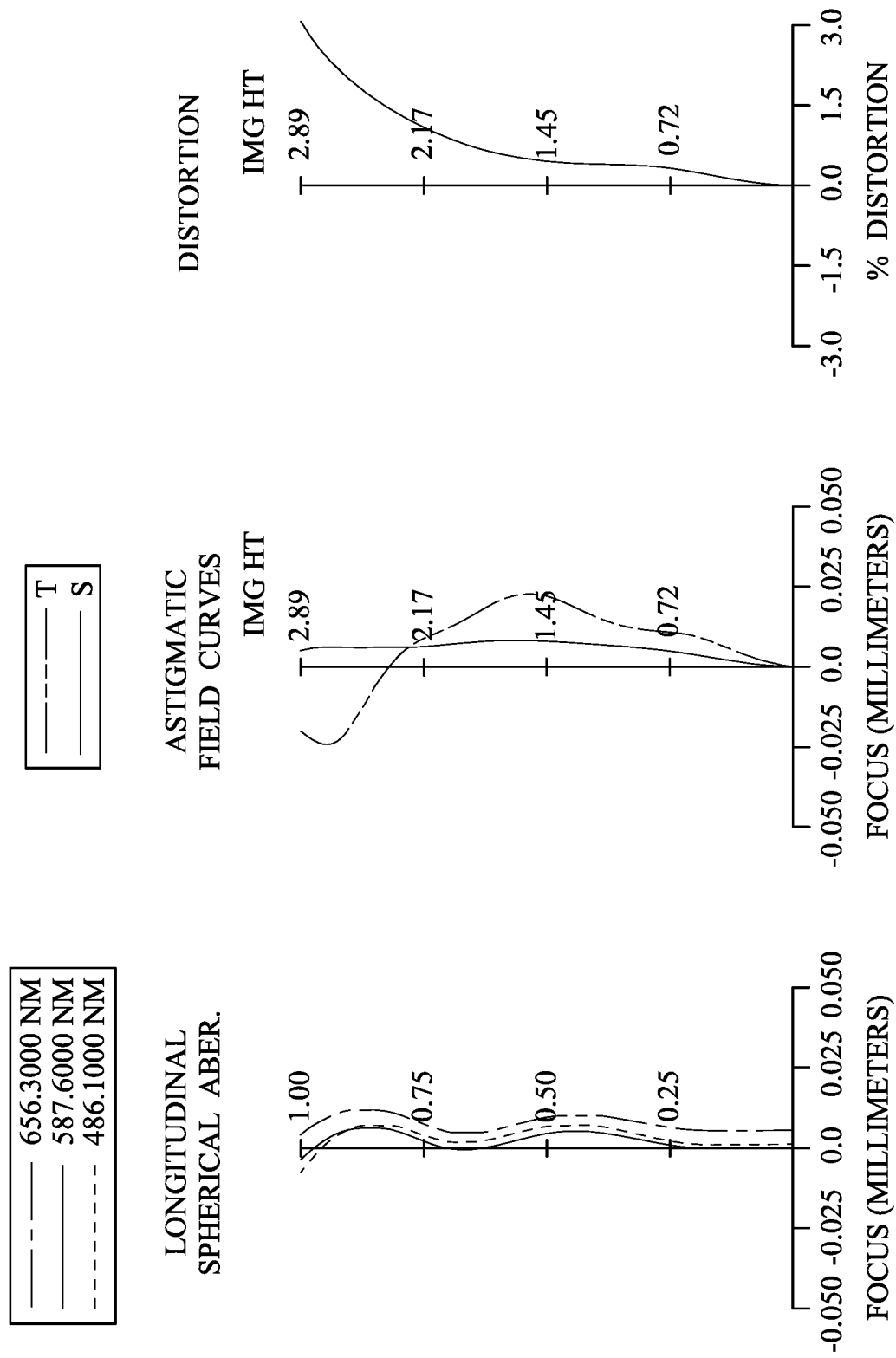
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an optical imaging lens assembly (its reference numeral is omitted) and an image sensor 790. The optical imaging lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the image sensor 790 is disposed on the image surface 780 of the optical imaging lens assembly. The optical imaging lens assembly has a total of six lens elements (710-760), and there is an air space between every two lens elements of the first lens element 710, the second lens element 720, the third lens element 730, the fourth lens element 740, the fifth lens element 750 and the sixth lens element 760 that are adjacent to each other.

The first lens element 710 with positive refractive power has an object-side surface 711 being convex and an image-side surface 712 being convex. The first lens element 710 is made of a plastic material, and has the object-side surface 711 and the image-side surface 712 being both aspheric. Furthermore, the image-side surface 712 of the first lens element 710 includes at least one inflection point.

The second lens element 720 with positive refractive power has an object-side surface 721 being concave and an image-side surface 722 being convex. The second lens element 720 is made of a plastic material, and has the object-side surface 721 and the image-side surface 722 being both aspheric. Furthermore, both of the object-side surface 721 and the image-side surface 722 of the second lens element 720 include at least one inflection point.

The third lens element 730 with negative refractive power has an object-side surface 731 being convex and an image-side surface 732 being concave. The third lens element 730 is made of a plastic material, and has the object-side surface 731 and the image-side surface 732 being both aspheric. Furthermore, the object-side surface 731 of the third lens element 730 includes at least one inflection point.

The fourth lens element 740 with positive refractive power has an object-side surface 741 being convex and an image-side surface 742 being concave. The fourth lens element 740 is made of a plastic material, and has the object-side surface 741 and the image-side surface 742 being both aspheric. Furthermore, the image-side surface 742 of the fourth lens element 740 includes at least one inflection point.

The fifth lens element 750 with positive refractive power has an object-side surface 751 being convex and an image-side surface 752 being concave. The fifth lens element 750 is made of a plastic material, and has the object-side surface 751 and the image-side surface 752 being both aspheric. Furthermore, both of the object-side surface 751 and the image-side surface 752 of the fifth lens element 750 include at least one inflection point.

The sixth lens element 760 with negative refractive power has an object-side surface 761 being concave in a paraxial region thereof and an image-side surface 762 being concave in a paraxial region thereof. The sixth lens element 760 is made of a plastic material, and has the object-side surface 761 and the image-side surface 762 being both aspheric. Furthermore, the object-side surface 761 of the sixth lens element 760 includes at least one convex shape in an off-axial region thereof, the image-side surface 762 of the sixth lens element 760 includes at least one convex shape in an off-axial region thereof, and both of the object-side surface 761 and the image-side surface 762 of the sixth lens element 760 include at least one inflection point.

The aperture stop 700 is located along an optical axis between a center of the object-side surface 711 of the first lens element 710 on the optical axis and a location of a maximum effective radius of the object-side surface 711 of the first lens element 710 projected on the optical axis.

The IR-cut filter 770 is made of a glass material and located between the sixth lens element 760 and the image surface 780, and will not affect the focal length of the optical imaging lens assembly.

The detailed optical data of the 7th embodiment are shown in Table 13 and the aspheric surface data are shown in Table 14 below.

TABLE 13

7th Embodiment
f = 8.38 mm, Fno = 2.06, HFOV = 18.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.650 | | | | |
| 2 | Lens 1 | 3.421 | ASP | 1.800 | Plastic | 1.544 | 55.9 | 5.68 |
| 3 | | −26.000 | ASP | 0.271 | | | | |
| 4 | Lens 2 | −7.315 | ASP | 0.646 | Plastic | 1.639 | 23.3 | 14.26 |
| 5 | | −4.197 | ASP | 0.100 | | | | |
| 6 | Lens 3 | 18.311 | ASP | 1.124 | Plastic | 1.660 | 20.4 | −3.93 |
| 7 | | 2.219 | ASP | 0.878 | | | | |
| 8 | Lens 4 | 27.971 | ASP | 1.400 | Plastic | 1.639 | 23.3 | 139.30 |
| 9 | | 40.000 | ASP | 0.292 | | | | |
| 10 | Lens 5 | 3.984 | ASP | 0.909 | Plastic | 1.544 | 55.9 | 8.78 |
| 11 | | 22.194 | ASP | 1.189 | | | | |
| 12 | Lens 6 | −6.388 | ASP | 0.417 | Plastic | 1.515 | 56.5 | −9.30 |
| 13 | | 19.537 | ASP | 0.300 | | | | |
| 14 | IR-cut filter | Plano | | 0.250 | Glass | 1.517 | 64.2 | — |
| 15 | | Plano | | 0.243 | | | | |
| 16 | Image | Plano | | — | | | | |

Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | −6.6173E−02 | 2.3051E+01 | −6.6201E+01 | −2.2148E+01 | −3.0520E+01 | −1.1495E+00 |
| A4 = | −1.7293E−04 | −2.8444E−03 | −1.3202E−02 | 2.7224E−02 | 2.9988E−02 | −2.6743E−02 |
| A6 = | −8.5768E−05 | 3.3015E−03 | 1.8720E−02 | −5.7739E−03 | −2.2067E−02 | 1.2529E−02 |
| A8 = | 1.0669E−05 | −1.3521E−03 | −9.0282E−03 | 2.3104E−03 | 1.0079E−02 | −4.0927E−03 |
| A10 = | −4.1118E−06 | 3.0000E−04 | 2.4405E−03 | −1.2372E−03 | −3.4264E−03 | 8.1521E−04 |
| A12 = | 4.0213E−07 | −2.5505E−05 | −3.3712E−04 | 3.4725E−04 | 6.7832E−04 | −5.5433E−05 |
| A14 = | | | 1.8339E−05 | −3.5372E−05 | −5.6245E−05 | |

| Surface # | 8 | 9 | 10 | 11 | 12 | 13 |
|---|---|---|---|---|---|---|
| k = | 8.8645E+01 | −4.9096E+01 | −1.5629E+01 | 5.8378E+01 | 3.4663E+00 | 2.2356E+01 |
| A4 = | −7.1880E−03 | −4.9496E−02 | −3.8354E−02 | −2.3781E−02 | −5.2045E−02 | −5.0696E−02 |
| A6 = | 3.5086E−03 | 3.3758E−02 | 2.9031E−02 | 1.4459E−02 | 3.1064E−02 | 1.7755E−02 |
| A8 = | −5.8003E−04 | −1.5867E−02 | −1.1171E−02 | −2.4618E−03 | −7.0262E−03 | −3.2723E−03 |
| A10 = | 2.7623E−05 | 4.6573E−03 | 2.2055E−03 | −2.8425E−04 | 9.3458E−04 | 3.8954E−04 |
| A12 = | 1.0164E−05 | −7.9691E−04 | −2.4091E−04 | 1.4083E−04 | −7.2199E−05 | −3.2369E−05 |
| A14 = | | 7.0870E−05 | 1.3181E−05 | −1.6885E−05 | 2.9199E−06 | 2.1307E−06 |
| A16 = | | −2.2984E−06 | −2.6371E−07 | 6.8378E−07 | −4.2038E−08 | −7.9033E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 8.38 | f/f3 | −2.13 |
| Fno | 2.06 | (f/R5) − (f/R6) + (f × CT3/(R5 × R6)) | −3.09 |
| HFOV [deg.] | 18.5 | Y11/Y62 | 0.75 |
| Nmax | 1.660 | tan (2 × HFOV) | 0.75 |
| V3 | 20.4 | SL/TL | 0.93 |
| CT1/CT2 | 2.79 | BL/TD | 0.09 |
| (T34 + T56)/(T12 + T23 + T45) | 3.12 | f/EPD | 2.06 |
| R6/f | 0.26 | EPD/ImgH | 1.41 |
| (R5 + R6)/(R5 − R6) | 1.28 | TL/ImgH | 3.39 |
| |R11/R12| | 0.33 | ImgH/f | 0.36 |
| f/f1 | 1.47 | TL/f | 1.17 |

Furthermore, in the optical imaging lens assembly according to the 7th embodiment, when a focal length of the first lens element 710 is f1, a focal length of the second lens element 720 is f2, a focal length of the third lens element 730 is f3, a focal length of the fourth lens element 740 is f4, a focal length of the fifth lens element 750 is f5, and a focal length of the sixth lens element 760 is f6, the following conditions are satisfied: |f1|<|f2|; |f3|<|f2|; |f3|<|f4|; |f3|<|f5|; and |f3|<|f6|.

In the optical imaging lens assembly according to the 7th embodiment, when a central thickness of the first lens element 710 is CT1, a central thickness of the second lens element 720 is CT2, a central thickness of the third lens element 730 is CT3, a central thickness of the fourth lens element 740 is CT4, a central thickness of the fifth lens element 750 is CT5, and a central thickness of the sixth lens element 760 is CT6, CT1 is a maximum among CT1, CT2, CT3, CT4, CT5 and CT6.

According to the 7th embodiment, a number of inflection points of each of the object-side surfaces (711, 721, 731, 741, 751, 761) and the image-side surfaces (712, 722, 732, 742, 752, 762) of the first lens element 710, the second lens element 720, the third lens element 730, the fourth lens element 740, the fifth lens element 750 and the sixth lens element 760 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 711 | 712 | 721 | 722 | 731 | 732 |
| Number of reflection point(s) | 0 | 1 | 1 | 1 | 1 | 0 |

| Lens element | Fourth | | Fifth | | Sixth | |
|---|---|---|---|---|---|---|
| Surface | 741 | 742 | 751 | 752 | 761 | 762 |
| Number of reflection point(s) | 0 | 2 | 1 | 3 | 1 | 2 |

8th Embodiment

Figure 15:
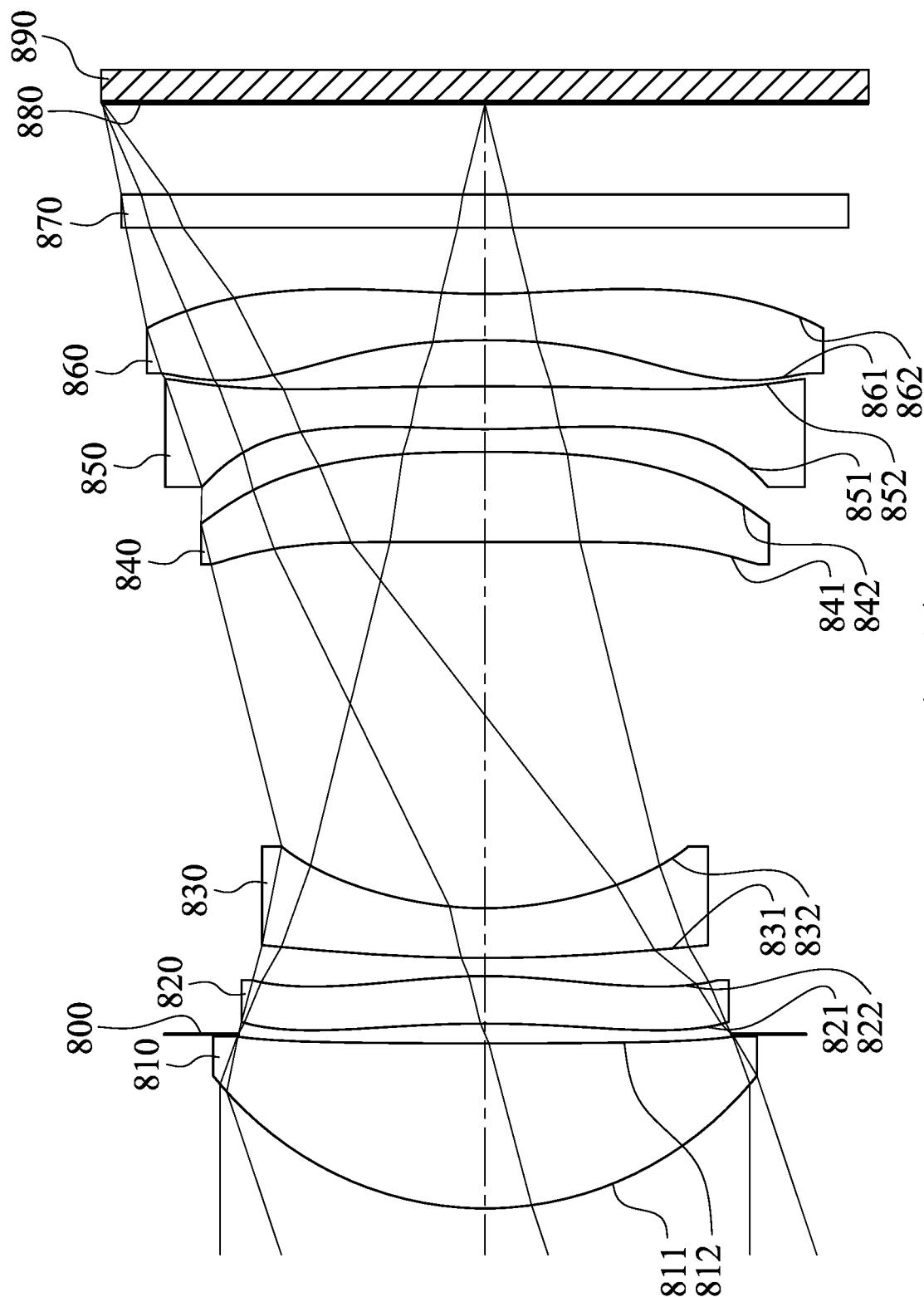
FIG. 15 is a schematic view of an image capturing device according to the 8th embodiment of the present disclosure.
Figure 16:
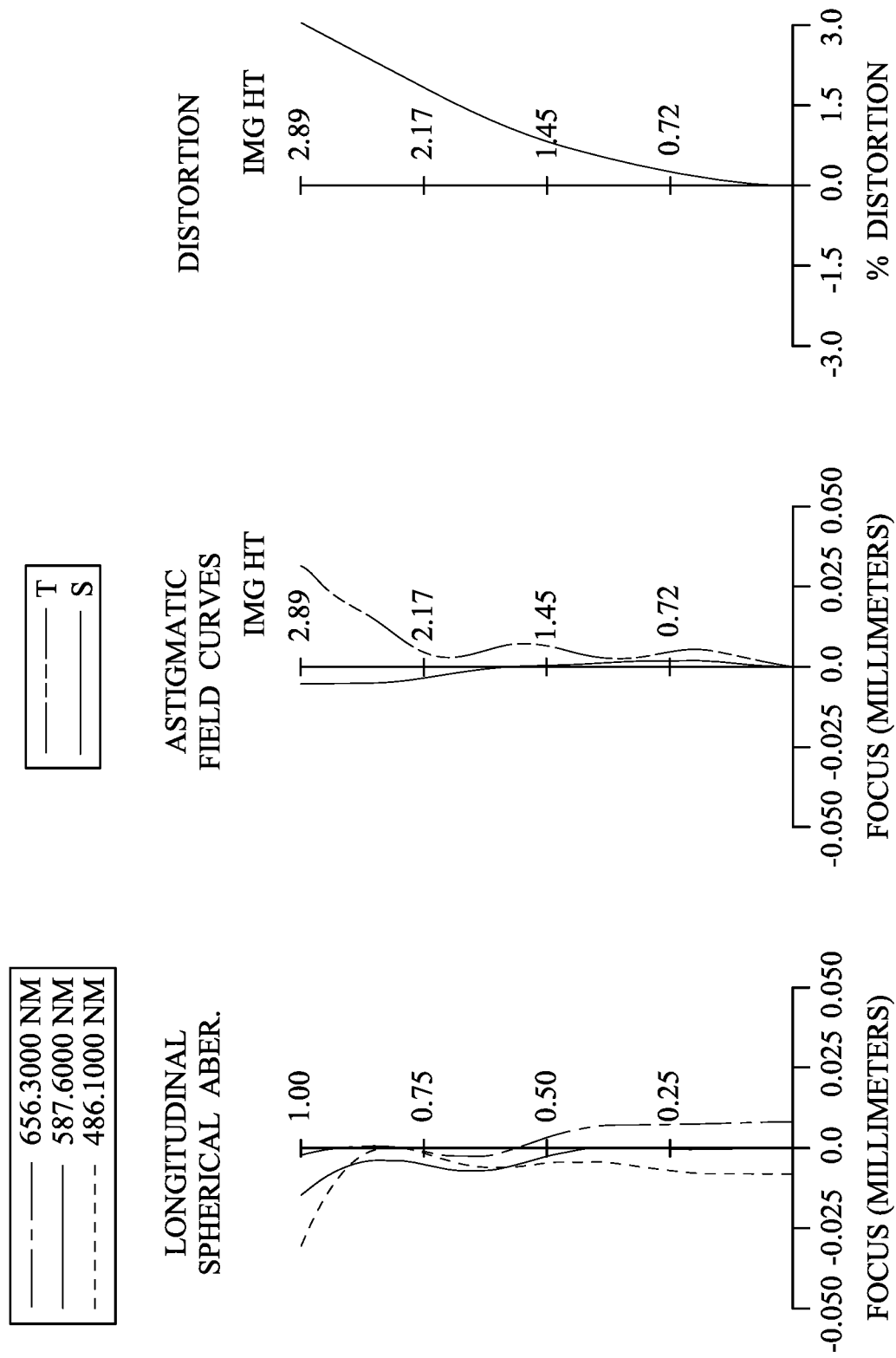
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes an optical imaging lens assembly (its reference numeral is omitted) and an image sensor 890. The optical imaging lens assembly includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the image sensor 890 is disposed on the image surface 880 of the optical imaging lens assembly. The optical imaging lens assembly has a total of six lens elements (810-860), and there is an air space between every two lens elements of the first lens element 810, the second lens element 820, the third lens element 830, the fourth lens element 840, the fifth lens element 850 and the sixth lens element 860 that are adjacent to each other.

The first lens element 810 with positive refractive power has an object-side surface 811 being convex and an image-side surface 812 being concave. The first lens element 810 is made of a plastic material, and has the object-side surface 811 and the image-side surface 812 being both aspheric.

The second lens element 820 with positive refractive power has an object-side surface 821 being concave and an image-side surface 822 being convex. The second lens element 820 is made of a plastic material, and has the object-side surface 821 and the image-side surface 822 being both aspheric. Furthermore, both of the object-side surface 821 and the image-side surface 822 of the second lens element 820 include at least one inflection point.

The third lens element 830 with negative refractive power has an object-side surface 831 being convex and an image-side surface 832 being concave. The third lens element 830 is made of a plastic material, and has the object-side surface 831 and the image-side surface 832 being both aspheric. Furthermore, the object-side surface 831 of the third lens element 830 includes at least one inflection point.

The fourth lens element 840 with positive refractive power has an object-side surface 841 being convex and an image-side surface 842 being convex. The fourth lens element 840 is made of a plastic material, and has the object-side surface 841 and the image-side surface 842 being both aspheric. Furthermore, both of the object-side surface 841 and the image-side surface 842 of the fourth lens element 840 include at least one inflection point.

The fifth lens element 850 with positive refractive power has an object-side surface 851 being convex and an image-side surface 852 being convex. The fifth lens element 850 is made of a plastic material, and has the object-side surface 851 and the image-side surface 852 being both aspheric. Furthermore, both of the object-side surface 851 and the image-side surface 852 of the fifth lens element 850 include at least one inflection point.

The sixth lens element 860 with negative refractive power has an object-side surface 861 being concave in a paraxial region thereof and an image-side surface 862 being concave in a paraxial region thereof. The sixth lens element 860 is made of a plastic material, and has the object-side surface 861 and the image-side surface 862 being both aspheric. Furthermore, the object-side surface 861 of the sixth lens element 860 includes at least one convex shape in an off-axial region thereof, the image-side surface 862 of the sixth lens element 860 includes at least one convex shape in an off-axial region thereof, and both of the object-side surface 861 and the image-side surface 862 of the sixth lens element 860 include at least one inflection point.

The IR-cut filter 870 is made of a glass material and located between the sixth lens element 860 and the image surface 880, and will not affect the focal length of the optical imaging lens assembly.

The detailed optical data of the 8th embodiment are shown in Table 15 and the aspheric surface data are shown in Table 16 below.

TABLE 15

8th Embodiment
f = 8.39 mm, Fno = 2.10, HFOV = 18.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.574 | ASP | 1.245 | Plastic | 1.535 | 55.8 | 4.99 |
| 2 | | 60.760 | ASP | 0.069 | | | | |
| 3 | Ape. Stop | Plano | | 0.081 | | | | |
| 4 | Lens 2 | −9.490 | ASP | 0.359 | Plastic | 1.639 | 23.3 | 12.45 |
| 5 | | −4.391 | ASP | 0.138 | | | | |
| 6 | Lens 3 | 19.285 | ASP | 0.374 | Plastic | 1.660 | 20.4 | −4.69 |
| 7 | | 2.647 | ASP | 2.765 | | | | |
| 8 | Lens 4 | 112.959 | ASP | 0.680 | Plastic | 1.639 | 23.3 | 26.64 |
| 9 | | −19.984 | ASP | 0.171 | | | | |
| 10 | Lens 5 | 6.954 | ASP | 0.323 | Plastic | 1.544 | 55.9 | 12.59 |
| 11 | | −434.189 | ASP | 0.349 | | | | |
| 12 | Lens 6 | −6.271 | ASP | 0.350 | Plastic | 1.535 | 55.8 | −5.69 |
| 13 | | 6.025 | ASP | 0.500 | | | | |
| 14 | IR-cut filter | Plano | | 0.250 | Glass | 1.517 | 64.2 | — |
| 15 | | Plano | | 0.693 | | | | |
| 16 | Image | Plano | | — | | | | |

Reference wavelength is 587.6 nm (d-line).

TABLE 16

Aspheric Coefficients

| Surface # | 1 | 2 | 4 | 5 | 6 | 7 |
|---|---|---|---|---|---|---|
| k = | −3.8598E−02 | 9.0000E+01 | −9.0000E+01 | −2.2424E+01 | −9.0000E+01 | −4.2836E−01 |
| A4 = | 1.6885E−04 | −4.0947E−03 | −1.0201E−02 | 2.8291E−02 | 2.6952E−02 | −2.2009E−02 |
| A6 = | −9.0468E−06 | 3.5907E−03 | 1.9274E−02 | −5.6340E−03 | −2.2185E−02 | 1.1966E−02 |
| A8 = | 3.9299E−06 | −1.2638E−03 | −8.9724E−03 | 2.3857E−03 | 1.0092E−02 | −3.8808E−03 |
| A10 = | −3.2166E−06 | 3.0220E−04 | 2.4348E−03 | −1.1879E−03 | −3.3432E−03 | 1.1482E−03 |
| A12 = | −6.2665E−07 | −2.7291E−05 | −3.3916E−04 | 3.4159E−04 | 7.7423E−04 | 2.9616E−06 |
| A14 = | | | 2.0581E−05 | −3.2829E−05 | −8.2621E−05 | |

| Surface # | 8 | 9 | 10 | 11 | 12 | 13 |
|---|---|---|---|---|---|---|
| k = | −9.0000E+01 | 7.1232E+01 | −9.0000E+01 | 9.0000E+01 | 4.6232E+00 | −6.2040E+01 |
| A4 = | −7.7227E−03 | −5.3755E−02 | −5.6413E−02 | −2.3597E−02 | −5.3452E−02 | −3.7789E−02 |
| A6 = | 8.0785E−04 | 3.3510E−02 | 2.9369E−02 | 1.4146E−02 | 3.1652E−02 | 1.3903E−02 |
| A8 = | −8.2678E−04 | −1.5996E−02 | −1.1402E−02 | −2.3102E−03 | −6.9972E−03 | −3.2624E−03 |
| A10 = | 4.3941E−05 | 4.6225E−03 | 2.2174E−03 | −2.6825E−04 | 9.3235E−04 | 4.0942E−04 |
| A12 = | 1.6866E−05 | −7.9728E−04 | −2.3878E−04 | 1.4224E−04 | −7.2227E−05 | −3.0726E−05 |
| A14 = | | 7.1962E−05 | 1.2759E−05 | −1.6909E−05 | 2.8833E−06 | 2.1033E−06 |
| A16 = | | −2.2200E−06 | −1.4697E−07 | 6.1765E−07 | −5.0826E−08 | −1.1447E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.39 | f/f3 | −1.79 |
| Fno | 2.10 | (f/R5) − (f/R6) + (f × CT3/(R5 × R6)) | −2.67 |
| HFOV [deg.] | 18.5 | Y11/Y62 | 0.80 |
| Nmax | 1.660 | tan (2 × HFOV) | 0.75 |
| V3 | 20.4 | SL/TL | 0.84 |
| CT1/CT2 | 3.47 | BL/TD | 0.21 |
| (T34 + T56)/(T12 + T23 + T45) | 6.78 | f/EPD | 2.10 |
| R6/f | 0.32 | EPD/ImgH | 1.38 |
| (R5 + R6)/(R5 − R6) | 1.32 | TL/ImgH | 2.88 |
| |R11/R12| | 1.04 | ImgH/f | 0.34 |
| f/f1 | 1.68 | TL/f | 0.99 |

Furthermore, in the optical imaging lens assembly according to the 8th embodiment, when a focal length of the first lens element 810 is f1, a focal length of the second lens element 820 is f2, a focal length of the third lens element 830 is f3, a focal length of the fourth lens element 840 is f4, a focal length of the fifth lens element 850 is f5, and a focal length of the sixth lens element 860 is f6, the following conditions are satisfied: |f1|<|f2|; |f3|<|f2|; |f3|<|f4|; |f3|<|f5|; and |f3|<|f6|.

In the optical imaging lens assembly according to the 8th embodiment, when a central thickness of the first lens element 810 is CT1, a central thickness of the second lens element 820 is CT2, a central thickness of the third lens element 830 is CT3, a central thickness of the fourth lens element 840 is CT4, a central thickness of the fifth lens element 850 is CT5, and a central thickness of the sixth lens element 860 is CT6, CT1 is a maximum among CT1, CT2, CT3, CT4, CT5 and CT6.

In the optical imaging lens assembly according to the 8th embodiment, when the axial distance between the first lens element 810 and the second lens element 820 is T12, the axial distance between the second lens element 820 and the third lens element 830 is T23, the axial distance between the third lens element 830 and the fourth lens element 840 is T34, the axial distance between the fourth lens element 840 and the fifth lens element 850 is T45, the axial distance between the fifth lens element 850 and the sixth lens element 860 is T56, and T34 is a maximum among T12, T23, T34, T45 and T56.

According to the 8th embodiment, a number of inflection points of each of the object-side surfaces (811, 821, 831, 841, 851, 861) and the image-side surfaces (812, 822, 832, 842, 852, 862) of the first lens element 810, the second lens element 820, the third lens element 830, the fourth lens element 840, the fifth lens element 850 and the sixth lens element 860 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 811 | 812 | 821 | 822 | 831 | 832 |
| Number of reflection point(s) | 0 | 0 | 1 | 1 | 1 | 0 |

| Lens element | Fourth | | Fifth | | Sixth | |
|---|---|---|---|---|---|---|
| Surface | 841 | 842 | 851 | 852 | 861 | 862 |
| Number of reflection point(s) | 2 | 1 | 1 | 2 | 2 | 1 |

9th Embodiment

Figure 17:
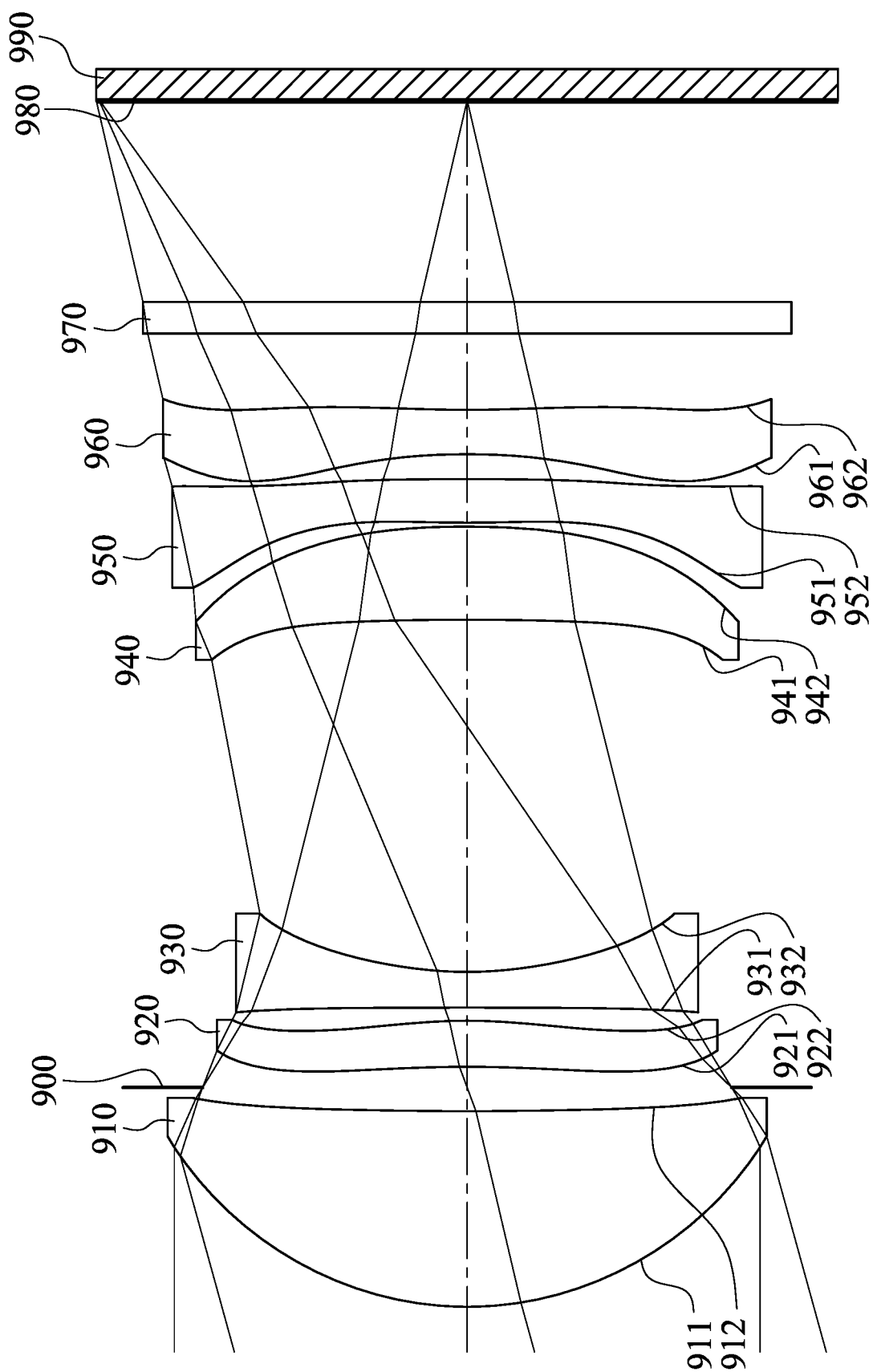
FIG. 17 is a schematic view of an image capturing device according to the 9th embodiment of the present disclosure.
Figure 18:
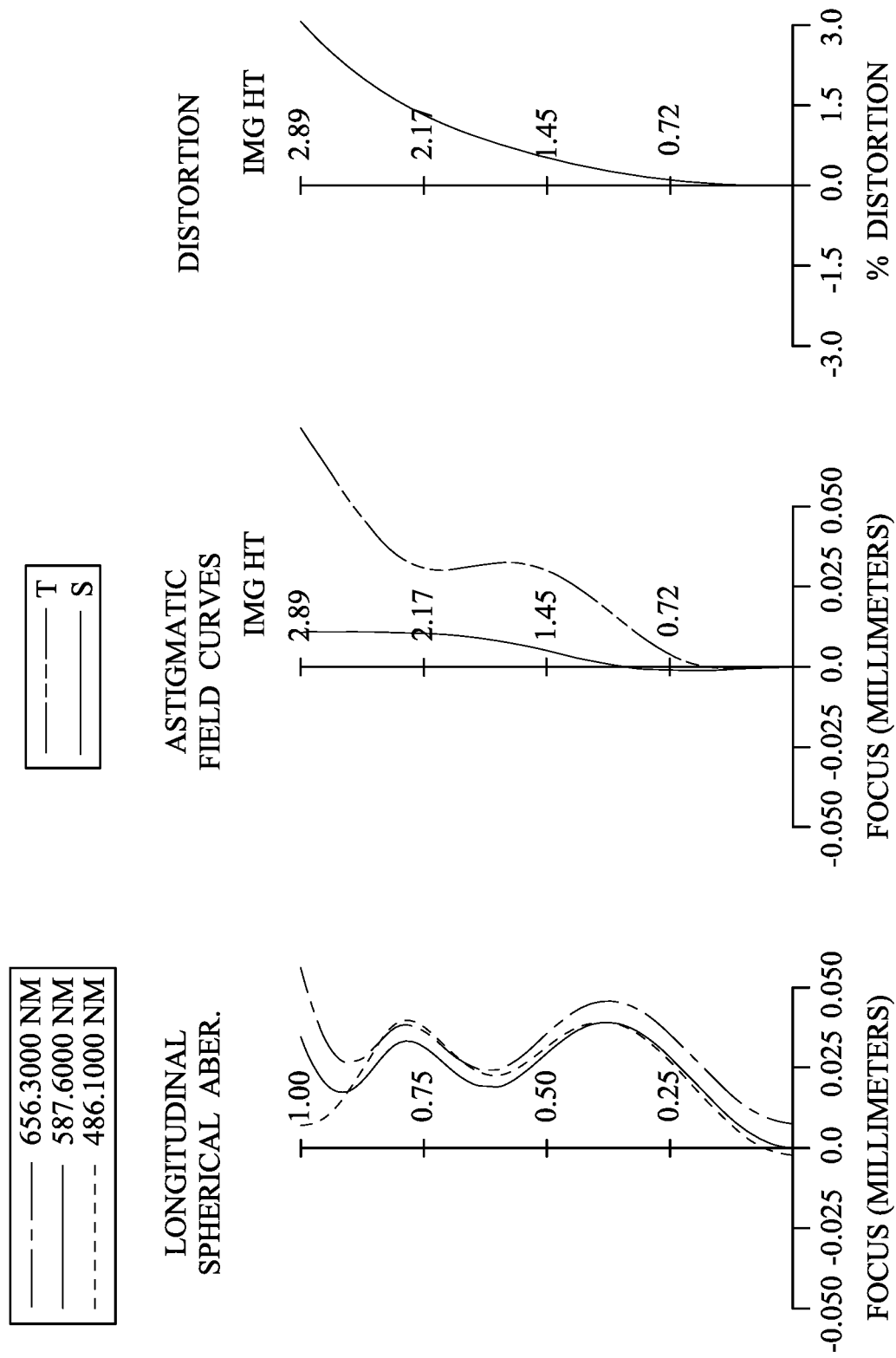
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows spherical aberration curves, astigmatic field curves and a distortion curve of the image capturing device according to the 9th embodiment. In FIG. 17, the image capturing device includes an optical imaging lens assembly (its reference numeral is omitted) and an image sensor 990. The optical imaging lens assembly includes, in order from an object side to an image side, a first lens element 910, an aperture stop 900, a second lens element 920, a third lens element 930, a fourth lens element 940, a fifth lens element 950, a sixth lens element 960, an IR-cut filter 970 and an image surface 980, wherein the image sensor 990 is disposed on the image surface 980 of the optical imaging lens assembly. The optical imaging lens assembly has a total of six lens elements (910-960), and there is an air space between every two lens elements of the first lens element 910, the second lens element 920, the third lens element 930, the fourth lens element 940, the fifth lens element 950 and the sixth lens element 960 that are adjacent to each other.

The first lens element 910 with positive refractive power has an object-side surface 911 being convex and an image-side surface 912 being concave. The first lens element 910 is made of a plastic material, and has the object-side surface 911 and the image-side surface 912 being both aspheric.

The second lens element 920 with positive refractive power has an object-side surface 921 being concave and an image-side surface 922 being convex. The second lens element 920 is made of a plastic material, and has the object-side surface 921 and the image-side surface 922 being both aspheric. Furthermore, both of the object-side surface 921 and the image-side surface 922 of the second lens element 920 include at least one inflection point.

The third lens element 930 with negative refractive power has an object-side surface 931 being concave and an image-side surface 932 being concave. The third lens element 930 is made of a plastic material, and has the object-side surface 931 and the image-side surface 932 being both aspheric. Furthermore, the object-side surface 931 of the third lens element 930 includes at least one inflection point.

The fourth lens element 940 with positive refractive power has an object-side surface 941 being concave and an image-side surface 942 being convex. The fourth lens element 940 is made of a plastic material, and has the object-side surface 941 and the image-side surface 942 being both aspheric.

The fifth lens element 950 with positive refractive power has an object-side surface 951 being convex and an image-side surface 952 being convex. The fifth lens element 950 is made of a plastic material, and has the object-side surface 951 and the image-side surface 952 being both aspheric. Furthermore, both of the object-side surface 951 and the image-side surface 952 of the fifth lens element 950 include at least one inflection point.

The sixth lens element 960 with negative refractive power has an object-side surface 961 being concave in a paraxial region thereof and an image-side surface 962 being concave in a paraxial region thereof. The sixth lens element 960 is made of a plastic material, and has the object-side surface 961 and the image-side surface 962 being both aspheric. Furthermore, the object-side surface 961 of the sixth lens element 960 includes at least one convex shape in an off-axial region thereof, the image-side surface 962 of the sixth lens element 960 includes at least one convex shape in an off-axial region thereof, and both of the object-side surface 961 and the image-side surface 962 of the sixth lens element 960 include at least one inflection point.

The IR-cut filter 970 is made of a glass material and located between the sixth lens element 960 and the image surface 980, and will not affect the focal length of the optical imaging lens assembly.

The detailed optical data of the 9th embodiment are shown in Table 17 and the aspheric surface data are shown in Table 18 below.

TABLE 17

9th Embodiment
f = 10.14 mm, Fno = 2.20, HFOV = 15.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.686 | ASP | 1.540 | Plastic | 1.535 | 55.8 | 5.36 |
| 2 | | 34.347 | ASP | 0.186 | | | | |
| 3 | Ape. Stop | Plano | | 0.163 | | | | |
| 4 | Lens 2 | −11.215 | ASP | 0.363 | Plastic | 1.639 | 23.3 | 10.86 |
| 5 | | −4.340 | ASP | 0.104 | | | | |
| 6 | Lens 3 | −35.337 | ASP | 0.280 | Plastic | 1.660 | 20.4 | −4.36 |
| 7 | | 3.142 | ASP | 2.773 | | | | |
| 8 | Lens 4 | −26.193 | ASP | 0.732 | Plastic | 1.639 | 23.3 | 20.31 |
| 9 | | −8.770 | ASP | 0.032 | | | | |
| 10 | Lens 5 | 9.855 | ASP | 0.342 | Plastic | 1.544 | 55.9 | 17.81 |
| 11 | | −556.656 | ASP | 0.196 | | | | |
| 12 | Lens 6 | −6.210 | ASP | 0.350 | Plastic | 1.535 | 55.8 | −6.99 |
| 13 | | 9.575 | ASP | 0.600 | | | | |
| 14 | IR-cut filter | Plano | | 0.250 | Glass | 1.517 | 64.2 | — |
| 15 | | Plano | | 1.583 | | | | |
| 16 | Image | Plano | | — | | | | |

Reference wavelength is 587.6 nm (d-line).

TABLE 18

Aspheric Coefficients

| Surface # | 1 | 2 | 4 | 5 | 6 | 7 |
|---|---|---|---|---|---|---|
| k = | −1.4656E−02 | −9.0000E+01 | −8.9898E+01 | −2.1478E+01 | 9.0000E+01 | −4.4080E−01 |
| A4 = | −9.5998E−04 | −3.6922E−03 | −7.5437E−03 | 2.8669E−02 | 2.5433E−02 | −2.2266E−02 |
| A6 = | 2.0883E−04 | 3.4614E−03 | 1.9483E−02 | −5.5008E−03 | −2.2715E−02 | 1.1786E−02 |
| A8 = | −3.8823E−05 | −1.3235E−03 | −9.0520E−03 | 2.3326E−03 | 1.0174E−02 | −3.4264E−03 |
| A10 = | −1.4823E−05 | 2.8182E−04 | 2.4195E−03 | −1.2158E−03 | −3.2308E−03 | 1.0127E−03 |
| A12 = | 2.2329E−06 | −2.1825E−05 | −3.3174E−04 | 3.3090E−04 | 6.9692E−04 | −2.4616E−05 |
| A14 = | | | 2.1139E−05 | −2.5592E−05 | −6.8153E−05 | |

| Surface # | 8 | 9 | 10 | 11 | 12 | 13 |
|---|---|---|---|---|---|---|
| k = | −9.0000E+01 | 1.3249E+01 | −9.0000E+01 | 9.0000E+01 | 5.0805E+00 | −6.7335E+01 |
| A4 = | −1.8865E−03 | −5.6816E−02 | −8.1014E−02 | −3.1420E−02 | −4.4107E−02 | −3.3969E−02 |
| A6 = | −1.3800E−03 | 3.5102E−02 | 3.2731E−02 | 1.5149E−02 | 3.1597E−02 | 1.3112E−02 |
| A8 = | −7.4223E−04 | −1.6051E−02 | −1.1333E−02 | −2.2372E−03 | −6.9997E−03 | −3.0612E−03 |
| A10 = | 7.9994E−05 | 4.5688E−03 | 2.2587E−03 | −2.7710E−04 | 9.2855E−04 | 4.4093E−04 |
| A12 = | −3.1540E−06 | −7.9722E−04 | −2.3317E−04 | 1.4028E−04 | −7.3078E−05 | −2.9220E−05 |
| A14 = | | 7.3209E−05 | 1.2561E−05 | −1.7116E−05 | 2.7954E−06 | 1.9056E−06 |
| A16 = | | −2.2712E−06 | −1.8546E−07 | 6.4450E−07 | 1.0354E−08 | −1.9328E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 10.14 | f/f3 | −2.32 |
| Fno | 2.20 | (f/R5) − (f/R6) + (f × CT3/(R5 × R6)) | −3.54 |
| HFOV [deg.] | 15.4 | Y11/Y62 | 0.98 |
| Nmax | 1.660 | tan (2 × HFOV) | 0.60 |
| V3 | 20.4 | SL/TL | 0.82 |
| CT1/CT2 | 4.24 | BL/TD | 0.34 |
| (T34 + T56)/(T12 + T23 + T45) | 6.12 | f/EPD | 2.20 |
| R6/f | 0.31 | EPD/ImgH | 1.59 |
| (R5 + R6)/(R5 − R6) | 0.84 | TL/ImgH | 3.28 |
| |R11/R12| | 0.65 | ImgH/f | 0.29 |
| f/f1 | 1.89 | TL/f | 0.94 |

Furthermore, in the optical imaging lens assembly according to the 9th embodiment, when a focal length of the first lens element 910 is f1, a focal length of the second lens element 920 is f2, a focal length of the third lens element 930 is f3, a focal length of the fourth lens element 940 is f4, a focal length of the fifth lens element 950 is f5, and a focal length of the sixth lens element 960 is f6, the following conditions are satisfied: |f1|<|f2|; |f3|<|f2|; |f3|≤|f4|; |f3|<|f5|; and |f3|<|f6|.

In the optical imaging lens assembly according to the 9th embodiment, when a central thickness of the first lens element 910 is CT1, a central thickness of the second lens element 920 is CT2, a central thickness of the third lens element 930 is CT3, a central thickness of the fourth lens element 940 is CT4, a central thickness of the fifth lens element 950 is CT5, and a central thickness of the sixth lens element 960 is CT6, CT1 is a maximum among CT1, CT2, CT3, CT4, CT5 and CT6.

In the optical imaging lens assembly according to the 9th embodiment, when the axial distance between the first lens element 910 and the second lens element 920 is T12, the axial distance between the second lens element 920 and the third lens element 930 is T23, the axial distance between the third lens element 930 and the fourth lens element 940 is T34, the axial distance between the fourth lens element 940 and the fifth lens element 950 is T45, the axial distance between the fifth lens element 950 and the sixth lens element 960 is T56, and T34 is a maximum among T12, T23, T34, T45 and T56.

According to the 9th embodiment, a number of inflection points of each of the object-side surfaces (911, 921, 931, 941, 951, 961) and the image-side surfaces (912, 922, 932, 942, 952, 962) of the first lens element 910, the second lens element 920, the third lens element 930, the fourth lens element 940, the fifth lens element 950 and the sixth lens element 960 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 911 | 912 | 921 | 922 | 931 | 932 |
| Number of reflection point(s) | 0 | 0 | 1 | 1 | 2 | 0 |

| Lens element | Fourth | | Fifth | | Sixth | |
|---|---|---|---|---|---|---|
| Surface | 941 | 942 | 951 | 952 | 961 | 962 |
| Number of reflection point(s) | 0 | 0 | 2 | 2 | 2 | 2 |

10th Embodiment

Figure 19:
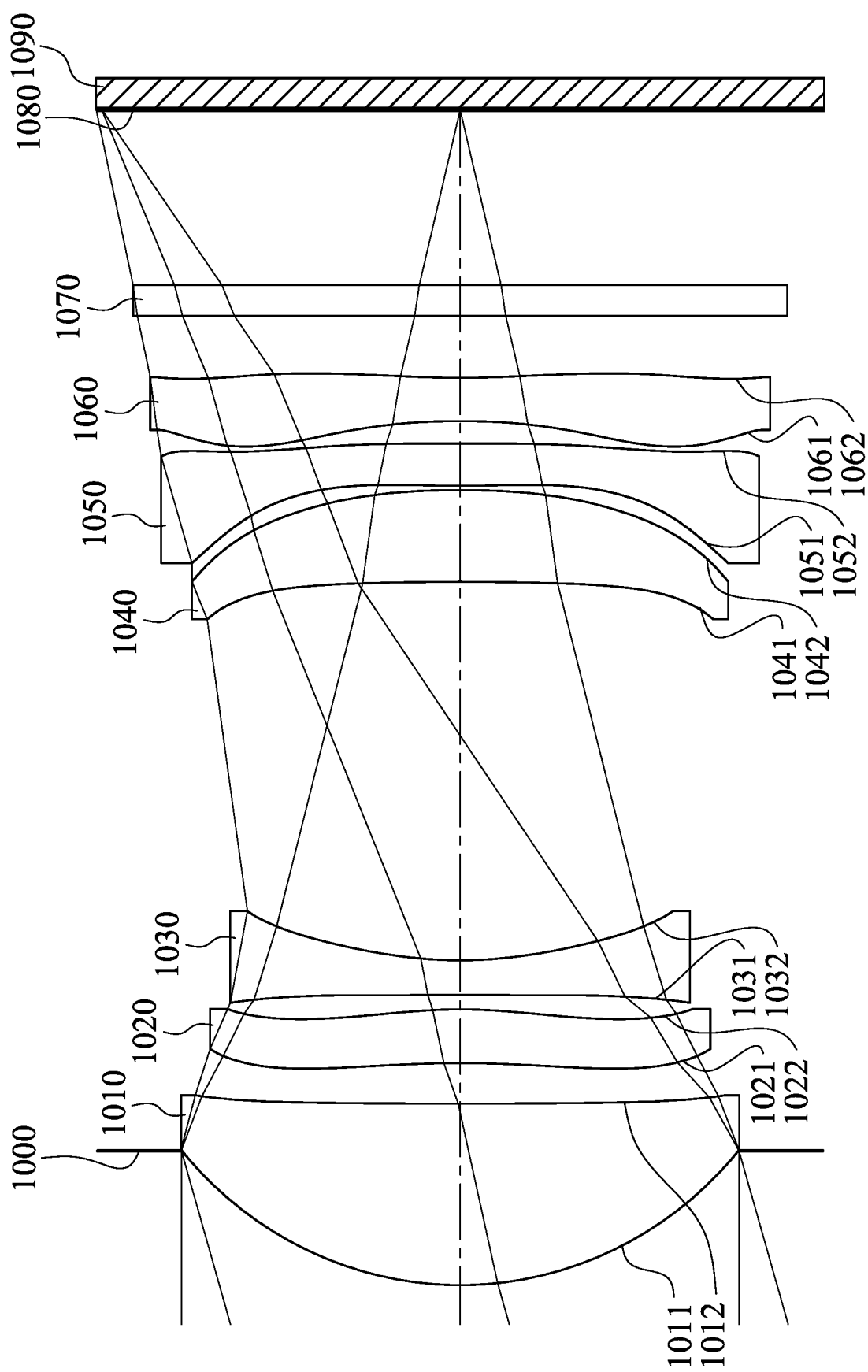
FIG. 19 is a schematic view of an image capturing device according to the 10th embodiment of the present disclosure.
Figure 20:
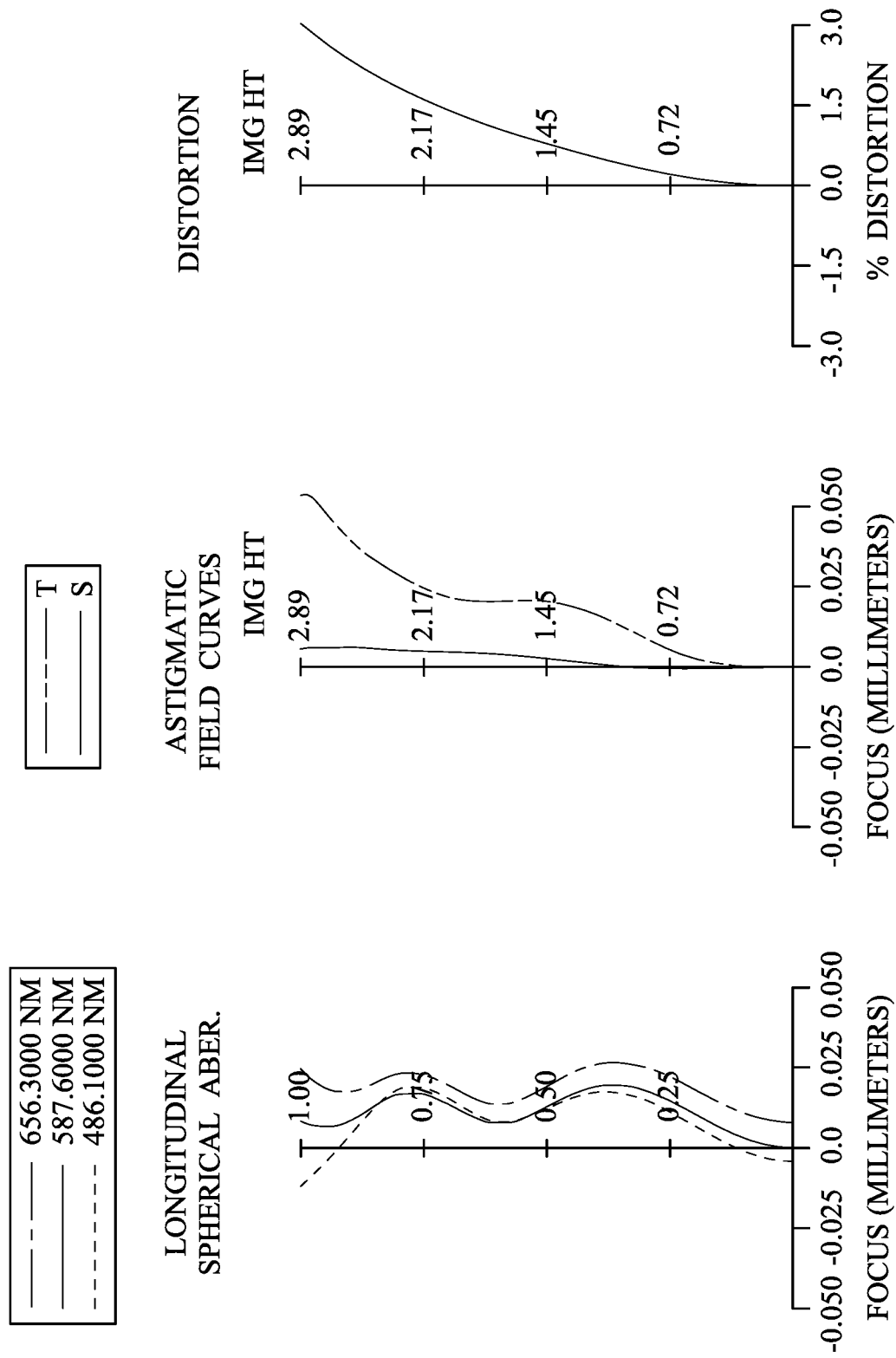
FIG. 20 shows spherical aberration curves, astigmatic field curves and a distortion curve of the image capturing device according to the 10th embodiment.

FIG. 19 is a schematic view of an image capturing device according to the 10th embodiment of the present disclosure. FIG. 20 shows spherical aberration curves, astigmatic field curves and a distortion curve of the image capturing device according to the 10th embodiment. In FIG. 19, the image capturing device includes an optical imaging lens assembly (its reference numeral is omitted) and an image sensor 1090. The optical imaging lens assembly includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1070 and an image surface 1080, wherein the image sensor 1090 is disposed on the image surface 1080 of the optical imaging lens assembly. The optical imaging lens assembly has a total of six lens elements (1010-1060), and there is an air space between every two lens elements of the first lens element 1010, the second lens element 1020, the third lens element 1030, the fourth lens element 1040, the fifth lens element 1050 and the sixth lens element 1060 that are adjacent to each other.

The first lens element 1010 with positive refractive power has an object-side surface 1011 being convex and an image-side surface 1012 being concave. The first lens element 1010 is made of a plastic material, and has the object-side surface 1011 and the image-side surface 1012 being both aspheric.

The second lens element 1020 with positive refractive power has an object-side surface 1021 being concave and an image-side surface 1022 being convex. The second lens element 1020 is made of a plastic material, and has the object-side surface 1021 and the image-side surface 1022 being both aspheric. Furthermore, both of the object-side surface 1021 and the image-side surface 1022 of the second lens element 1020 include at least one inflection point.

The third lens element 1030 with negative refractive power has an object-side surface 1031 being concave and an image-side surface 1032 being concave. The third lens element 1030 is made of a plastic material, and has the object-side surface 1031 and the image-side surface 1032 being both aspheric. Furthermore, the object-side surface 1031 of the third lens element 1030 includes at least one inflection point.

The fourth lens element 1040 with positive refractive power has an object-side surface 1041 being concave and an image-side surface 1042 being convex. The fourth lens element 1040 is made of a plastic material, and has the object-side surface 1041 and the image-side surface 1042 being both aspheric.

The fifth lens element 1050 with positive refractive power has an object-side surface 1051 being convex and an image-side surface 1052 being concave. The fifth lens element 1050 is made of a plastic material, and has the object-side surface 1051 and the image-side surface 1052 being both aspheric. Furthermore, both of the object-side surface 1051 and the image-side surface 1052 of the fifth lens element 1050 include at least one inflection point.

The sixth lens element 1060 with negative refractive power has an object-side surface 1061 being concave in a paraxial region thereof and an image-side surface 1062 being concave in a paraxial region thereof. The sixth lens element 1060 is made of a plastic material, and has the object-side surface 1061 and the image-side surface 1062 being both aspheric. Furthermore, the object-side surface 1061 of the sixth lens element 1060 includes at least one convex shape in an off-axial region thereof, the image-side surface 1062 of the sixth lens element 1060 includes at least one convex shape in an off-axial region thereof, and both of the object-side surface 1061 and the image-side surface 1062 of the sixth lens element 1060 include at least one inflection point.

The aperture stop 1000 is located along an optical axis between a center of the object-side surface 1011 of the first lens element 1010 on the optical axis and a location of a maximum effective radius of the object-side surface 1011 of the first lens element 1010 projected on the optical axis.

The IR-cut filter 1070 is made of a glass material and located between the sixth lens element 1060 and the image surface 1080, and will not affect the focal length of the optical imaging lens assembly.

The detailed optical data of the 10th embodiment are shown in Table 19 and the aspheric surface data are shown in Table 20 below.

TABLE 19

10th Embodiment
f = 9.90 mm, Fno = 2.20, HFOV = 15.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.085 | | | | |
| 2 | Lens 1 | 2.829 | ASP | 1.466 | Plastic | 1.535 | 55.8 | 5.43 |
| 3 | | 91.666 | ASP | 0.327 | | | | |
| 4 | Lens 2 | −9.642 | ASP | 0.434 | Plastic | 1.639 | 23.3 | 11.58 |
| 5 | | −4.259 | ASP | 0.117 | | | | |
| 6 | Lens 3 | −37.487 | ASP | 0.280 | Plastic | 1.660 | 20.4 | −4.76 |
| 7 | | 3.437 | ASP | 3.057 | | | | |
| 8 | Lens 4 | −30.034 | ASP | 0.741 | Plastic | 1.639 | 23.3 | 17.29 |
| 9 | | −8.153 | ASP | 0.035 | | | | |
| 10 | Lens 5 | 10.003 | ASP | 0.341 | Plastic | 1.544 | 55.9 | 19.97 |
| 11 | | 125.777 | ASP | 0.181 | | | | |
| 12 | Lens 6 | −6.533 | ASP | 0.350 | Plastic | 1.535 | 55.8 | −6.57 |
| 13 | | 7.759 | ASP | 0.500 | | | | |
| 14 | IR-cut filter | Plano | | 0.250 | Glass | 1.517 | 64.2 | — |
| 15 | | Plano | | 1.419 | | | | |
| 16 | Image | Plano | | — | | | | |

Reference wavelength is 587.6 nm (d-line).

TABLE 20

Aspheric Coefficients

| Surface # | 2 | 3 | 4 | 5 | 6 | 7 |
|---|---|---|---|---|---|---|
| k = | −1.1261E−02 | 9.0000E+01 | −8.7265E+01 | −2.1621E+01 | 9.0000E+01 | −1.0540E+00 |
| A4 = | −4.4236E−04 | −3.1533E−03 | −8.1415E−03 | 3.0204E−02 | 2.4999E−02 | −2.4642E−02 |
| A6 = | 9.3935E−05 | 3.4924E−03 | 1.9421E−02 | −5.5175E−03 | −2.2801E−02 | 1.0609E−02 |
| A8 = | −1.6688E−05 | −1.3452E−03 | −9.0688E−03 | 2.2667E−03 | 1.0097E−02 | −3.5748E−03 |
| A10 = | −1.0338E−05 | 2.7691E−04 | 2.4145E−03 | −1.2173E−03 | −3.2826E−03 | 1.0413E−03 |
| A12 = | 1.5212E−06 | −2.0885E−05 | −3.3085E−04 | 3.2569E−04 | 6.8995E−04 | −7.7526E−05 |
| A14 = | | | 1.9879E−05 | −2.7575E−05 | −6.3017E−05 | |

| Surface # | 8 | 9 | 10 | 11 | 12 | 13 |
|---|---|---|---|---|---|---|
| k = | −9.0000E+01 | 8.4137E+00 | −9.0000E+01 | −9.0000E+01 | 5.6752E+00 | −2.7586E+01 |
| A4 = | −2.4599E−03 | −5.1550E−02 | −8.0675E−02 | −3.7059E−02 | −4.3222E−02 | −3.5597E−02 |
| A6 = | −1.0512E−03 | 3.5086E−02 | 3.3099E−02 | 1.5955E−02 | 3.0988E−02 | 1.2841E−02 |
| A8 = | −5.5244E−04 | −1.6058E−02 | −1.1625E−02 | −2.1410E−03 | −7.0067E−03 | −3.1100E−03 |
| A10 = | 1.1862E−04 | 4.5382E−03 | 2.2467E−03 | −2.7761E−04 | 9.3171E−04 | 4.3647E−04 |
| A12 = | −1.9630E−05 | −7.9934E−04 | −2.3232E−04 | 1.3880E−04 | −7.2415E−05 | −2.9532E−05 |
| A14 = | | 7.3368E−05 | 1.2659E−05 | −1.7400E−05 | 2.8029E−06 | 1.9478E−06 |
| A16 = | | −2.3356E−06 | −1.8213E−07 | 6.3379E−07 | −2.5627E−08 | −1.6909E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 9.90 | f/f3 | −2.08 |
| Fno | 2.20 | (f/R5) − (f/R6) + (f × CT3/(R5 × R6)) | −3.17 |
| HFOV [deg.] | 15.8 | Y11/Y62 | 0.90 |
| Nmax | 1.660 | tan (2 × HFOV) | 0.62 |
| V3 | 20.4 | SL/TL | 0.89 |
| CT1/CT2 | 3.38 | BL/TD | 0.30 |
| (T34 + T56)/(T12 + T23 + T45) | 6.76 | f/EPD | 2.20 |
| R6/f | 0.35 | EPD/ImgH | 1.56 |
| (R5 + R6)/(R5 − R6) | 0.83 | TL/ImgH | 3.28 |
| |R11/R12| | 0.84 | ImgH/f | 0.29 |
| f/f1 | 1.82 | TL/f | 0.96 |

Furthermore, in the optical imaging lens assembly according to the 10th embodiment, when a focal length of the first lens element 1010 is f1, a focal length of the second lens element 1020 is f2, a focal length of the third lens element 1030 is f3, a focal length of the fourth lens element 1040 is f4, a focal length of the fifth lens element 1050 is f5, and a focal length of the sixth lens element 1060 is f6, the following conditions are satisfied: |f1|<|f2|; |f3|<|f2|; |f3|<|f3|<|f5|; and |f3|<|f6|.

In the optical imaging lens assembly according to the 10th embodiment, when a central thickness of the first lens element 1010 is CT1, a central thickness of the second lens element 1020 is CT2, a central thickness of the third lens element 1030 is CT3, a central thickness of the fourth lens element 1040 is CT4, a central thickness of the fifth lens element 1050 is CT5, and a central thickness of the sixth lens element 1060 is CT6, CT1 is a maximum among CT1, CT2, CT3, CT4, CT5 and CT6.

In the optical imaging lens assembly according to the 10th embodiment, when the axial distance between the first lens element 1010 and the second lens element 1020 is T12, the axial distance between the second lens element 1020 and the third lens element 1030 is T23, the axial distance between the third lens element 1030 and the fourth lens element 1040 is T34, the axial distance between the fourth lens element 1040 and the fifth lens element 1050 is T45, the axial distance between the fifth lens element 1050 and the sixth lens element 1060 is T56, and T34 is a maximum among T12, T23, T34, T45 and T56.

According to the 10th embodiment, a number of inflection points of each of the object-side surfaces (1011, 1021, 1031, 1041, 1051, 1061) and the image-side surfaces (1012, 1022, 1032, 1042, 1052, 1062) of the first lens element 1010, the second lens element 1020, the third lens element 1030, the fourth lens element 1040, the fifth lens element 1050 and the sixth lens element 1060 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 1011 | 1012 | 1021 | 1022 | 1031 | 1032 |
| Number of reflection point(s) | 0 | 0 | 1 | 1 | 2 | 0 |

| Lens element | Fourth | | Fifth | | Sixth | |
|---|---|---|---|---|---|---|
| Surface | 1041 | 1042 | 1051 | 1052 | 1061 | 1062 |
| Number of reflection point(s) | 0 | 0 | 2 | 3 | 2 | 3 |

11th Embodiment

Figure 21:
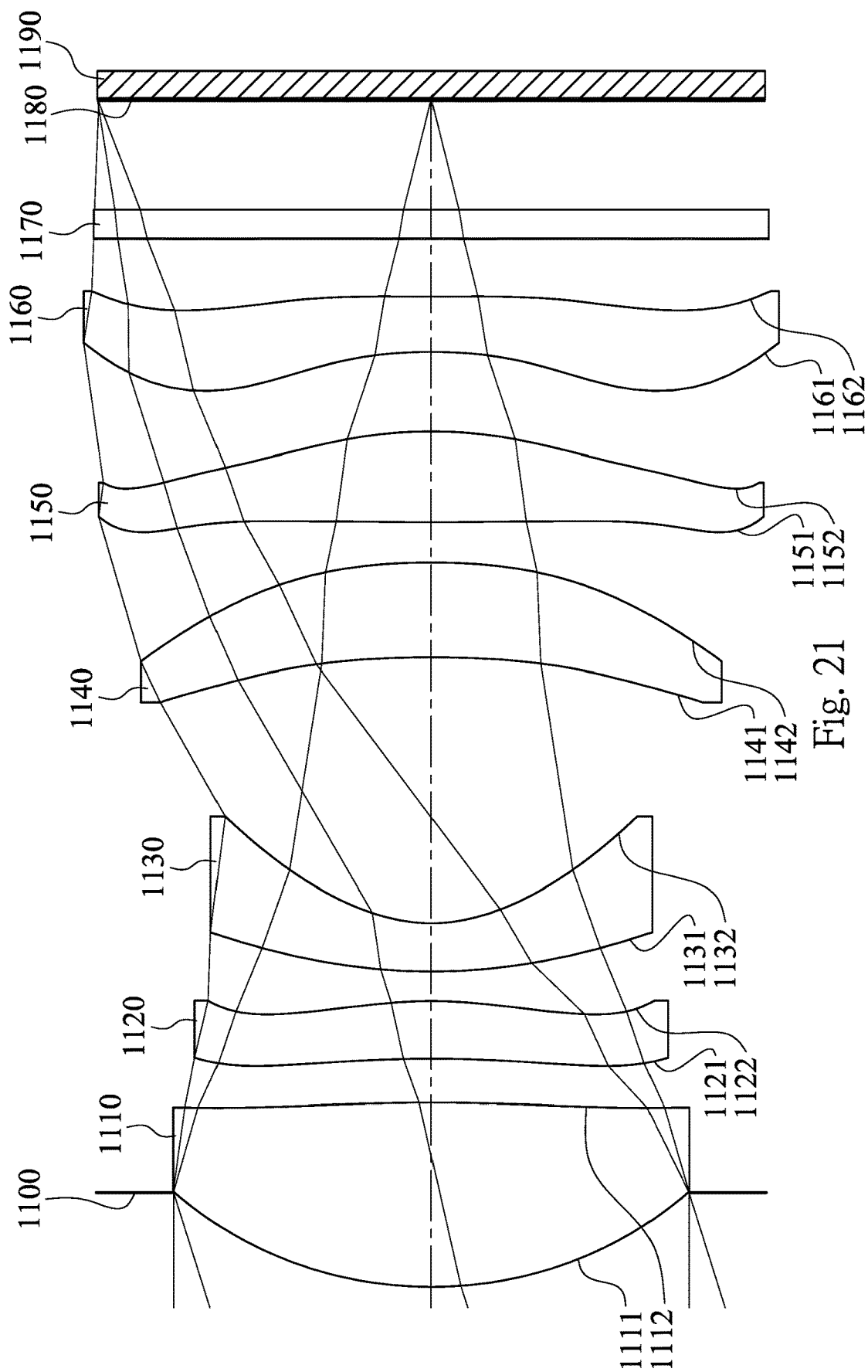
FIG. 21 is a schematic view of an image capturing device according to the 11th embodiment of the present disclosure.
Figure 22:
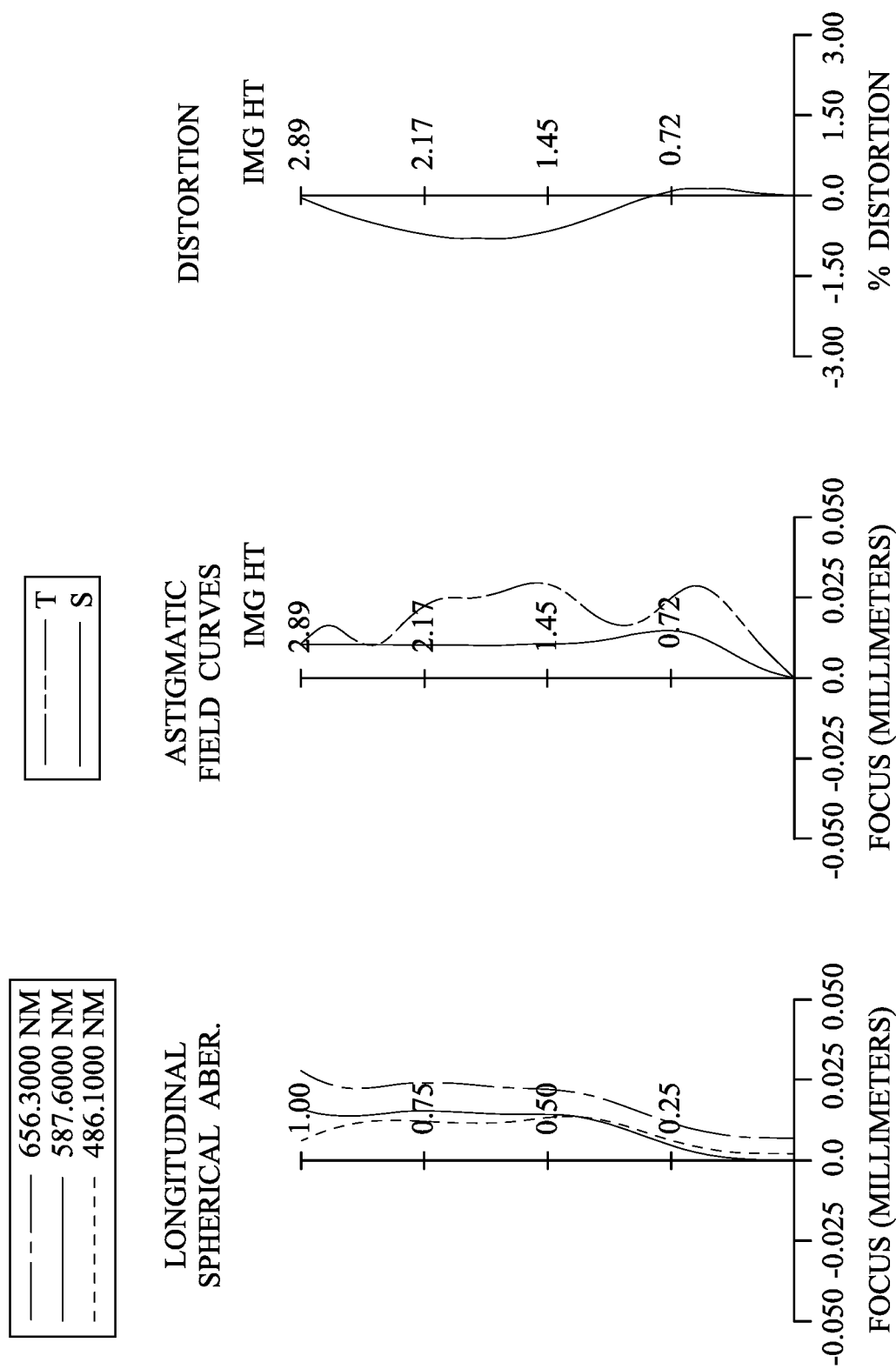
FIG. 22 shows spherical aberration curves, astigmatic field curves and a distortion curve of the image capturing device according to the 11th embodiment.

FIG. 21 is a schematic view of an image capturing device according to the 11th embodiment of the present disclosure. FIG. 22 shows spherical aberration curves, astigmatic field curves and a distortion curve of the image capturing device according to the 11th embodiment. In FIG. 21, the image capturing device includes an optical imaging lens assembly (its reference numeral is omitted) and an image sensor 1190. The optical imaging lens assembly includes, in order from an object side to an image side, an aperture stop 1100, a first lens element 1110, a second lens element 1120, a third lens element 1130, a fourth lens element 1140, a fifth lens element 1150, a sixth lens element 1160, an IR-cut filter 1170 and an image surface 1180, wherein the image sensor 1190 is disposed on the image surface 1180 of the optical imaging lens assembly. The optical imaging lens assembly has a total of six lens elements (1110-1160), and there is an air space between every two lens elements of the first lens element 1110, the second lens element 1120, the third lens element 1130, the fourth lens element 1140, the fifth lens element 1150 and the sixth lens element 1160 that are adjacent to each other.

The first lens element 1110 with positive refractive power has an object-side surface 1111 being convex and an image-side surface 1112 being convex. The first lens element 1110 is made of a plastic material, and has the object-side surface 1111 and the image-side surface 1112 being both aspheric. Furthermore, the image-side surface 1112 of the first lens element 1110 includes at least one inflection point.

The second lens element 1120 with positive refractive power has an object-side surface 1121 being concave and an image-side surface 1122 being convex. The second lens element 1120 is made of a plastic material, and has the object-side surface 1121 and the image-side surface 1122 being both aspheric. Furthermore, both of the object-side surface 1121 and the image-side surface 1122 of the second lens element 1120 include at least one inflection point.

The third lens element 1130 with negative refractive power has an object-side surface 1131 being convex and an image-side surface 1132 being concave. The third lens element 1130 is made of a plastic material, and has the object-side surface 1131 and the image-side surface 1132 being both aspheric. Furthermore, both of the object-side surface 1131 and the image-side surface 1132 of the third lens element 1130 include at least one inflection point.

The fourth lens element 1140 with positive refractive power has an object-side surface 1141 being concave and an image-side surface 1142 being convex. The fourth lens element 1140 is made of a plastic material, and has the object-side surface 1141 and the image-side surface 1142 being both aspheric.

The fifth lens element 1150 with positive refractive power has an object-side surface 1151 being convex and an image-side surface 1152 being convex. The fifth lens element 1150 is made of a plastic material, and has the object-side surface 1151 and the image-side surface 1152 being both aspheric. Furthermore, both of the object-side surface 1151 and the image-side surface 1152 of the fifth lens element 1150 include at least one inflection point.

The sixth lens element 1160 with negative refractive power has an object-side surface 1161 being concave in a paraxial region thereof and an image-side surface 1162 being concave in a paraxial region thereof. The sixth lens element 1160 is made of a plastic material, and has the object-side surface 1161 and the image-side surface 1162 being both aspheric. Furthermore, the object-side surface 1161 of the sixth lens element 1160 includes at least one convex shape in an off-axial region thereof, the image-side surface 1162 of the sixth lens element 1160 includes at least one convex shape in an off-axial region thereof, and both of the object-side surface 1161 and the image-side surface 1162 of the sixth lens element 1160 include at least one inflection point.

The aperture stop 1100 is located along an optical axis between a center of the object-side surface 1111 of the first lens element 1110 on the optical axis and a location of a maximum effective radius of the object-side surface 1111 of the first lens element 1110 projected on the optical axis.

The IR-cut filter 1170 is made of a glass material and located between the sixth lens element 1160 and the image surface 1180, and will not affect the focal length of the optical imaging lens assembly.

The detailed optical data of the 11th embodiment are shown in Table 21 and the aspheric surface data are shown in Table 22 below.

TABLE 21

11th Embodiment
f = 9.20 mm, Fno = 2.06, HFOV = 17.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.820 | | | | |
| 2 | Lens 1 | 3.504 | ASP | 1.600 | Plastic | 1.544 | 55.9 | 5.47 |
| 3 | | −16.441 | ASP | 0.379 | | | | |
| 4 | Lens 2 | −11.717 | ASP | 0.500 | Plastic | 1.639 | 23.3 | 9.21 |
| 5 | | −3.980 | ASP | 0.258 | | | | |
| 6 | Lens 3 | 5.570 | ASP | 0.419 | Plastic | 1.660 | 20.4 | −3.08 |
| 7 | | 1.444 | ASP | 2.304 | | | | |
| 8 | Lens 4 | −9.874 | ASP | 0.822 | Plastic | 1.639 | 23.3 | 22.95 |
| 9 | | −6.091 | ASP | 0.350 | | | | |
| 10 | Lens 5 | 18.701 | ASP | 0.785 | Plastic | 1.544 | 55.9 | 6.31 |
| 11 | | −4.141 | ASP | 0.692 | | | | |
| 12 | Lens 6 | −4.312 | ASP | 0.480 | Plastic | 1.515 | 56.5 | −7.23 |
| 13 | | 28.171 | ASP | 0.500 | | | | |
| 14 | IR-cut filter | Plano | | 0.250 | Glass | 1.517 | 64.2 | — |
| 15 | | Plano | | 0.958 | | | | |
| 16 | Image | Plano | | — | | | | |

Reference wavelength is 587.6 nm (d-line).

TABLE 22

Aspheric Coefficients

| Surface # | 2 | 3 | 4 | 5 | 6 | 7 |
|---|---|---|---|---|---|---|
| k= | 4.2068E−02 | 4.5253E+01 | −8.9271E+01 | −1.6265E+01 | −7.9060E+00 | −1.3194E+00 |
| A4= | 4.0771E−04 | 5.2264E−03 | −1.4365E−02 | 2.1959E−02 | 2.4214E−02 | −3.0565E−02 |
| A6= | −5.1438E−05 | 2.7063E−03 | 1.8692E−02 | −5.4763E−03 | −2.2050E−02 | 1.4004E−02 |
| A8= | 9.3272E−05 | −1.3517E−03 | −9.1805E−03 | 2.7664E−03 | 1.1203E−02 | −3.4527E−03 |
| A10= | −2.3444E−05 | 2.6225E−04 | 2.5022E−03 | −1.1933E−03 | −3.2983E−03 | 7.9158E−04 |
| A12= | 1.9715E−06 | −1.6787E−05 | −3.1397E−04 | 3.9624E−04 | 5.8383E−04 | −1.1405E−04 |
| A14= | | | 1.3406E−05 | −4.5889E−05 | −4.9120E−05 | |

| Surface # | 8 | 9 | 10 | 11 | 12 | 13 |
|---|---|---|---|---|---|---|
| k= | −4.7133E+00 | −6.4132E+01 | 3.2665E+01 | 9.4266E−01 | 7.7892E−01 | 8.3695E+00 |
| A4= | −1.3025E−02 | −6.3230E−02 | −3.9687E−02 | −1.2164E−02 | −4.3127E−02 | −4.8918E−02 |
| A6= | 2.1021E−03 | 3.5236E−02 | 2.9089E−02 | 1.5289E−02 | 3.1116E−02 | 1.8079E−02 |
| A8= | −6.7806E−05 | −1.6113E−02 | −1.1151E−02 | −2.5450E−03 | −7.1692E−03 | −3.4172E−03 |
| A10= | 1.4425E−05 | 4.6547E−03 | 2.2019E−03 | −2.8635E−04 | 9.3807E−04 | 4.1418E−04 |
| A12= | −3.2189E−06 | −7.8802E−04 | −2.3763E−04 | 1.4163E−04 | −7.1278E−05 | −3.4370E−05 |
| A14= | | 7.2083E−05 | 1.3747E−05 | −1.6511E−05 | 2.9419E−06 | 2.0134E−06 |
| A16= | | −2.7634E−06 | −3.3658E−07 | 6.7268E−07 | −4.9891E−08 | −6.3087E−08 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 9.20 | f/f3 | −2.99 |
| Fno | 2.06 | (f/R5) − (f/R6) + (f × CT3/(R5 × R6)) | −4.24 |
| HFOV [deg.] | 17.5 | Y11/Y62 | 0.76 |
| Nmax | 1.660 | tan (2 × HFOV) | 0.70 |
| V3 | 20.4 | SL/TL | 0.92 |
| CT1/CT2 | 3.20 | BL/TD | 0.20 |
| (T34 + T56)/(T12 + T23 + T45) | 3.04 | f/EPD | 2.06 |
| R6/f | 0.16 | EPD/ImgH | 1.54 |
| (R5 + R6)/(R5 − R6) | 1.70 | TL/ImgH | 3.56 |
| |R11/R12| | 0.16 | ImgH/f | 0.31 |
| f/f1 | 1.68 | TL/f | 1.12 |

Furthermore, in the optical imaging lens assembly according to the 11th embodiment, when a focal length of the first lens element 1110 is f1, a focal length of the second lens element 1120 is f2, a focal length of the third lens element 1130 is f3, a focal length of the fourth lens element 1140 is f4, a focal length of the fifth lens element 1150 is f5, and a focal length of the sixth lens element 1160 is f6, the following conditions are satisfied: |f1|<|f2|; |f3|<|f2|; |f3|<|f4|; |f3|<|f5|; and |f3|<|f6|.

In the optical imaging lens assembly according to the 11th embodiment, when a central thickness of the first lens element 1110 is CT1, a central thickness of the second lens element 1120 is CT2, a central thickness of the third lens element 1130 is CT3, a central thickness of the fourth lens element 1140 is CT4, a central thickness of the fifth lens element 1150 is CT5, and a central thickness of the sixth lens element 1160 is CT6, CT1 is a maximum among CT1, CT2, CT3, CT4, CT5 and CT6.

In the optical imaging lens assembly according to the 11th embodiment, when the axial distance between the first lens element 1110 and the second lens element 1120 is T12, the axial distance between the second lens element 1120 and the third lens element 1130 is T23, the axial distance between the third lens element 1130 and the fourth lens element 1140 is T34, the axial distance between the fourth lens element 1140 and the fifth lens element 1150 is T45, the axial distance between the fifth lens element 1150 and the sixth lens element 1160 is T56, and T34 is a maximum among T12, T23, T34, T45 and T56.

According to the 11th embodiment, a number of inflection points of each of the object-side surfaces (1111, 1121, 1131, 1141, 1151, 1161) and the image-side surfaces (1112, 1122, 1132, 1142, 1152, 1162) of the first lens element 1110, the second lens element 1120, the third lens element 1130, the fourth lens element 1140, the fifth lens element 1150 and the sixth lens element 1160 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 1111 | 1112 | 1121 | 1122 | 1131 | 1132 |
| Number of reflection point(s) | 0 | 1 | 1 | 1 | 1 | 1 |
| Lens element | Fourth | | Fifth | | Sixth | |
| Surface | 1141 | 1142 | 1151 | 1152 | 1161 | 1162 |
| Number of reflection point(s) | 0 | 0 | 4 | 3 | 2 | 3 |

12th Embodiment

Figure 23:
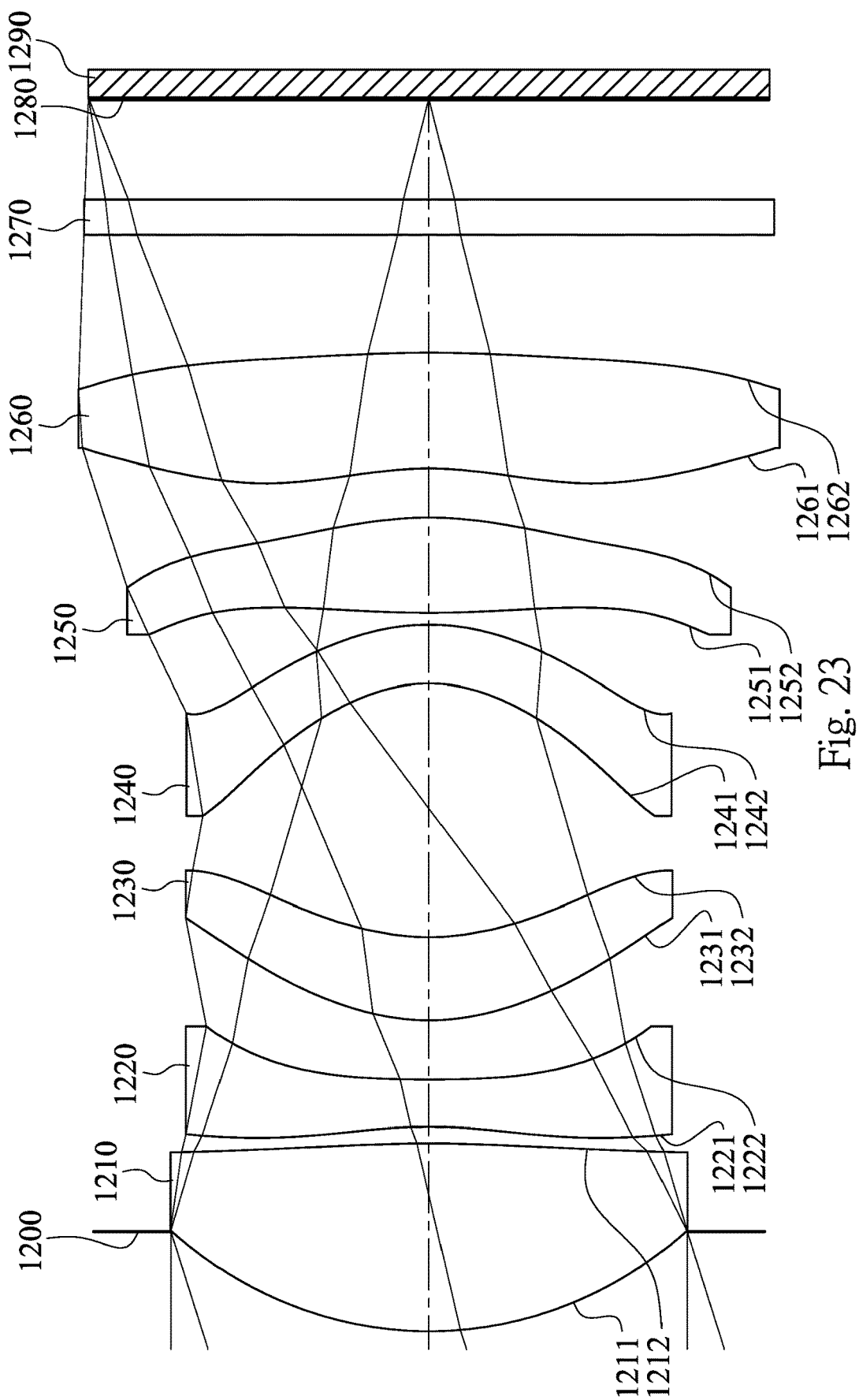
FIG. 23 is a schematic view of an image capturing device according to the 12th embodiment of the present disclosure.
Figure 24:
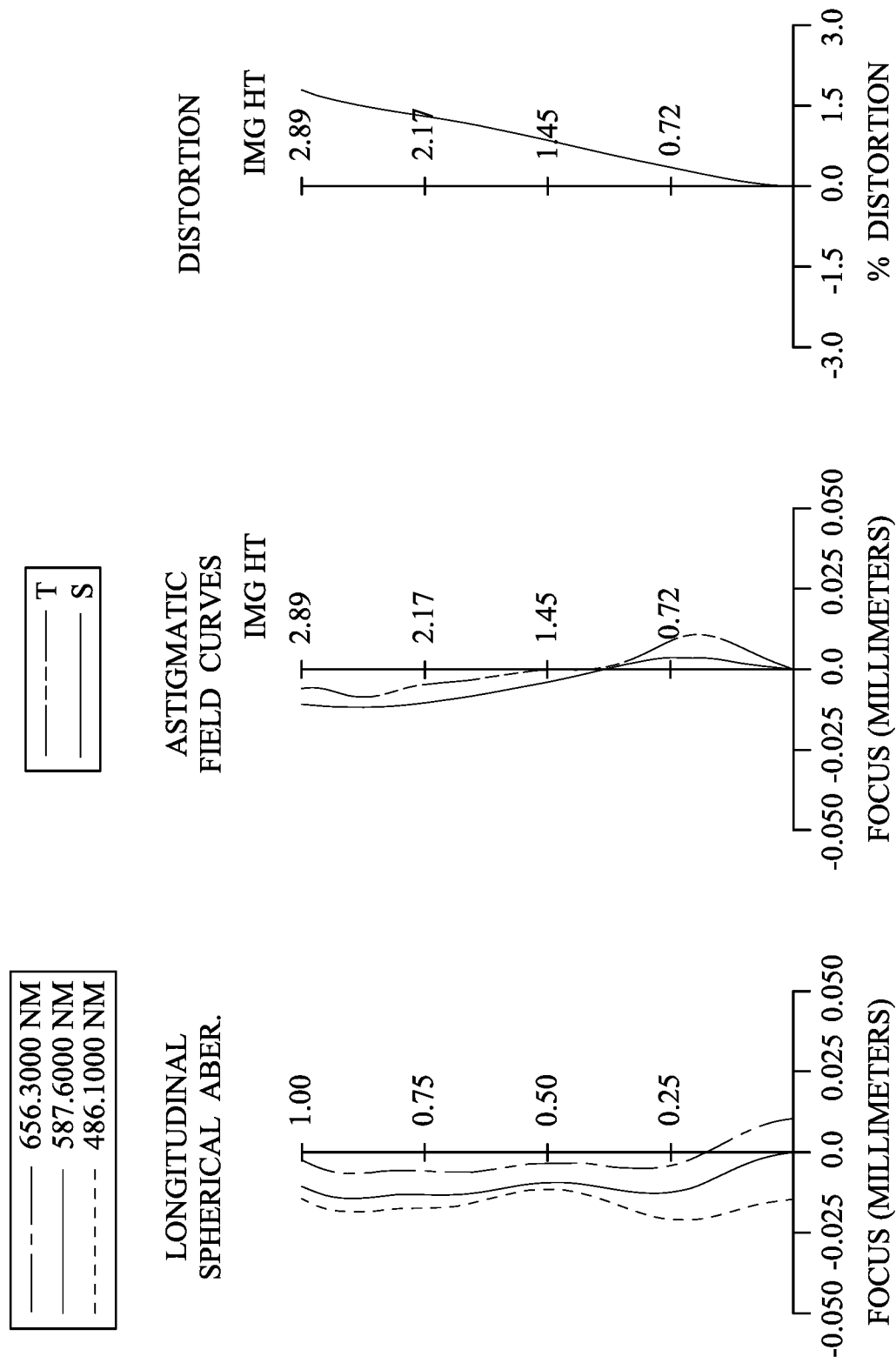
FIG. 24 shows spherical aberration curves, astigmatic field curves and a distortion curve of the image capturing device according to the 12th embodiment.

FIG. 23 is a schematic view of an image capturing device according to the 12th embodiment of the present disclosure. FIG. 24 shows spherical aberration curves, astigmatic field curves and a distortion curve of the image capturing device according to the 12th embodiment. In FIG. 23, the image capturing device includes an optical imaging lens assembly (its reference numeral is omitted) and an image sensor 1290. The optical imaging lens assembly includes, in order from an object side to an image side, an aperture stop 1200, a first lens element 1210, a second lens element 1220, a third lens element 1230, a fourth lens element 1240, a fifth lens element 1250, a sixth lens element 1260, an IR-cut filter 1270 and an image surface 1280, wherein the image sensor 1290 is disposed on the image surface 1280 of the optical imaging lens assembly. The optical imaging lens assembly has a total of six lens elements (1210-1260), and there is an air space between every two lens elements of the first lens element 1210, the second lens element 1220, the third lens element 1230, the fourth lens element 1240, the fifth lens element 1250 and the sixth lens element 1260 that are adjacent to each other.

The first lens element 1210 with positive refractive power has an object-side surface 1211 being convex and an image-side surface 1212 being convex. The first lens element 1210 is made of a plastic material, and has the object-side surface 1211 and the image-side surface 1212 being both aspheric. Furthermore, the image-side surface 1212 of the first lens element 1210 includes at least one inflection point.

The second lens element 1220 with negative refractive power has an object-side surface 1221 being concave and an image-side surface 1222 being concave. The second lens element 1220 is made of a plastic material, and has the object-side surface 1221 and the image-side surface 1222 being both aspheric. Furthermore, the object-side surface 1221 of the second lens element 1220 includes at least one inflection point.

The third lens element 1230 with positive refractive power has an object-side surface 1231 being convex and an image-side surface 1232 being concave. The third lens element 1230 is made of a plastic material, and has the object-side surface 1231 and the image-side surface 1232 being both aspheric. Furthermore, both of the object-side surface 1231 and the image-side surface 1232 of the third lens element 1230 include at least one inflection point.

The fourth lens element 1240 with negative refractive power has an object-side surface 1241 being concave and an image-side surface 1242 being convex. The fourth lens element 1240 is made of a plastic material, and has the object-side surface 1241 and the image-side surface 1242 being both aspheric. Furthermore, both of the object-side surface 1241 and the image-side surface 1242 of the fourth lens element 1240 include at least one inflection point.

The fifth lens element 1250 with positive refractive power has an object-side surface 1251 being convex and an image-side surface 1252 being convex. The fifth lens element 1250 is made of a plastic material, and has the object-side surface 1251 and the image-side surface 1252 being both aspheric. Furthermore, both of the object-side surface 1251 and the image-side surface 1252 of the fifth lens element 1250 include at least one inflection point.

The sixth lens element 1260 with negative refractive power has an object-side surface 1261 being concave in a paraxial region thereof and an image-side surface 1262 being convex in a paraxial region thereof. The sixth lens element 1260 is made of a plastic material, and has the object-side surface 1261 and the image-side surface 1262 being both aspheric. Furthermore, the object-side surface 1261 of the sixth lens element 1260 includes at least one convex shape in an off-axial region thereof, and both of the object-side surface 1261 and the image-side surface 1262 of the sixth lens element 1260 include at least one inflection point.

The aperture stop 1200 is located along an optical axis between a center of the object-side surface 1211 of the first lens element 1210 on the optical axis and a location of a maximum effective radius of the object-side surface 1211 of the first lens element 1210 projected on the optical axis.

The IR-cut filter 1270 is made of a glass material and located between the sixth lens element 1260 and the image surface 1280, and will not affect the focal length of the optical imaging lens assembly.

The detailed optical data of the 12th embodiment are shown in Table 23 and the aspheric surface data are shown in Table 24 below.

TABLE 23

12th Embodiment
f = 8.99 mm, Fno = 2.05, HFOV = 17.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.850 | | | | |
| 2 | Lens 1 | 3.196 | ASP | 1.600 | Plastic | 1.544 | 55.9 | 4.81 |
| 3 | | −11.877 | ASP | 0.141 | | | | |
| 4 | Lens 2 | −4.104 | ASP | 0.400 | Plastic | 1.639 | 23.3 | −4.76 |
| 5 | | 12.144 | ASP | 0.505 | | | | |
| 6 | Lens 3 | 1.963 | ASP | 0.709 | Plastic | 1.660 | 20.4 | 12.18 |
| 7 | | 2.225 | ASP | 2.155 | | | | |
| 8 | Lens 4 | −1.308 | ASP | 0.500 | Plastic | 1.639 | 23.3 | −10.31 |
| 9 | | −1.875 | ASP | 0.100 | | | | |
| 10 | Lens 5 | 7.916 | ASP | 0.812 | Plastic | 1.544 | 55.9 | 4.33 |
| 11 | | −3.229 | ASP | 0.419 | | | | |
| 12 | Lens 6 | −3.021 | ASP | 0.983 | Plastic | 1.515 | 56.5 | −8.80 |
| 13 | | −10.066 | ASP | 1.000 | | | | |
| 14 | IR-cut filter | Plano | | 0.300 | Glass | 1.517 | 64.2 | — |
| 15 | | Plano | | 0.859 | | | | |
| 16 | Image | Plano | | — | | | | |

Reference wavelength is 587.6 (d-line).

TABLE 24

Aspheric Coefficients

| Surface # | 2 | 3 | 4 | 5 | 6 | 7 |
|---|---|---|---|---|---|---|
| k = | −9.2116E−02 | 2.2242E+01 | −2.2410E+01 | −5.0774E+01 | −3.5690E+00 | −1.1116E+00 |
| A4 = | 3.0646E−04 | 1.2768E−02 | 2.6269E−02 | 3.2729E−02 | 1.3057E−02 | −1.6668E−02 |
| A6 = | −6.1711E−05 | −9.0967E−04 | −4.1586E−03 | −2.3266E−03 | −7.8569E−04 | 1.5712E−03 |
| A8 = | | −1.7983E−04 | 1.5079E−04 | 1.5746E−04 | 2.4389E−04 | 4.3100E−04 |
| A10 = | | 4.0513E−05 | 1.9392E−05 | −6.1928E−05 | −1.5484E−04 | −5.7035E−04 |
| A12 = | | | | 1.6018E−05 | 1.6476E−05 | 7.9020E−05 |

| Surface # | 8 | 9 | 10 | 11 | 12 | 13 |
|---|---|---|---|---|---|---|
| k = | −2.8738E+00 | −4.7512E+00 | 8.2974E+00 | 1.5687E−01 | −7.1699E−01 | 8.2870E+00 |
| A4 = | −5.0856E−02 | −4.5909E−02 | −3.4282E−02 | 3.2353E−02 | 7.7633E−02 | 2.2151E−02 |
| A6 = | 2.2352E−02 | 2.2003E−02 | 9.6734E−03 | 1.3218E−03 | −1.6924E−02 | −7.3593E−03 |
| A8 = | −1.1795E−02 | −8.6563E−03 | −2.7354E−03 | −1.5282E−03 | 2.7254E−03 | 1.3807E−03 |
| A10 = | 3.3245E−03 | 2.0331E−03 | 3.3692E−04 | 1.9805E−04 | −3.0249E−04 | −1.4232E−04 |
| A12 = | −3.0698E−04 | −1.8002E−04 | −1.5209E−05 | −7.5355E−06 | 1.9304E−05 | 6.8176E−06 |
| A14 = | | 5.1313E−06 | | | −5.0715E−07 | −8.2786E−08 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 8.99 | f/f3 | 0.74 |
| Fno | 2.05 | (f/R5) − (f/R6) + (f × CT3/(R5 × R6)) | 2.00 |
| HFOV [deg.] | 17.6 | Y11/Y62 | 0.90 |
| Nmax | 1.660 | tan (2 × HFOV) | 0.70 |
| V3 | 20.4 | SL/TL | 0.92 |
| CT1/CT2 | 4.00 | BL/TD | 0.26 |
| (T34 + T56)/(T12 + T23 + T45) | 3.45 | f/EPD | 2.05 |
| R6/f | 0.25 | EPD/ImgH | 1.52 |
| (R5 + R6)/(R5 − R6) | −16.01 | TL/ImgH | 3.62 |
| |R11/R12| | 0.30 | ImgH/f | 0.32 |
| f/f1 | 1.87 | TL/f | 1.17 |

In the optical imaging lens assembly according to the 12th embodiment, when a central thickness of the first lens element 1210 is CT1, a central thickness of the second lens element 1220 is CT2, a central thickness of the third lens element 1230 is CT3, a central thickness of the fourth lens element 1240 is CT4, a central thickness of the fifth lens element 1250 is CT5, and a central thickness of the sixth lens element 1260 is CT6, CT1 is a maximum among CT1, CT2, CT3, CT4, CT5 and CT6.

In the optical imaging lens assembly according to the 12th embodiment, when the axial distance between the first lens element 1210 and the second lens element 1220 is T12, the axial distance between the second lens element 1220 and the third lens element 1230 is T23, the axial distance between the third lens element 1230 and the fourth lens element 1240 is T34, the axial distance between the fourth lens element 1240 and the fifth lens element 1250 is T45, the axial distance between the fifth lens element 1250 and the sixth lens element 1260 is T56, and T34 is a maximum among T12, T23, T34, T45 and T56.

According to the 12th embodiment, a number of inflection points of each of the object-side surfaces (1211, 1221, 1231, 1241, 1251, 1261) and the image-side surfaces (1212, 1222, 1232, 1242, 1252, 1262) of the first lens element 1210, the second lens element 1220, the third lens element 1230, the fourth lens element 1240, the fifth lens element 1250 and the sixth lens element 1260 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 1211 | 1212 | 1221 | 1222 | 1231 | 1232 |
| Number of reflection point(s) | 0 | 1 | 1 | 0 | 1 | 1 |
| Lens element | Fourth | | Fifth | | Sixth | |
| Surface | 1241 | 1242 | 1251 | 1252 | 1261 | 1262 |
| Number of reflection point(s) | 1 | 1 | 2 | 2 | 1 | 1 |

13th Embodiment

Figure 25:
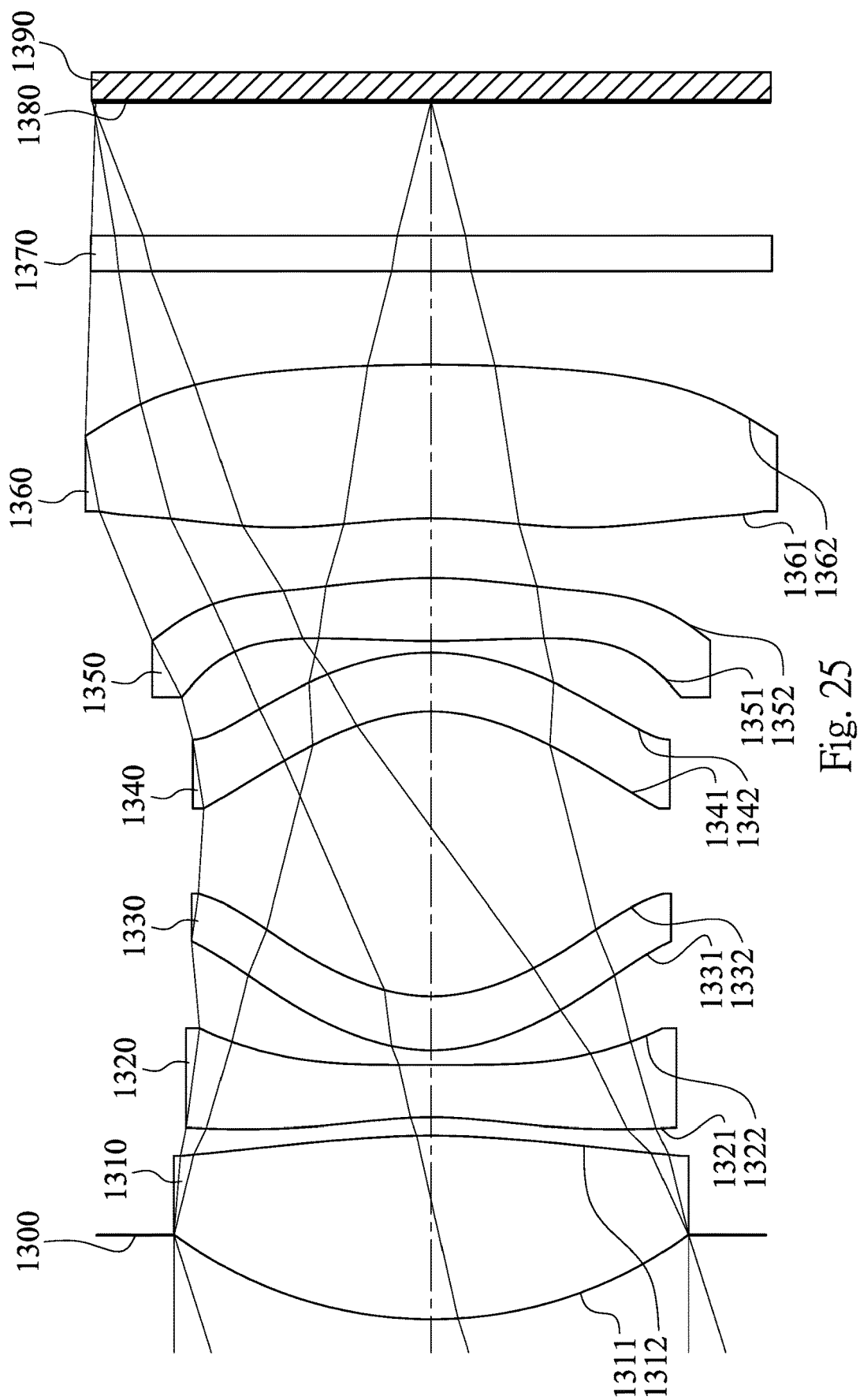
FIG. 25 is a schematic view of an image capturing device according to the 13th embodiment of the present disclosure.
Figure 26:
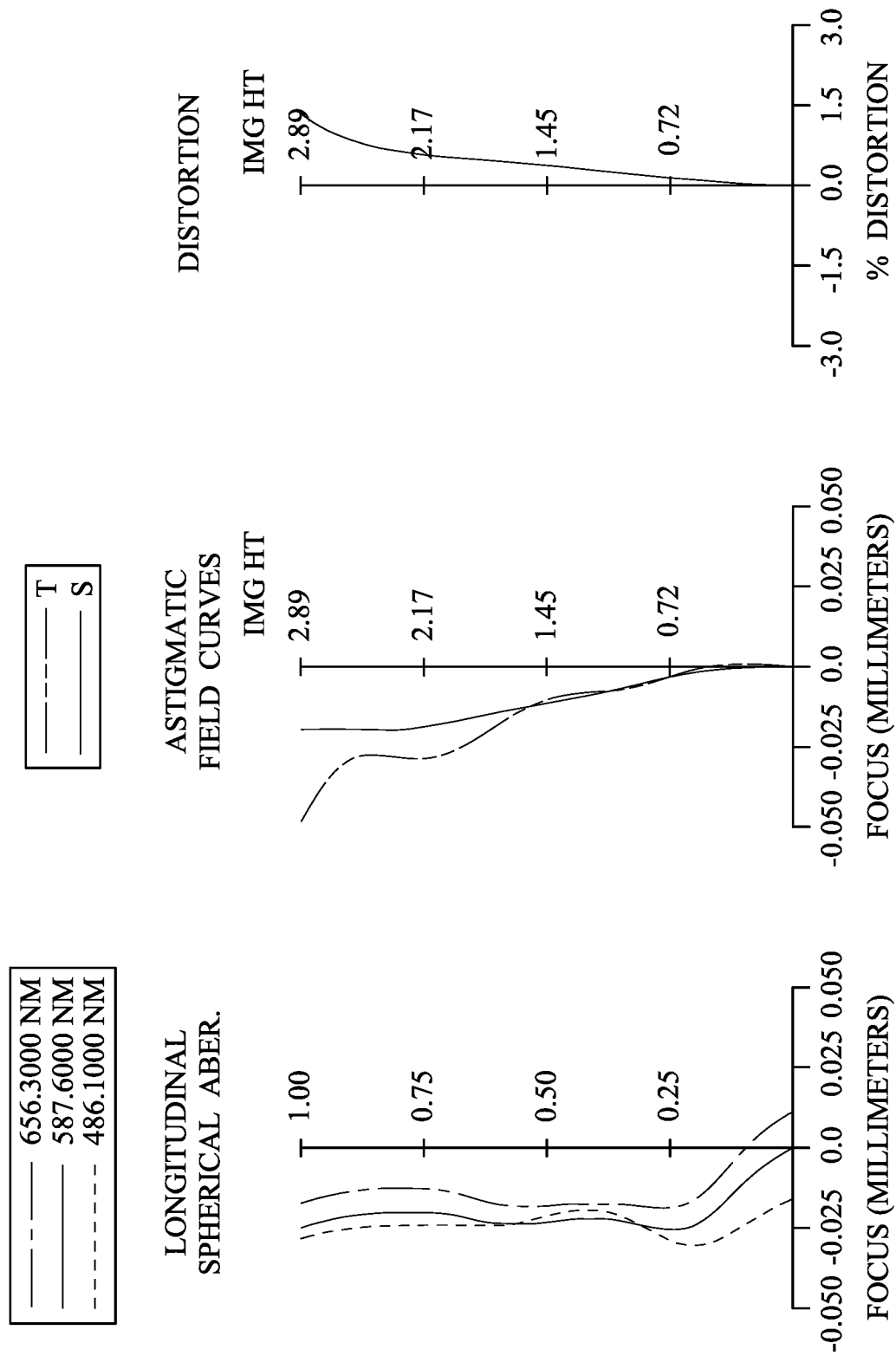
FIG. 26 shows spherical aberration curves, astigmatic field curves and a distortion curve of the image capturing device according to the 13th embodiment.

FIG. 25 is a schematic view of an image capturing device according to the 13th embodiment of the present disclosure. FIG. 26 shows spherical aberration curves, astigmatic field curves and a distortion curve of the image capturing device according to the 13th embodiment. In FIG. 25, the image capturing device includes an optical imaging lens assembly (its reference numeral is omitted) and an image sensor 1390. The optical imaging lens assembly includes, in order from an object side to an image side, an aperture stop 1300, a first lens element 1310, a second lens element 1320, a third lens element 1330, a fourth lens element 1340, a fifth lens element 1350, a sixth lens element 1360, an IR-cut filter 1370 and an image surface 1380, wherein the image sensor 1390 is disposed on the image surface 1380 of the optical imaging lens assembly. The optical imaging lens assembly has a total of six lens elements (1310-1360), and there is an air space between every two lens elements of the first lens element 1310, the second lens element 1320, the third lens element 1330, the fourth lens element 1340, the fifth lens element 1350 and the sixth lens element 1360 that are adjacent to each other.

The first lens element 1310 with positive refractive power has an object-side surface 1311 being convex and an image-side surface 1312 being convex. The first lens element 1310 is made of a plastic material, and has the object-side surface 1311 and the image-side surface 1312 being both aspheric. Furthermore, the image-side surface 1312 of the first lens element 1310 includes at least one inflection point.

The second lens element 1320 with negative refractive power has an object-side surface 1321 being concave and an image-side surface 1322 being convex. The second lens element 1320 is made of a plastic material, and has the object-side surface 1321 and the image-side surface 1322 being both aspheric. Furthermore, both of the object-side surface 1321 and the image-side surface 1322 of the second lens element 1320 include at least one inflection point.

The third lens element 1330 with positive refractive power has an object-side surface 1331 being convex and an image-side surface 1332 being concave. The third lens element 1330 is made of a plastic material, and has the object-side surface 1331 and the image-side surface 1332 being both aspheric. Furthermore, both of the object-side surface 1331 and the image-side surface 1332 of the third lens element 1330 include at least one inflection point.

The fourth lens element 1340 with negative refractive power has an object-side surface 1341 being concave and an image-side surface 1342 being convex. The fourth lens element 1340 is made of a plastic material, and has the object-side surface 1341 and the image-side surface 1342 being both aspheric. Furthermore, both of the object-side surface 1341 and the image-side surface 1342 of the fourth lens element 1340 include at least one inflection point.

The fifth lens element 1350 with positive refractive power has an object-side surface 1351 being convex and an image-side surface 1352 being convex. The fifth lens element 1350 is made of a plastic material, and has the object-side surface 1351 and the image-side surface 1352 being both aspheric. Furthermore, both of the object-side surface 1351 and the image-side surface 1352 of the fifth lens element 1350 include at least one inflection point.

The sixth lens element 1360 with negative refractive power has an object-side surface 1361 being concave in a paraxial region thereof and an image-side surface 1362 being convex in a paraxial region thereof. The sixth lens element 1360 is made of a plastic material, and has the object-side surface 1361 and the image-side surface 1362 being both aspheric. Furthermore, the object-side surface 1361 of the sixth lens element 1360 includes at least one convex shape in an off-axial region thereof, and the object-side surface 1361 of the sixth lens element 1360 includes at least one inflection point.

The aperture stop 1300 is located along an optical axis between a center of the object-side surface 1311 of the first lens element 1310 on the optical axis and a location of a maximum effective radius of the object-side surface 1311 of the first lens element 1310 projected on the optical axis.

The IR-cut filter 1370 is made of a glass material and located between the sixth lens element 1360 and the image surface 1380, and will not affect the focal length of the optical imaging lens assembly.

The detailed optical data of the 13th embodiment are shown in Table 25 and the aspheric surface data are shown in Table 26 below.

TABLE 25

13th Embodiment
f = 9.00 mm, Fno = 2.05, HFOV = 17.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.720 | | | | |
| 2 | Lens 1 | 3.691 | ASP | 1.573 | Plastic | 1.544 | 55.9 | 4.73 |
| 3 | | −7.182 | ASP | 0.154 | | | | |
| 4 | Lens 2 | −3.603 | ASP | 0.448 | Plastic | 1.639 | 23.3 | −5.75 |
| 5 | | −200.000 | ASP | 0.124 | | | | |
| 6 | Lens 3 | 1.524 | ASP | 0.463 | Plastic | 1.660 | 20.4 | 29.79 |
| 7 | | 1.453 | ASP | 2.436 | | | | |
| 8 | Lens 4 | −1.539 | ASP | 0.500 | Plastic | 1.639 | 23.3 | −14.90 |
| 9 | | −2.069 | ASP | 0.100 | | | | |
| 10 | Lens 5 | 9.785 | ASP | 0.539 | Plastic | 1.544 | 55.9 | 5.41 |
| 11 | | −4.121 | ASP | 0.511 | | | | |
| 12 | Lens 6 | −4.129 | ASP | 1.312 | Plastic | 1.515 | 56.5 | −11.53 |
| 13 | | −15.040 | ASP | 0.800 | | | | |
| 14 | IR-cut filter | Plano | | 0.300 | Glass | 1.517 | 64.2 | — |
| 15 | | Plano | | 1.153 | | | | |
| 16 | Image | Plano | | — | | | | |

Reference wavelength is 587.6 nm (d-line).

TABLE 26

Aspheric Coefficients

| Surface # | 2 | 3 | 4 | 5 | 6 | 7 |
|---|---|---|---|---|---|---|
| k= | −4.2435E−01 | 3.2757E+00 | −3.1771E+01 | 9.0000E+01 | −4.0292E+00 | −1.3035E+00 |
| A4= | 9.2705E−04 | 1.3260E−02 | 2.3493E−02 | 4.0523E−02 | 3.4304E−02 | −3.5477E−02 |
| A6= | 1.1417E−04 | 1.3973E−04 | −3.1715E−03 | −6.2854E−03 | −7.4670E−03 | 1.9672E−02 |
| A8= | | −9.1755E−04 | −8.4211E−04 | −6.4231E−04 | 1.3032E−03 | −6.5866E−03 |
| A10= | | 2.2876E−04 | 3.3346E−04 | 4.2855E−04 | −4.4667E−04 | 6.3761E−04 |
| A12= | | −1.8101E−05 | −3.1345E−05 | −4.5280E−05 | 5.2218E−05 | |

| Surface # | 8 | 9 | 10 | 11 | 12 | 13 |
|---|---|---|---|---|---|---|
| k= | −3.1567E+00 | −5.1842E+00 | 1.8517E+01 | 5.0059E−01 | 7.2976E−02 | 2.2455E+01 |
| A4= | −1.6207E−02 | −5.1491E−02 | −3.6283E−02 | 5.0576E−02 | 6.7262E−02 | 6.0114E−03 |
| A6 = | 5.2855E−03 | 2.2041E−02 | 6.6139E−03 | −8.7498E−03 | −1.6392E−02 | −3.8720E−03 |
| A8= | 2.6418E−04 | −5.6255E−03 | −2.1053E−03 | −6.0140E−04 | 2.9880E−03 | 8.2499E−04 |
| A10= | −4.8253E−04 | 1.0997E−03 | −4.2499E−05 | 1.8082E−04 | −4.0908E−04 | −9.2664E−05 |
| A12= | 7.6712E−05 | −1.7626E−04 | 2.9891E−05 | −6.0305E−06 | 3.3870E−05 | 4.1960E−06 |
| A14= | | 1.8973E−05 | | | −1.1590E−06 | |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 9.00 | f/f3 | 0.30 |
| Fno | 2.05 | (f/R5) − (f/R6) + (f × CT3/(R5 × R6)) | 1.59 |
| HFOV [deg.] | 17.6 | Y11/Y62 | 0.90 |
| Nmax | 1.660 | tan (2 × HFOV) | 0.71 |
| V3 | 20.4 | SL/TL | 0.93 |
| CT1/CT2 | 3.51 | BL/TD | 0.28 |
| (T34 + T56)/(T12 + T23 + T45) | 7.80 | f/EPD | 2.05 |
| R6/f | 0.16 | EPD/ImgH | 1.52 |
| (R5 + R6)/(R5 − R6) | 41.71 | TL/ImgH | 3.60 |
| |R11/R12| | 0.27 | ImgH/f | 0.32 |
| f/f1 | 1.90 | TL/f | 1.16 |

Furthermore, in the optical imaging lens assembly according to the 13th embodiment, when a focal length of the first lens element 1310 is f1, a focal length of the second lens element 1320 is f2, the following condition is satisfied: |f1|<|f2|.

In the optical imaging lens assembly according to the 13th embodiment, when a central thickness of the first lens element 1310 is CT1, a central thickness of the second lens element 1320 is CT2, a central thickness of the third lens element 1330 is CT3, a central thickness of the fourth lens element 1340 is CT4, a central thickness of the fifth lens element 1350 is CT5, and a central thickness of the sixth lens element 1360 is CT6, CT1 is a maximum among CT1, CT2, CT3, CT4, CT5 and CT6.

In the optical imaging lens assembly according to the 13th embodiment, when the axial distance between the first lens element 1310 and the second lens element 1320 is T12, the axial distance between the second lens element 1320 and the third lens element 1330 is T23, the axial distance between the third lens element 1330 and the fourth lens element 1340 is T34, the axial distance between the fourth lens element 1340 and the fifth lens element 1350 is T45, the axial distance between the fifth lens element 1350 and the sixth lens element 1360 is T56, and T34 is a maximum among T12, T23, T34, T45 and T56.

According to the 13th embodiment, a number of inflection points of each of the object-side surfaces (1311, 1321, 1331, 1341, 1351, 1361) and the image-side surfaces (1312, 1322, 1332, 1342, 1352, 1362) of the first lens element 1310, the second lens element 1320, the third lens element 1330, the fourth lens element 1340, the fifth lens element 1350 and the sixth lens element 1360 are listed in the following Table, wherein the number of the inflection points of each surface is a number of the inflection points located between an axial point of the surface and a position of a maximum effective radius of the surface.

| Lens element | First | | Second | | Third | |
|---|---|---|---|---|---|---|
| Surface | 1311 | 1312 | 1321 | 1322 | 1331 | 1332 |
| Number of reflection point(s) | 0 | 2 | 2 | 1 | 1 | 1 |
| Lens element | Fourth | | Fifth | | Sixth | |
| Surface | 1341 | 1342 | 1351 | 1352 | 1361 | 1362 |
| Number of reflection point(s) | 1 | 1 | 1 | 2 | 2 | 0 |

14th Embodiment

Figure 27:
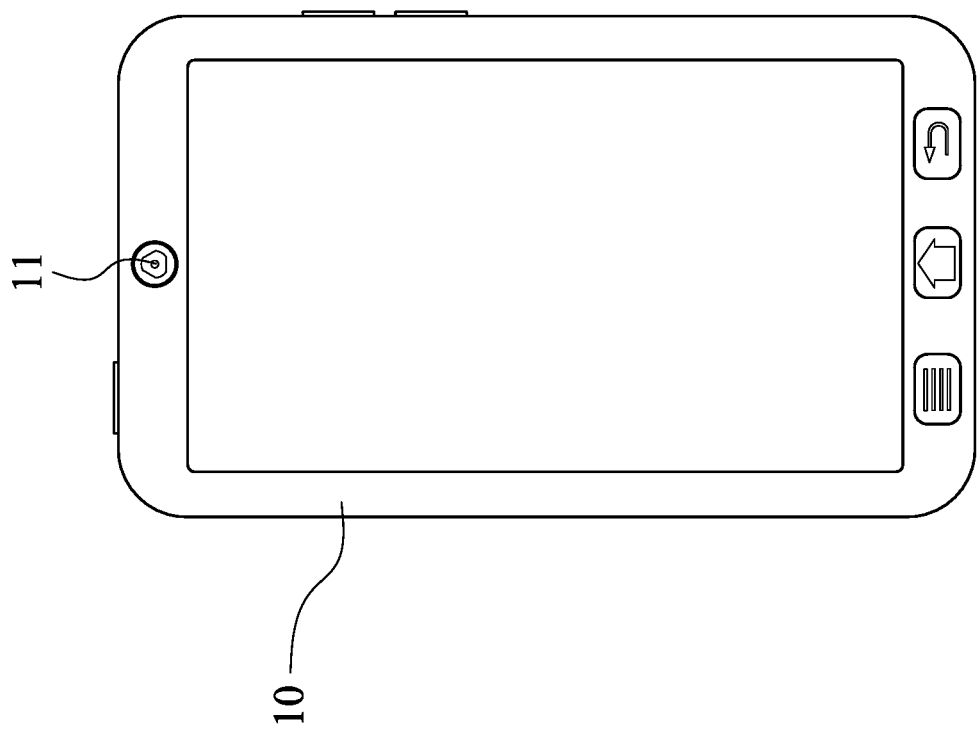
FIG. 27 is a schematic view of an electronic device according to the 14th embodiment of the present disclosure.

FIG. 27 is a schematic view of an electronic device 10 according to the 14th embodiment of the present disclosure. The electronic device 10 of the 14th embodiment is a smartphone, wherein the electronic device 10 includes an image capturing device 11. The image capturing device 11 includes an optical imaging lens assembly (its reference numeral is omitted) according to the present disclosure and an image sensor (its reference numeral is omitted), wherein the image sensor is disposed on an image surface of the optical imaging lens assembly.

15th Embodiment

Figure 28:
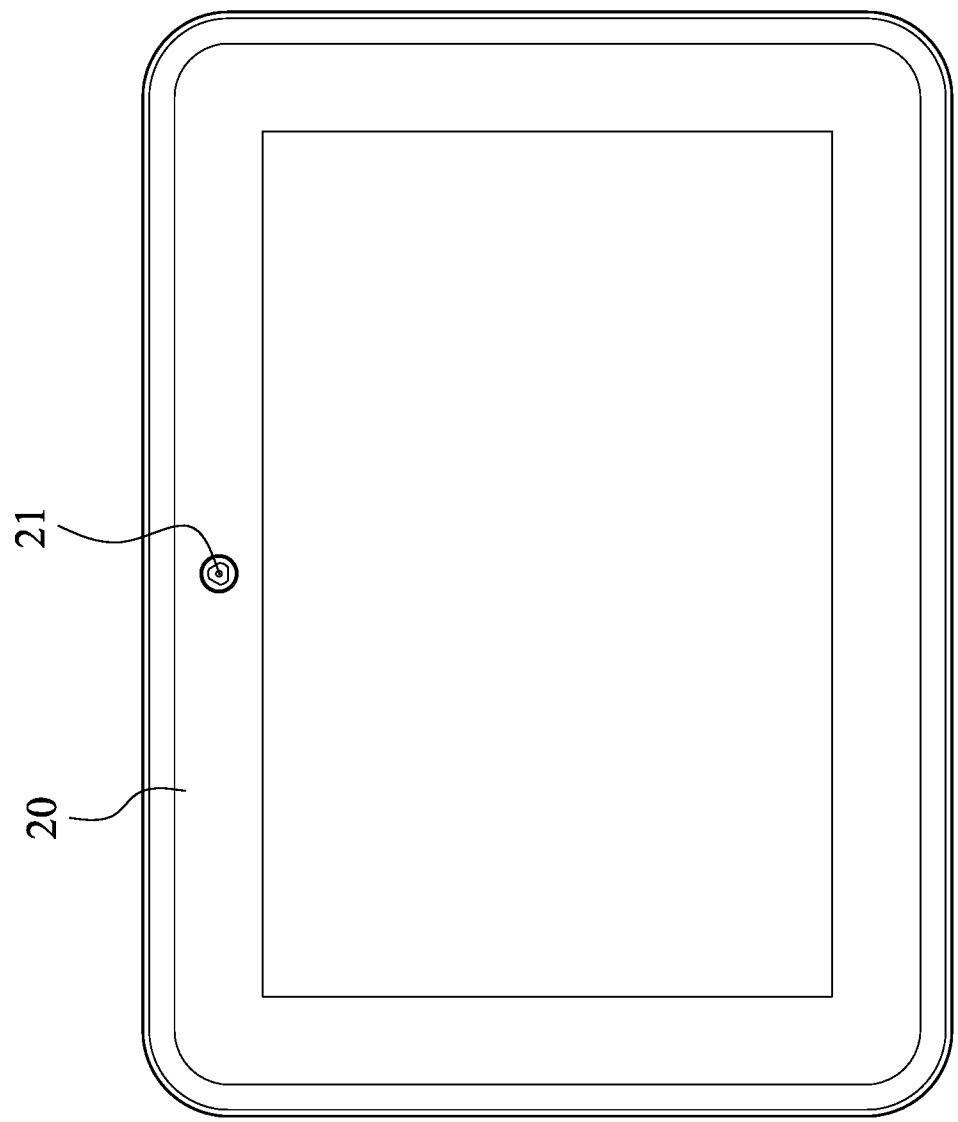
FIG. 28 is a schematic view of an electronic device according to the 15th embodiment of the present disclosure.

FIG. 28 is a schematic view of an electronic device 20 according to the 15th embodiment of the present disclosure. The electronic device 20 of the 15th embodiment is a tablet personal computer, wherein the electronic device 20 includes an image capturing device 21. The image capturing device 21 includes an optical imaging lens assembly (its reference numeral is omitted) according to the present disclosure and an image sensor (its reference numeral is omitted), wherein the image sensor is disposed on an image surface of the optical imaging lens assembly.

16th Embodiment

Figure 29:
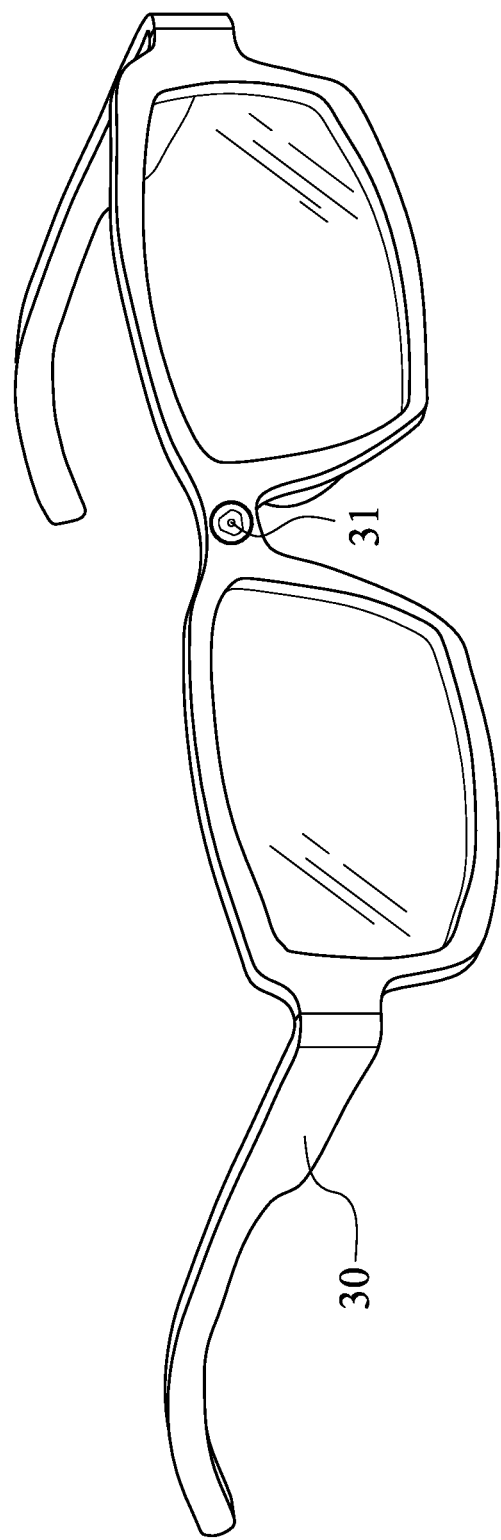
FIG. 29 is a schematic view of an electronic device according to the 16th embodiment of the present disclosure.

FIG. 29 is a schematic view of an electronic device 30 according to the 16th embodiment of the present disclosure. The electronic device 30 of the 16th embodiment is a wearable device, wherein the electronic device 30 includes an image capturing device 31. The image capturing device 31 includes an optical imaging lens assembly (its reference numeral is omitted) according to the present disclosure and an image sensor (its reference numeral is omitted), wherein the image sensor is disposed on an image surface of the optical imaging lens assembly.

The foregoing description, for purpose of explanation, has been described with reference to specific embodiments. It is to be noted that Tables 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising six lens elements, the six lens elements being, in order from an object side to an image side:
a first lens element, a second lens element, a third lens element, a fourth lens element, a fifth lens element and a sixth lens element;
wherein each of the six lens elements has an object-side surface facing towards the object side and an image-side surface facing towards the image side;
wherein the first lens element has positive refractive power; the second lens element has positive refractive power; the object-side surface of the fifth lens element is convex in a paraxial region thereof, the image-side surface of the fifth lens element is concave in a paraxial region thereof and comprises at least one inflection point in an off-axis region thereof; the image-side surface of the sixth lens element is convex in a paraxial region thereof;
wherein a total number of lens elements in the optical imaging lens assembly is six; a focal length of the second lens element is f2, a focal length of the third lens element is f3, a curvature radius of the object-side surface of the third lens element is R5, a curvature radius of the image-side surface of the third lens element is R6, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a maximum of N1, N2, N3, N4, N5 and N6 is Nmax, and the following conditions are satisfied:

|f3|<|f2|;

0.50<(R5+R6)/(R5−R6)<2.50; and 1.60<Nmax<1.72.

2. The optical imaging lens assembly of claim 1, wherein the object-side surface of the first lens element is convex in a paraxial region thereof; at least one of the object-side surface and the image-side surface of the sixth lens element is aspheric; at least one of the object-side surface and the image-side surface of the sixth lens element comprises at least one inflection point in an off-axis region thereof.

3. The optical imaging lens assembly of claim 1, wherein an Abbe number of the third lens element is V3, and the following condition is satisfied:

V3<25.0.

4. The optical imaging lens assembly of claim 1, wherein a focal length of the optical imaging lens assembly is f, an axial distance between the object-side surface of the first lens element and an image surface is TL, and the following condition is satisfied:

0.70<TL/f≤1.15.

5. The optical imaging lens assembly of claim 1, wherein the curvature radius of the object-side surface of the third lens element is R5, the curvature radius of the image-side surface of the third lens element is R6, and the following condition is satisfied:

1.04≤(R5+R6)/(R5−R6)<2.50.

6. The optical imaging lens assembly of claim 1, wherein a focal length of the optical imaging lens assembly is f, a focal length of the first lens element is f1, an axial distance between the image-side surface of the sixth lens element and an image surface is BL, an axial distance between the object-side surface of the first lens element and the image-side surface of the sixth lens element is TD, and the following conditions are satisfied:

1.0<f/f1<3.0; and

0<BL/TD<0.45.

7. The optical imaging lens assembly of claim 1, wherein each of the six lens elements is a single and non-cemented lens element; at least one of the object-side surface and the image-side surface of each of the first lens element, the second lens element, the third lens element, the fourth lens element and the fifth lens element is aspheric; at least three surfaces of the surfaces provided by the first lens element, the second lens element, the third lens element, the fourth lens element, the fifth lens element and the sixth lens element comprise at least one inflection point in off-axis regions thereof.

8. The optical imaging lens assembly of claim 1, wherein an entrance pupil diameter of the optical imaging lens assembly is EPD, a maximum image height of the optical imaging lens assembly is ImgH, and the following condition is satisfied:

1.25<EPD/ImgH<2.0.

9. The optical imaging lens assembly of claim 1, wherein a half of a maximum field of view of the optical imaging lens assembly is HFOV, and the following condition is satisfied:

0.20<tan(2×HFOV)<1.0.

10. An optical imaging lens assembly comprising six lens elements, the six lens elements being, in order from an object side to an image side:

a first lens element, a second lens element, a third lens element, a fourth lens element, a fifth lens element and a sixth lens element;

wherein each of the six lens elements has an object-side surface facing towards the object side and an image-side surface facing towards the image side;

wherein the first lens element has positive refractive power; the third lens element has negative refractive power; the object-side surface of the fifth lens element is convex in a paraxial region thereof, the image-side surface of the fifth lens element is concave in a paraxial region thereof and comprises at least one inflection point in an off-axis region thereof; the image-side surface of the sixth lens element is convex in a paraxial region thereof, wherein a total number of lens elements in the optical imaging lens assembly is six; a focal length of the second lens element is f2, a focal length of the third lens element is f3, a curvature radius of the object-side surface of the third lens element is R5, a curvature radius of the image-side surface of the third lens element is R6, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a maximum of N1, N2, N3, N4, N5 and N6 is Nmax, and the following conditions are satisfied:

|f3|<|f2|;

0.50<(R5+R6)/(R5−R6)<2.50; and 1.60<Nmax<1.72.

11. The optical imaging lens assembly of claim 10, wherein the object-side surface of the third lens element is convex in a paraxial region thereof, the image-side surface of the third lens element is concave in a paraxial region thereof.

12. The optical imaging lens assembly of claim 10, wherein the object-side surface of the fourth lens element is concave in a paraxial region thereof, the image-side surface of the fourth lens element is convex in a paraxial region thereof.

13. The optical imaging lens assembly of claim 10, further comprising:

an aperture stop, wherein a focal length of the optical imaging lens assembly is f, an entrance pupil diameter of the optical imaging lens assembly is EPD, an axial distance between the aperture stop and an image surface is SL, an axial distance between the object-side surface of the first lens element and the image surface is TL, and the following conditions are satisfied:

1.25<f/EPD<2.30; and 0.78<SL/TL<1.10.

14. The optical imaging lens assembly of claim 10, wherein the focal length of the third lens element is f3, a focal length of the fourth lens element is f4, a focal length of the sixth lens element is f6, and the following conditions are satisfied:

$$|f3|<|f4|; \text{ and}$$

$$|f3|<|f6|.$$

15. The optical imaging lens assembly of claim 10, further comprising:
   an aperture stop disposed on the object-side surface of the first lens element; wherein a focal length of the optical imaging lens assembly is f, an axial distance between the object-side surface of the first lens element and an image surface is TL, and the following condition is satisfied:

$$0.70<TL/f\leq1.20.$$

16. The optical imaging lens assembly of claim 10, wherein a curvature radius of the object-side surface of the sixth lens element is R11, a curvature radius of the image-side surface of the sixth lens element is R12, and the following condition is satisfied:

$$|R11/R12|<1.30.$$

17. The optical imaging lens assembly of claim 10, wherein a maximum effective radius of the object-side surface of the first lens element is Y11, a maximum effective radius of the image-side surface of the sixth lens element is Y62, and the following condition is satisfied:

$$0.70<Y11/Y62<1.10.$$

18. The optical imaging lens assembly of claim 10, wherein an axial distance between the object-side surface of the first lens element and an image surface is TL, a maximum image height of the optical imaging lens assembly is ImgH, and the following condition is satisfied:

$$2.2<TL/\text{Img}H<4.0.$$

19. The optical imaging lens assembly of claim 10, wherein a maximum image height of the optical imaging lens assembly is ImgH, a focal length of the optical imaging lens assembly is f, and the following condition is satisfied:

$$0.10<\text{Img}H/f<0.40.$$

20. The optical imaging lens assembly of claim 10, wherein a central thickness of the first lens element is greater than a central thickness of the second lens element; the central thickness of the first lens element is greater than a central thickness of the fifth lens element.

21. An image capturing device, comprising:
   the optical imaging lens assembly of claim 11; and
   an image sensor disposed on an image surface of the optical imaging lens assembly.

22. An electronic device, comprising:
   the image capturing device of claim 21.

* * * * *